United States Patent
Hirano et al.

(10) Patent No.: US 6,754,027 B2
(45) Date of Patent: Jun. 22, 2004

(54) HEAD SPEED CONTROL METHOD, HEAD POSITION DETECTION METHOD AND DISK UNIT

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 09/738,144

(22) Filed: Dec. 15, 2000

(65) Prior Publication Data
US 2001/0036031 A1 Nov. 1, 2001

(30) Foreign Application Priority Data

Apr. 26, 2000 (JP) ........................... 2000-126469
May 26, 2000 (JP) ........................... 2000-155722

(51) Int. Cl.[7] ............................................. G11B 21/02
(52) U.S. Cl. ........................ 360/75; 360/69; 360/78.06
(58) Field of Search ....................... 360/75, 61, 69, 360/76.06; 318/599

(56) References Cited

U.S. PATENT DOCUMENTS

| | | | |
|---|---|---|---|
| 4,425,534 A | 1/1984 | Perahia | 318/135 |
| 4,755,892 A | 7/1988 | Carteau et al. | 360/75 |
| 4,786,994 A | 11/1988 | Carteau et al. | 360/75 |
| 5,455,723 A | * 10/1995 | Boutaghou et al. | 360/75 |
| 5,663,846 A | * 9/1997 | Masuoka et al. | 360/75 |
| 5,768,045 A | 6/1998 | Patton, III et al. | 360/78.04 |
| 5,828,522 A | 10/1998 | Brown et al. | 360/105 |
| 5,838,515 A | * 11/1998 | Mortazavi et al. | 360/78.12 |
| 5,847,895 A | * 12/1998 | Romano et al. | 360/78.09 |
| 5,986,426 A | * 11/1999 | Rowan | 318/599 |
| 6,148,240 A | * 11/2000 | Wang et al. | 700/63 |

FOREIGN PATENT DOCUMENTS

| | | |
|---|---|---|
| EP | 667 615 | 8/1985 |
| EP | 537 940 | 4/1993 |
| EP | 769 774 | 4/1997 |
| JP | 04030376 A | 2/1992 |
| JP | 11-250601 | 9/1999 |

* cited by examiner

Primary Examiner—David Hudspeth
Assistant Examiner—Jason Olson
(74) Attorney, Agent, or Firm—Greer, Burns & Crain, Ltd.

(57) ABSTRACT

A head speed control method for a disk unit having a head provided on a tip end of an arm is constructed to include a step of switching and controlling a head speed to a plurality of target speeds which are set in advance, during at least one of a ramp unload operation in which the head is receded to a parking area other than on a recording surface of a disk and a ramp load operation in which the head receded at the parking area is returned on the recording surface of the disk.

23 Claims, 53 Drawing Sheets

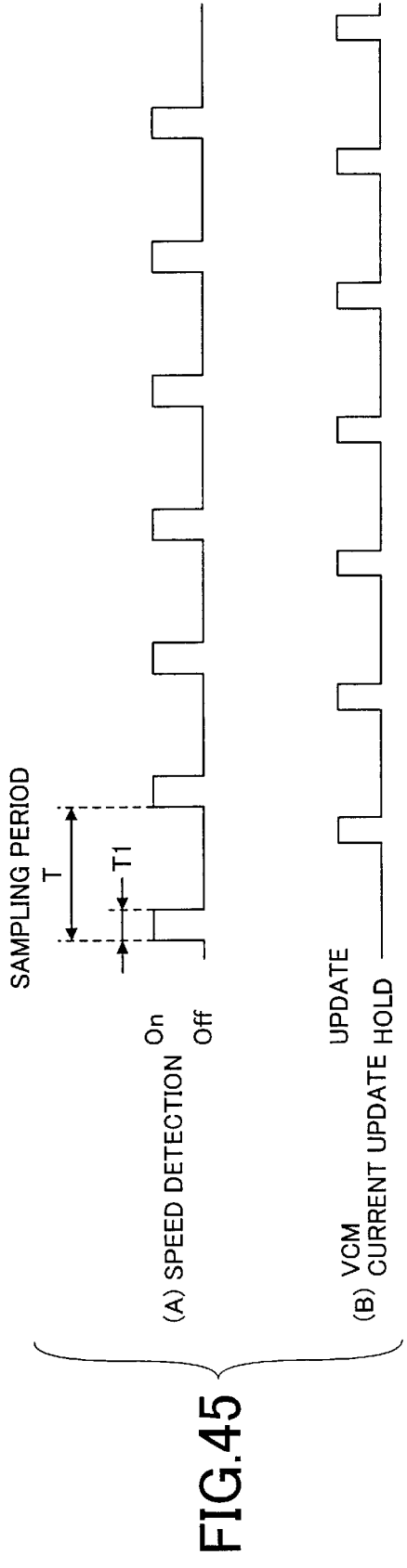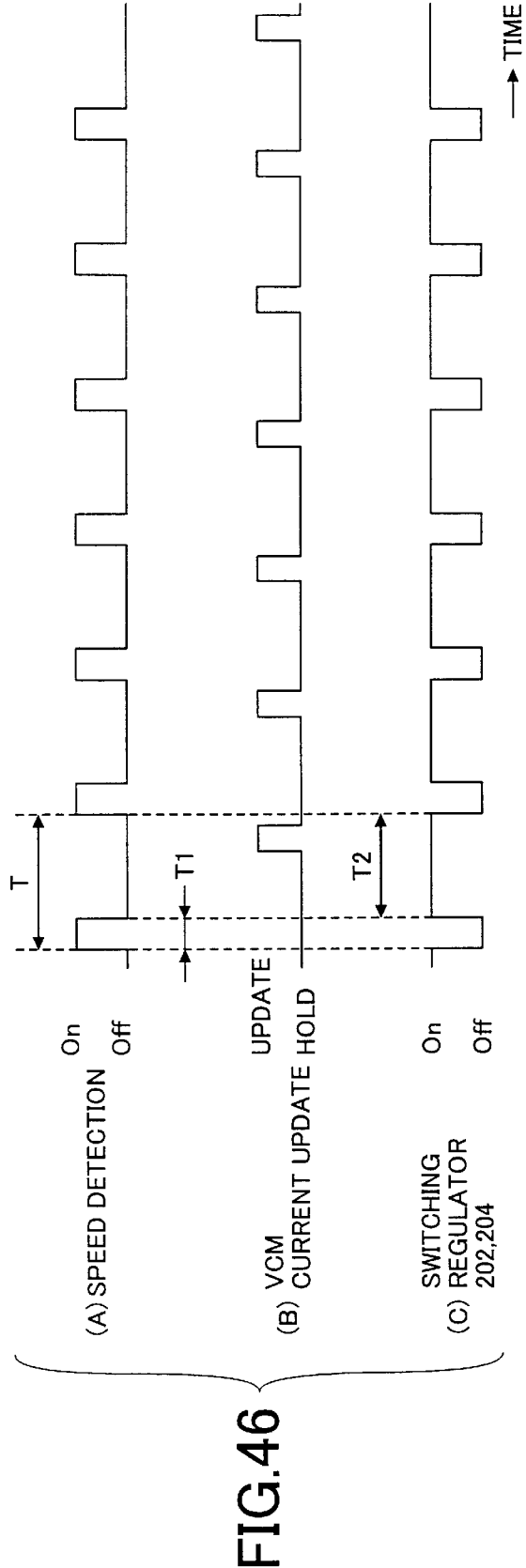

HEAD SPEED CONTROL METHOD, HEAD POSITION DETECTION METHOD AND DISK UNIT

BACKGROUND OF THE INVENTION

This application claims the benefit of a Japanese Patent Applications No. 2000-126469 filed Apr. 26, 2000 and No. 2000-155722 filed May 26, 2000, in the Japanese Patent Office, the disclosure of which is hereby incorporated by reference.

1. Field of the Invention

The present invention generally relates to head speed control methods, head position detection methods and disk units, and more particularly to a head speed control method and a head position detection method which are suited for a disk unit having a ramp load and/or unload mechanism, and to a disk unit which employs such a head speed control method or a head position detection method.

2. Description of the Related Art

In a magnetic disk unit, a head writes and reads signals with respect to a magnetic disk. In the case of a hard disk, a small gap exists between the head and the disk. However, when the magnetic disk unit is mounted in a portable equipment such as a lap-top personal computer, the head is receded to a parking area other than on a recording surface of the disk when the magnetic disk unit does not carry out an operation, so as to prevent unwanted contact between the head and the disk due to an externally applied shock or the like. Otherwise, if the head hits the disk, there is a possibility of damaging the head and the disk.

In addition, when the magnetic disk unit is not used for a long period of time, the head may stick to the recording surface of the disk due to a lubricant or the like which is coated on the surface of the disk. For this reason, the head is receded to the parking area also when the magnetic disk unit is not used for a long period of time.

A ramp load/unload mechanism is provided to guide, along a ramp member, an arm which supports the head, during a ramp load operation in which the head is receded to the parking area and during a ramp unload operation in which the head is returned from the parking area onto the disk. During the ramp unload operation, the head separates from the disk, and thus, it is impossible to detect the position of the head or to detect and control the head speed, based on position information read from the disk. In addition, although the head speed during the time when the arm is guided by the ramp member can be predicted to a certain extent, it is impossible to accurately predict the head speed due to frictional wear of the ramp member and the like, changes introduced to constituent elements of the magnetic disk unit with time, and the inconsistencies of the characteristics among the individual magnetic disk units. It is possible to detect the head speed using a back electromotive voltage of a voice coil motor (VCM) which drives the head. But usually, the magnetic disk unit is constructed so that a base portion of the arm makes contact with a stopper and is stopped thereby when the head reaches the parking area during the ramp load operation in which the head is receded to the parking area.

Recently, in the portable equipment such as the lap-top personal computer which is mounted with the magnetic disk unit, the portable equipment is frequently operated using a battery as the power source, and there is a demand to minimize the power consumption. Consequently, power save modes are provided in the portable equipment so as to reduce the power consumption in steps depending on the state of the portable equipment, and the ramp load operation is carried out in some power save modes. There is a tendency for the frequency of carrying out the ramp load operation to increase, since there is a demand to further reduce the power consumption.

According to the conventional disk unit, there was a problem in that, even when the head speed is detected, it is impossible to detect the head position and to appropriately control the head speed during an operation such as the ramp load operation in which the head separates from the recording surface of the disk.

In addition, the conventional disk unit is constructed so that the base portion of the arm makes contact with and is stopped by the stopper every time the ramp load operation is carried out. Hence, a large mechanical contact noise is generated when the base portion of the arm hits the stopper. Consequently, there was a problem in that the contact noise is unpleasant to the user as the frequency of the ramp load operation increases.

SUMMARY OF THE INVENTION

Accordingly, it is a general object of the present invention to provide a novel and useful head speed control method, head position detection method and disk unit, in which the problems described above are eliminated.

Another and more specific object of the present invention is to provide a head speed control method which can appropriately control the head speed and a head position detection method which can detect the head position, even when the head is located at a position where the information on the disk cannot be read, and to provide a disk unit which can reduce the mechanical contact noise during the ramp load operation by employing such a head speed control method and/or head position detection method.

Still another object of the present invention is to provide a head speed control method for a disk unit having a head provided on a tip end of an arm, characterized by a step of switching and controlling a head speed to a plurality of target speeds which are set in advance, during at least one of a ramp unload operation in which the head is receded to a parking area other than on a recording surface of a disk and a ramp load operation in which the head receded at the parking area is returned on the recording surface of the disk.

A further object of the present invention is to provide a head position detection method for a disk unit having a head provided on a tip end of an arm, characterized by a step of detecting a head speed; and a step of detecting a time integration value of the head speed from a reference position from which a head position can be specified.

Another object of the present invention is to provide a disk unit provided with a motor which drives an arm having a head on a tip end thereof, characterized in that there are provided a first detection circuit detecting a head speed; and a second detection circuit detecting a time integration value of the head speed from a reference position from which a head position can be specified.

In the disk unit described above, the reference position may be a position where the head cannot read information on a disk.

In addition, the disk unit described above may further be provided with a controller which controls a ramp unload operation in which the head is receded to a parking area other than on a recording surface of a disk and a ramp load operation in which the head receded at the parking area is returned on the recording surface of the disk, and wherein the controller variably controls the head speed by controlling the motor during at least one of the ramp unload operation and the ramp load operation.

Furthermore, in the disk unit described above, the controller may control the motor to urge the head in a direction towards a terminal position of the parking area for a predetermined time when the head reaches the terminal position during the ramp unload operation.

Still another object of the present invention is to provide a disk unit provided with a motor which drives an arm having a head on a tip end thereof, characterized in that there is provided a controller switching and controlling a head speed to a plurality of target speeds which are set in advance, during at least one of a ramp unload operation in which the head is receded to a parking area other than on a recording surface of a disk and a ramp load operation in which the head receded at the parking area is returned on the recording surface of the disk.

In the disk unit described above, the controller may control the head speed to a predetermined target speed when the head reaches a predetermined position.

Further, in the disk unit described above, the controller may control the head speed to a predetermined target speed when a predetermined time is reached.

Therefore, according to the first aspect of the present invention, it is possible to realize a head speed control method which can appropriately control the head speed and a head position detection method which can detect the head position, even when the head is located at a position where the information on the disk cannot be read, and to realize a disk unit which can reduce the mechanical contact noise during the ramp load operation by employing such a head speed control method and/or head position detection method.

Another object of the present invention is to provide a disk unit provided with a ramp load mechanism, characterized by a load speed controller controlling a speed of a head when the head moves on a ramp member, and a circuit control processor controlling an operation of a peripheral circuit part while the speed of the head is controlled.

Still another object of the present invention is to provide a disk unit provided with a ramp load mechanism, characterized by a load speed controller controlling a speed of a head when the head moves on a ramp member, and a noise suppressing section suppressing a mixture of noise caused by an operation of a peripheral circuit part while the speed of the head is controlled.

A further object of the present invention is to provide a method of controlling a disk unit which is provided with a ramp load mechanism, characterized by the steps of controlling a speed of a head when the head moves on a ramp member, and controlling an operation of a peripheral circuit part while the speed of the head is controlled.

Still another object of the present invention is to provide a method of controlling a disk unit provided with a ramp load mechanism, characterized by the steps of controlling a speed of a head when the head moves on a ramp member, and suppressing a mixture of noise caused by an operation of a peripheral circuit part while the speed of the head is controlled.

Therefore, according to the second aspect of the present invention, in a disk unit which is provided with a ramp load mechanism, the operation of a peripheral circuit part is stopped or the operation is slowed down by reducing a clock frequency while a head speed signal is detected from a back electromotive voltage of a VCM when loading a head from a ramp member onto a magnetic disk, so as to suppress a noise which mixes into the head speed signal from the peripheral circuit part. As a result, it is possible to accurately and stably carry out the speed control during a ramp load operation based on the head speed signal which is detected from the weak back electromotive voltage of the VCM. In addition, it is possible to improve the reliability of the disk unit by preventing an erroneous operation which would otherwise be caused by an abnormal movement of the head when the ramp load operation is carried out.

Other objects and further features of the present invention will be apparent from the following detailed description when read in conjunction with the accompanying drawings.

BRIEF DESCRIPTION OF THE DRAWINGS

FIG. 45 is a time chart for explaining a head speed detection by sampling of FIG. 42 and updating of the VCM current;

FIG. 46 is a time chart for explaining the operations of the switching regulators in synchronism with the head speed detection by sampling;

DESCRIPTION OF THE PREFERRED EMBODIMENTS

Figures 1A, 1B:
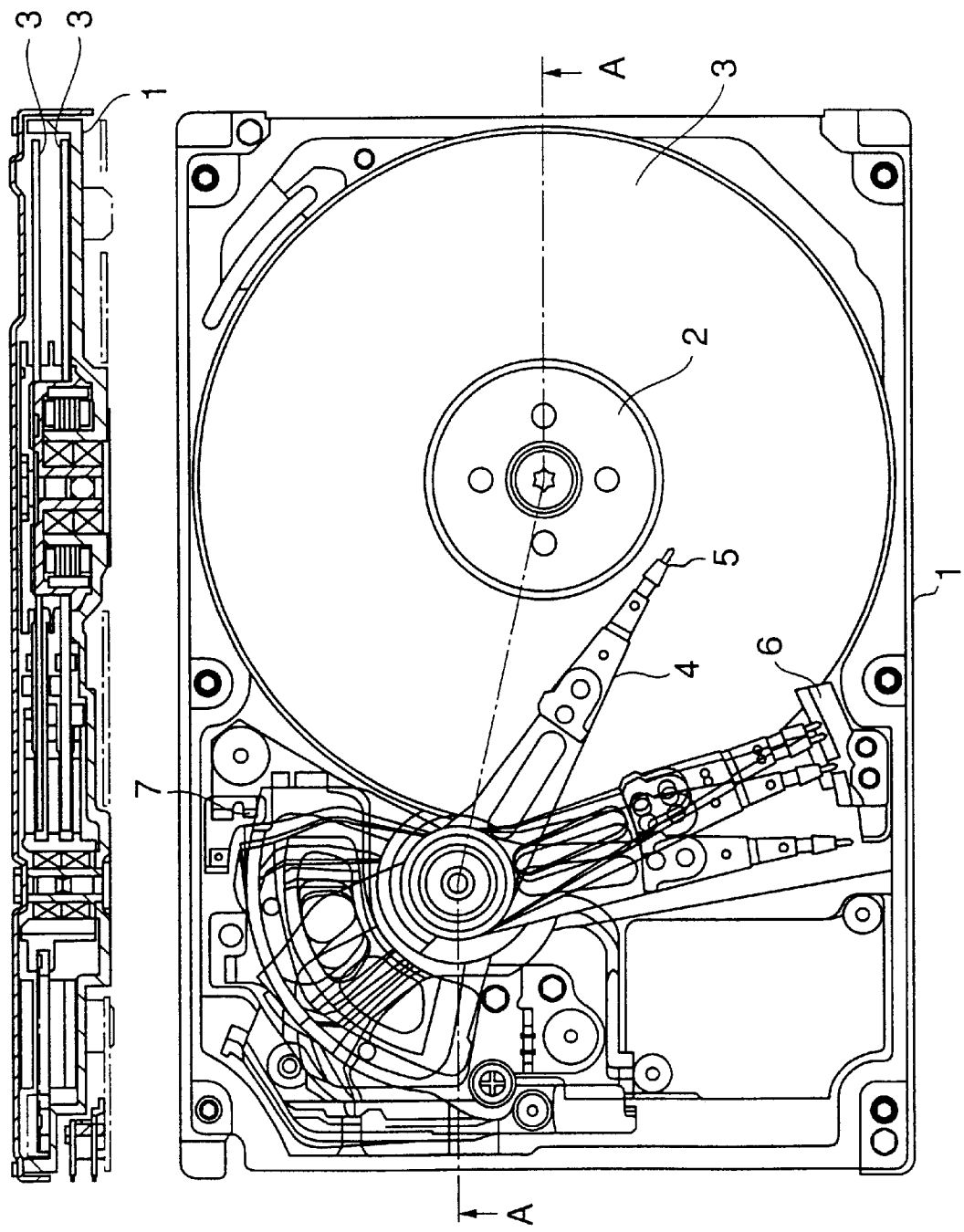
FIGS. 1A and 1B are a cross sectional view and a plan view respectively showing a basic structure of an embodiment of a disk unit according to the present invention.

A description will be given of various embodiments of a head speed control method, a head position detection method and a disk unit according to the present invention, by referring to the drawings.

FIGS. 1A and 1B are a cross sectional view and a plan view respectively showing a basic structure of an embodiment of a disk unit according to the present invention. In this embodiment of the disk unit, the present invention is applied to a magnetic disk unit (hard disk drive or HDD) which is provided with hard disks. In addition, this embodiment of the disk unit employs an embodiment of a head speed control method according to the present invention and an embodiment of a head position detection method according to the present invention. FIG. 1B shows a plan view of the disk unit with an upper portion removed, and FIG. 1A shows a cross sectional view along a line A—A in FIG. 1B.

As shown in FIGS. 1A and 1B, the disk unit generally includes a housing 1, a plurality of disks (two disks in this embodiment) 3 which are fixed to a hub 2, a plurality of arms 4, a head 5 provided on a tip end of each arm 4, a ramp member 6, and a stopper 7. The basic structure of the disk unit is of course not limited to that shown in FIGS. 1A and 1B, and various other known basic structures may be used for the disk unit, as long as the disk unit is provided with a ramp load and/or unload mechanism.

Figure 2:
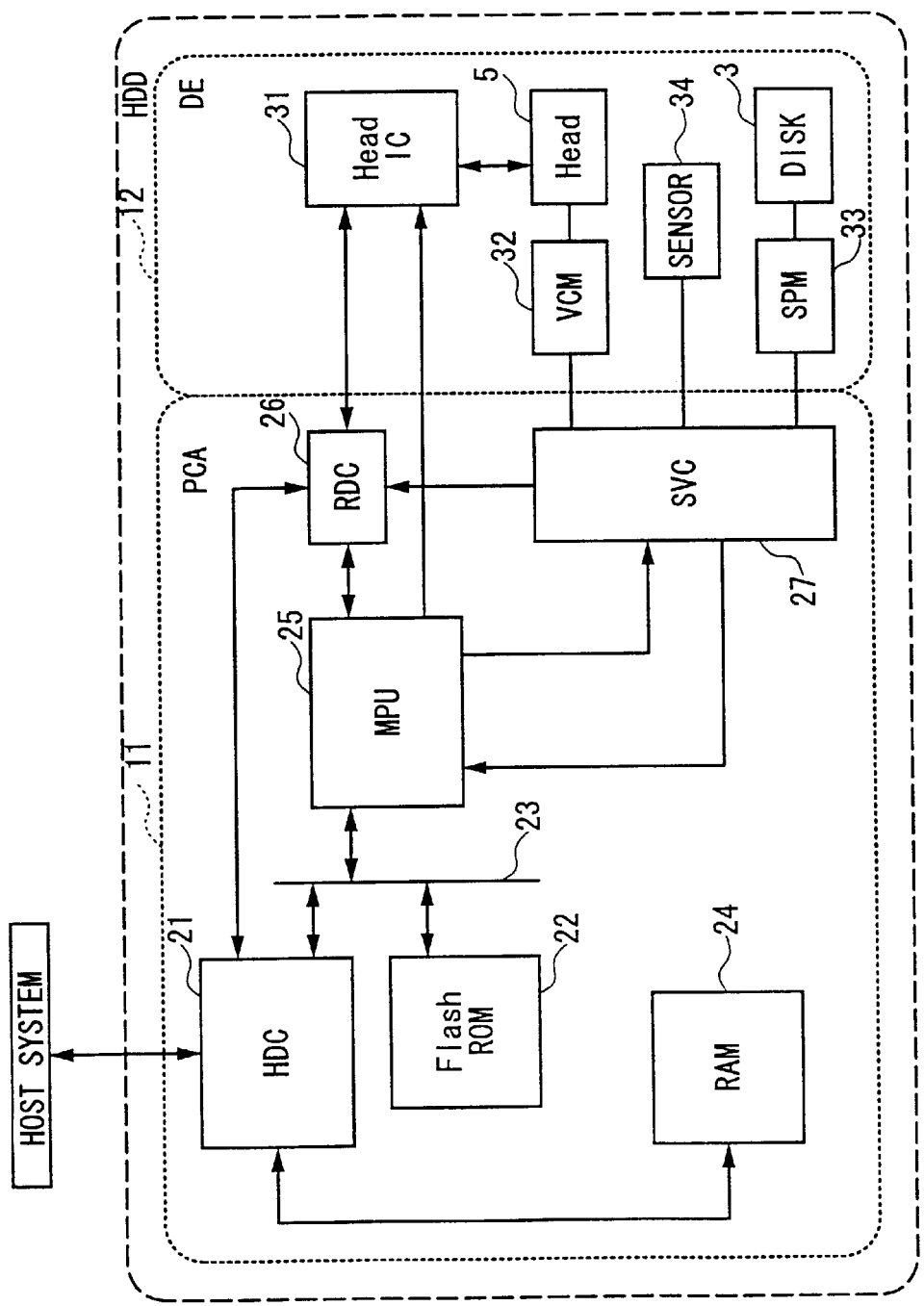
FIG. 2 is a system block diagram showing a construction of a control system of the embodiment of the disk unit.

FIG. 2 is a system block diagram showing a construction of a control system of this embodiment of the disk unit. The magnetic disk unit (HDD) shown in FIG. 2 generally includes a printed circuit assembly (PCA) 11, and a disk enclosure (DE) 12. The PCA 11 includes a hard disk controller (HDC) 21, a flash ROM 22, a bus 23, a RAM 24, a MPU 25, a read channel (RDC) 26, and a servo combination driver (SVC) 27. On the other hand, the disk enclosure 12 includes the disks 3, the heads 5, a head IC 31, a voice coil motor (VCM) 32, a spindle motor (SPM) 33, and a distortion sensor 34. The construction of the HDD shown in FIG. 2 is basically known except for the provision of the distortion sensor 34.

In the disk enclosure 12, the head IC 31 carries out a predetermined signal processing on a signal which is read from the disk 3 by the head 5, and supplies the processed signal to the RDC 26 within the PCA 11. In addition, the head IC 31 supplies a write signal which is obtained from the MPU 25 within the PCA 11 to the head 5 so as to write the write signal on the disk 3. The VCM 32 drives the arm 4 based on a control signal which is supplied from the SVC 27 within the PCA 11. The SPM 33 rotates the disk 3 based on a control signal supplied from the SVC 27 within the PCA 11.

In the PCA 11, the HDC 21 supplies to the MPU 25 instructions for carrying out write and read operations, based on an instruction from a host system (not shown). The MPU 25 controls the operation of a control system including the SVC 27, based on the instruction from the HDC 21 and a read signal which is obtained via the RDC 26. The write signal is supplied to the head IC 31 within the disk enclosure 12 via the HDC 21 and the MPU 25, and the read signal from the head IC 31 is supplied to the MPU 25 and the HDC 21 via the RDC 26. The read signal supplied to the HDC 21 is supplied to the host system. The flash ROM 22 stores various data which are used when the MPU 25 operates, and the RAM 24 temporarily stores various data which are used when the MPU 25 and the HDC 21 operate.

Of course, the construction of the control system of the disk unit is not limited to that shown in FIG. 2, and various other known constructions may be employed, as long as the control system of the disk unit is provided with the function of controlling the ramp load and/or unload mechanism.

Figure 3:
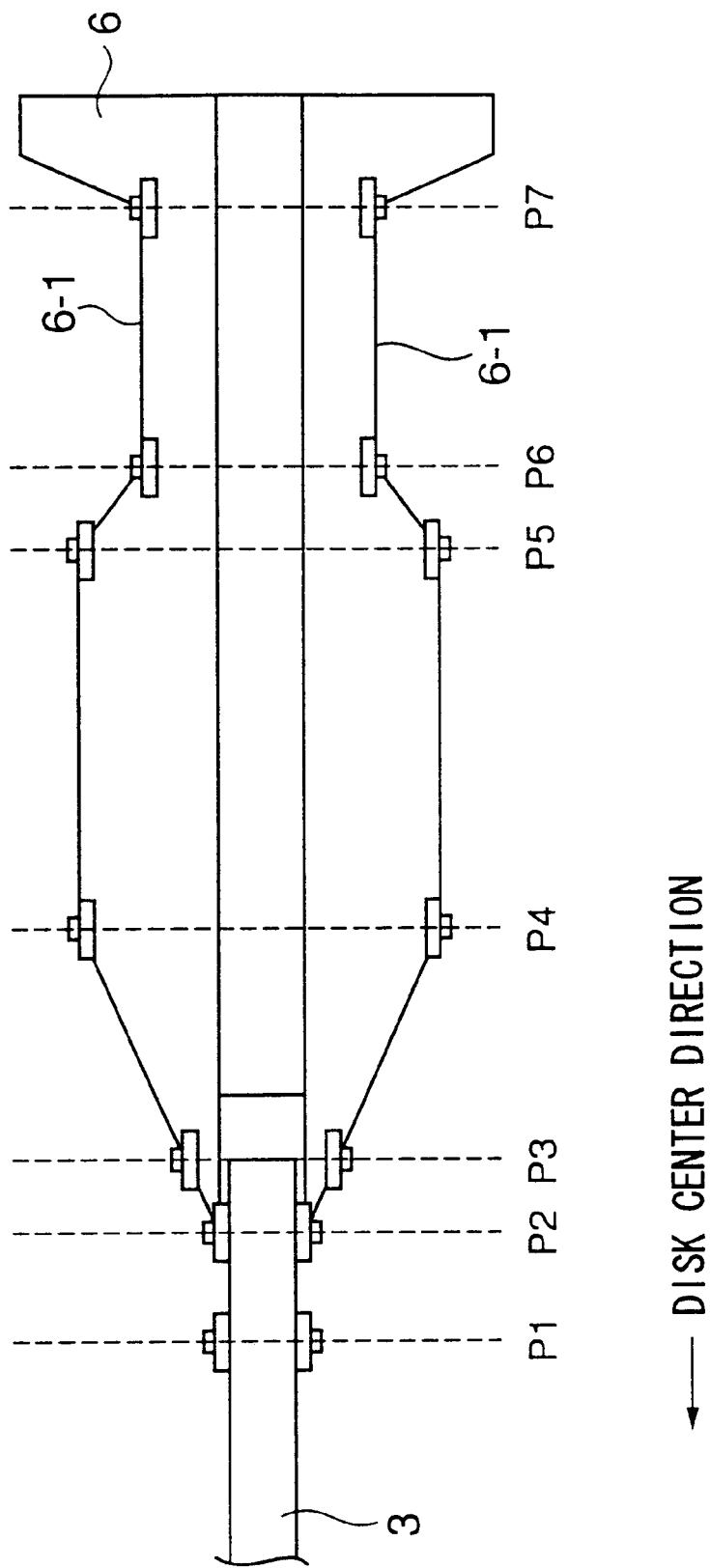
FIG. 3 is a cross sectional view showing a ramp member.

Next, a description will be given of a general operation of this embodiment. FIG. 3 is a cross sectional view showing the ramp member 6, and FIG. 4 is a flow chart for explaining the general operation of this embodiment.

As shown in FIG. 3, the ramp member 6 is made up of a plurality of sloping parts, a flat part, and a parking area 6-1 to where the head 5 is receded from a position on a recording surface of the disk 3 when a ramp unload operation is carried out. Positions where the head 3 passes or reaches during the ramp load operation are denoted by P1 through P7. P1 denotes a reference position on the disk 3, P2 denotes a start position of a first sloping part of the ramp member 6, P3 denotes a limit position where the signal can be read from the disk 3, P4 denotes a start position of the flat part of the ramp member 6 (end position of the first sloping part), P5 denotes an end position of the flat part of the ramp member 6 (start position of a second sloping part), P6 denotes an end position of the second sloping part of the ramp member 6 (start position of the parking area 6-1), and P7 denotes a terminal position of the parking area 6-1.

Figure 4:
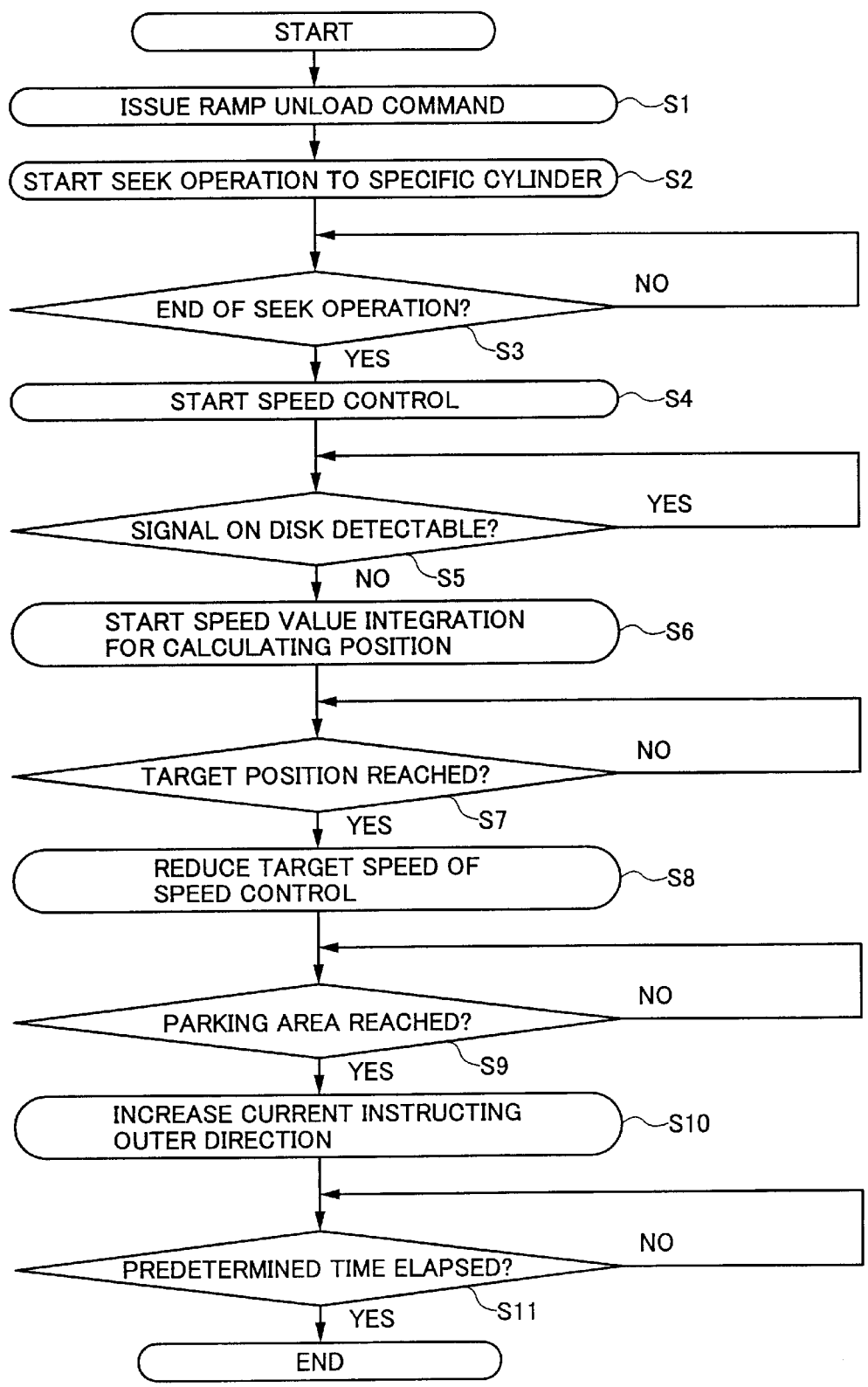
FIG. 4 is a flow chart for explaining a general operation of the embodiment of the disk unit.

The process shown in FIG. 4 corresponds to the operations of the MPU 25 and the SVC 27 within the PCA 11. In FIG. 4, a step S1 issues a ramp unload command in response to an instruction from the host system, and a step S2 starts a seek operation in which the head 5 starts seek to a specific cylinder on the disk 3, that is, the reference position P1. A step S3 decides whether or not the seek operation is ended. If the decision result in the step S3 becomes YES, a step S4 starts a speed control with respect to the head 5, and a step S5 decides whether or not the signal on the disk 3 can be read by the head 5. If the decision result in the step S5 is YES, a known speed control is carried out based on the signal which is read from the disk 3 by the head 5. On the other hand, if the head 5 exceeds the position P2 and moves to the position P3, the decision result in the step S5 becomes NO, and the process advances to a step S6.

Figure 5:
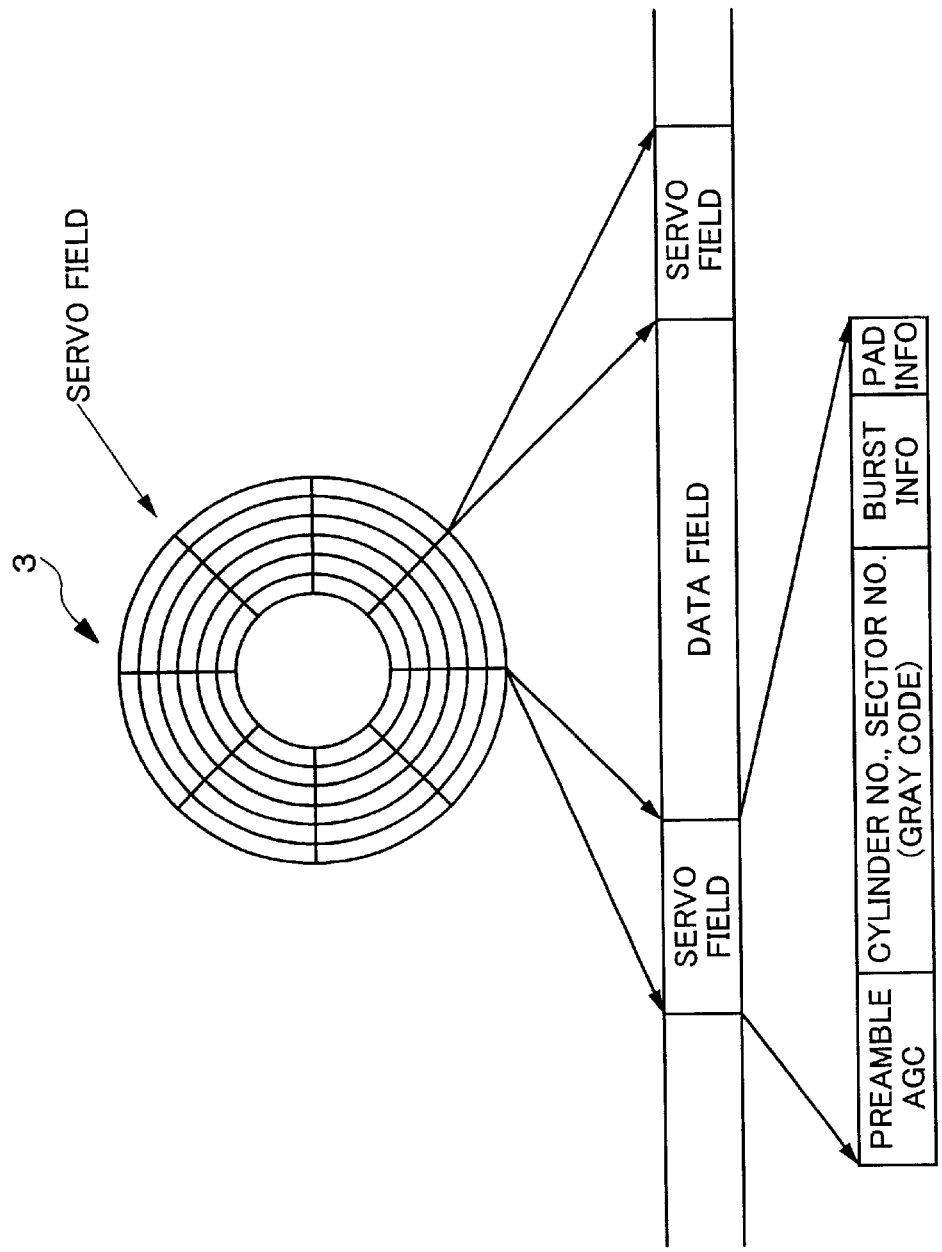
FIG. 5 is a diagram for explaining an embedded servo technique.

Next, a description will be given of the known speed control which is carried out based on the signal read from the disk 3 by the head 5, by referring to FIG. 5. FIG. 5 is a diagram for explaining an embedded servo technique.

As shown on the upper portion of FIG. 5, the recording surface of the disk 3 is divided into a plurality of sectors. A servo field is provided between two adjacent sectors, and a data field is provided between two adjacent servo fields. A preamble, position information and PAD information are included in each servo field. The position information includes a Gray code which indicates a cylinder number and a sector number on the disk 3, and burst information which indicates an error within a track and is used to maintain an on-track state. The PAD information indicates an end of the servo field. Since the read signal including the position information within the servo field is output from the RDC 26 shown in FIG. 2 and is supplied to the MPU 25, the MPU 25 can control the speed of the head 5 based on the position information.

For the sake of convenience, it is assumed that the head speed is constant from the position P1 to immediately before the position P5. However, as will be described later, the head speed can be controlled arbitrarily during the ramp unload operation and during the ramp load operation.

The step S6 obtains the speed of the head 5, and detects the head position by time integration of the head speed. More particularly, a back electromotive voltage of the VCM 32 is detected by the SVC 27, the head speed is obtained by the MPU 25 based on the back electromotive voltage, and the MPU 25 detects the head position by carrying out a time integration on the head speed with reference to the reference position P1.

Figure 6:
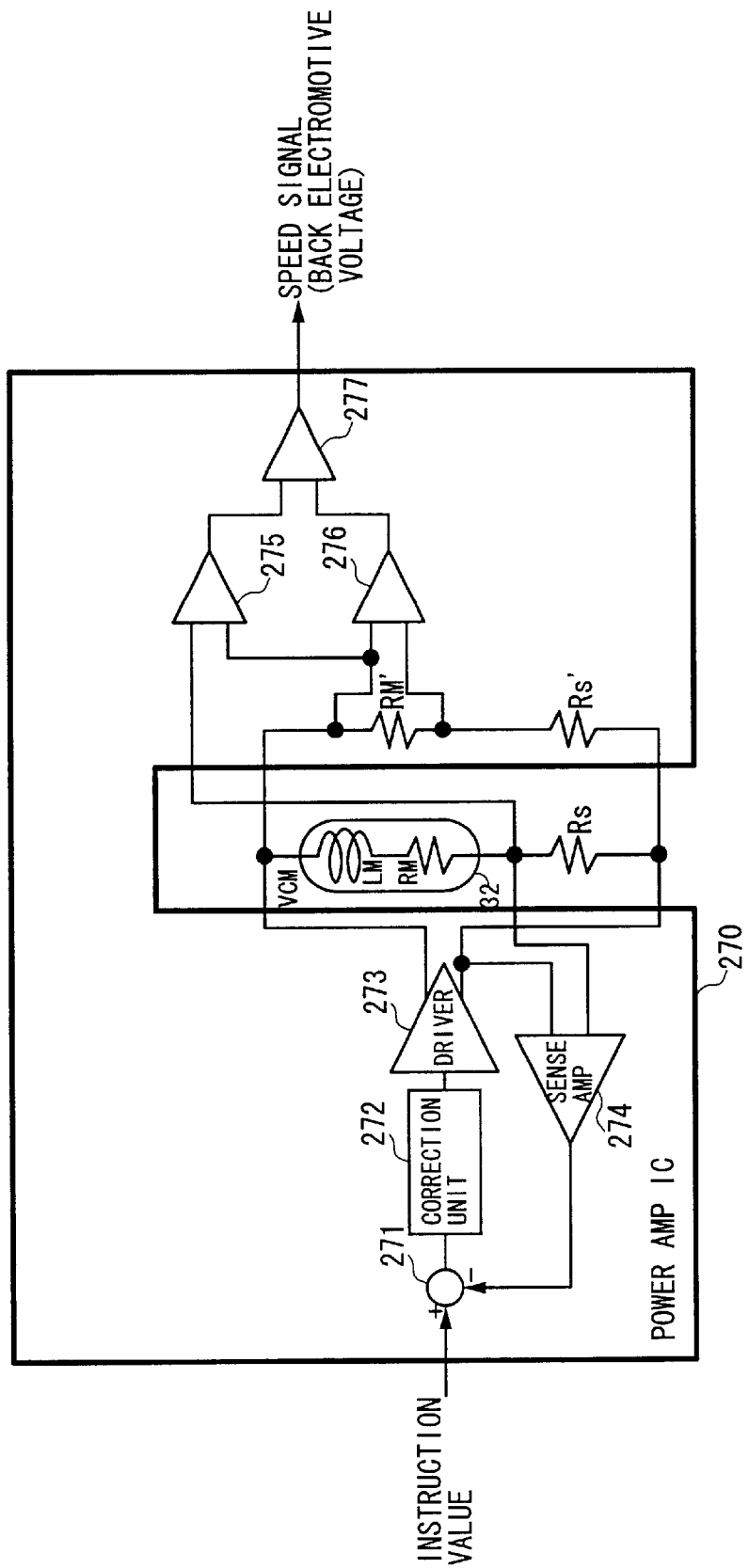
FIG. 6 is a system block diagram showing a construction of a power amplifier integrated circuit for detecting a back electromotive voltage of a VCM.

FIG. 6 is a system block diagram showing a construction of a power amplifier integrated circuit (IC) for detecting the back electromotive voltage of the VCM 32. A power amplifier IC 270 is provided within the SVC 27, and includes a subtracter 271, a correction unit 272, a driver 273, a sense amplifier 274, differential amplifiers 275 through 277, and resistors RM' and RS' which are connected as shown in FIG. 6. A sense resistor RS may be provided within the power amplifier IC 270. LM and RM respectively denote an inductance and a resistance of the VCM 32. An instruction value which instructs a rotational speed of the VCM 32 is supplied to the subtracter 271 from the MPU 25. In addition, a detected back electromotive voltage of the VCM 32, that is, a speed signal which indicates the head speed, is output from the differential amplifier 277. This speed signal is subjected to a known analog-to-digital (A/D) conversion within the SVC 27 and converted into a digital speed signal which is supplied to the MPU 25. Accordingly, the MPU 25 can detect the head position by carrying out the time integration of the head speed which is obtained from the speed signal, with reference to the reference position P1.

Returning now to the description of FIG. 4, a step S7 decides whether or not the head position reached a target position which is set in advance. The target position is a position where reduction of the head speed starts. In this embodiment, the target position is set to the position p5. For this reason, the decision result in the step S7 is NO when the head position is at the position P3 up to immediately before the position P5. When the head position reaches the position P5, the decision result in the step S7 becomes YES, and a step S8 reduces the head speed to a target speed which is set in advance.

A step S9 decides whether or not the head position reached the terminal position P7 of the parking area 6-1. In this embodiment, the decision result in the step S9 is NO when the head position is at the position P5 up to immediately before the terminal position P7. The decision result in the step S9 becomes YES when the head position reaches the terminal position P7, and a step S10 controls the VCM 32 to urge the head 5 towards the terminal position P7, that is, towards an outer periphery of the disk 3. More particularly, a current supplied to the VCM 32 is appropriately controlled. A step S11 decides whether or not a predetermined time has elapsed from a time when the urging of the head 5 towards the terminal position P7 started, and the process ends when the decision result in the step S11 becomes YES.

When the head position reaches the terminal position P7, the base portion of the arm 4 hits the stopper 7 shown in FIGS. 1A and 1B, and the head position is restricted thereby. As the head position approaches the terminal position P7, the head speed is reduced, and a mechanical contact noise which is generated when the base portion of the arm 4 hits the stopper 7 is extremely small and negligible. Furthermore, by urging the had 5 towards the terminal position P7 for the predetermined time, the head 5 positively reaches the terminal position P7, and the head 5 is restricted to the terminal position P7, so that the base portion of the arm 4 will not hit the stopper 7 a plurality of times to repeatedly generate unwanted mechanical contact noise. Accordingly, the user will hear no unpleasant mechanical contact noise when the ramp unload operation is carried out.

Figure 7:
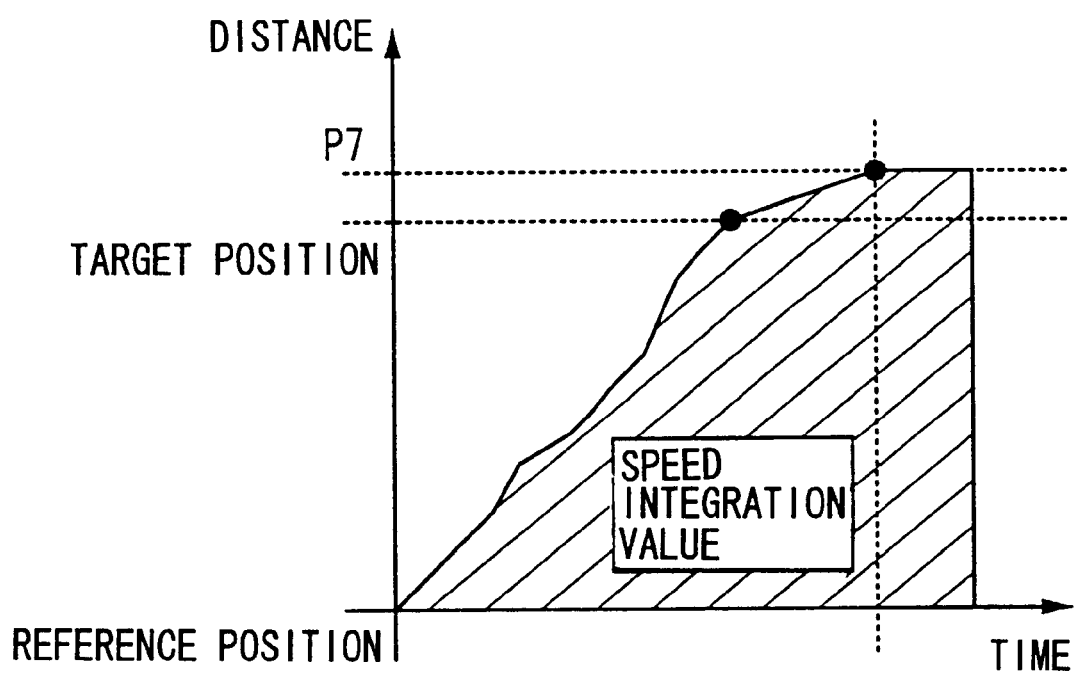
FIG. 7 is a diagram showing a relationship of time and head position during a ramp unload operation.

FIG. 7 is a diagram for explaining a relationship of time and head position during the ramp unload operation. In FIG. 7, the ordinate indicates a moving distance of the head 5, the abscissa indicates the time, and a hatched part indicates an integration value of the head speed.

Figure 8:
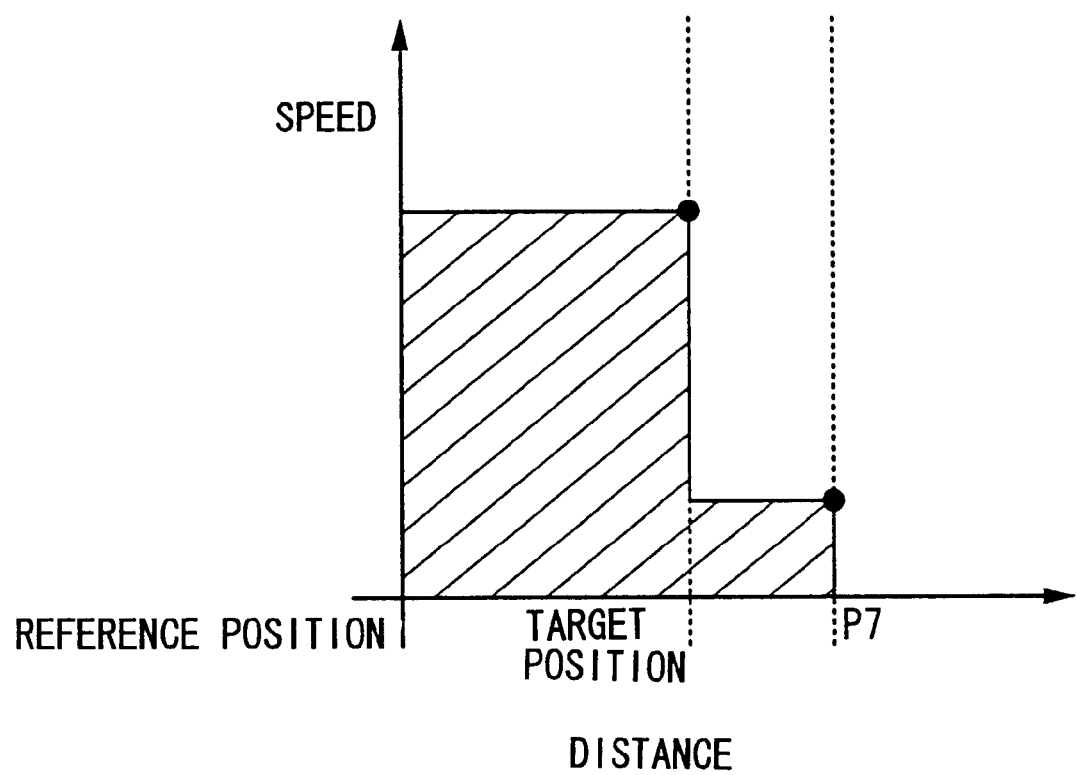
FIG. 8 is a diagram showing an embodiment of a speed control during the ramp unload operation.

FIG. 8 is a diagram showing an embodiment of a speed control during the ramp unload operation. In FIG. 8, the ordinate indicates the head speed, and the abscissa indicates the head position. In this embodiment, the head speed is reduced to a predetermined head speed when the target position is passed.

Figure 9:
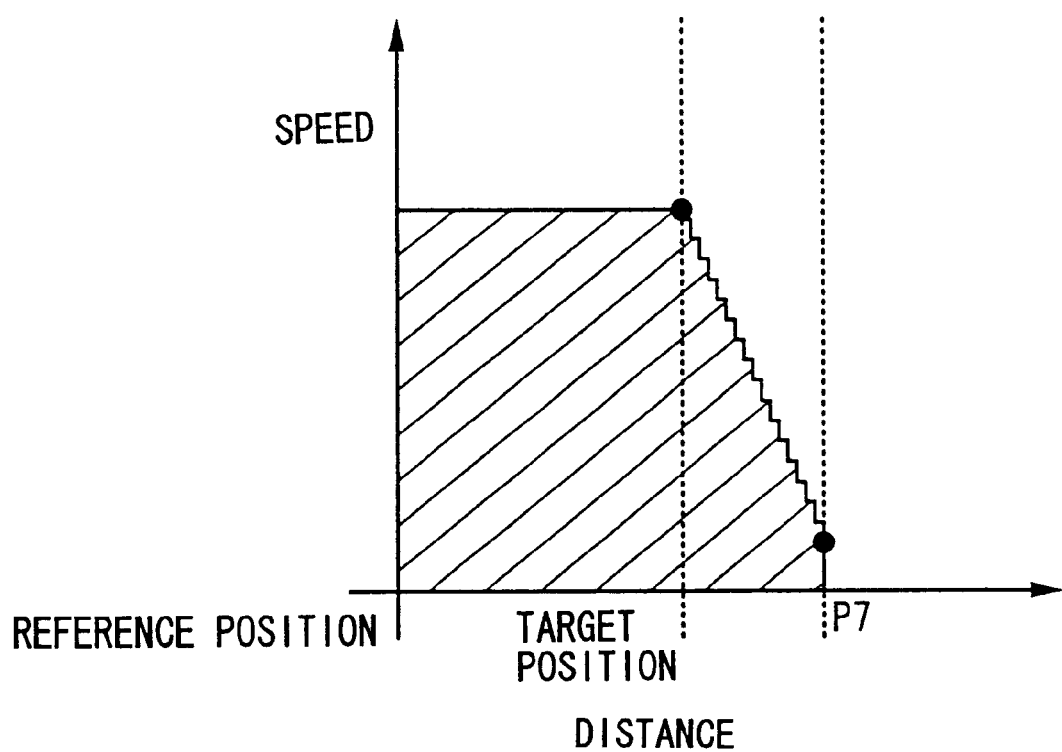
FIG. 9 is a diagram showing another embodiment of the speed control during the ramp unload operation.

FIG. 9 is a diagram showing another embodiment of the speed control during the ramp unload operation. In FIG. 9, the ordinate indicates the head speed, and the abscissa indicates the head position. In this embodiment, the head speed is gradually reduced to a predetermined head speed when the target position is passed. In this case, the head speed may be gradually reduced in steps or continuously.

Figure 10:
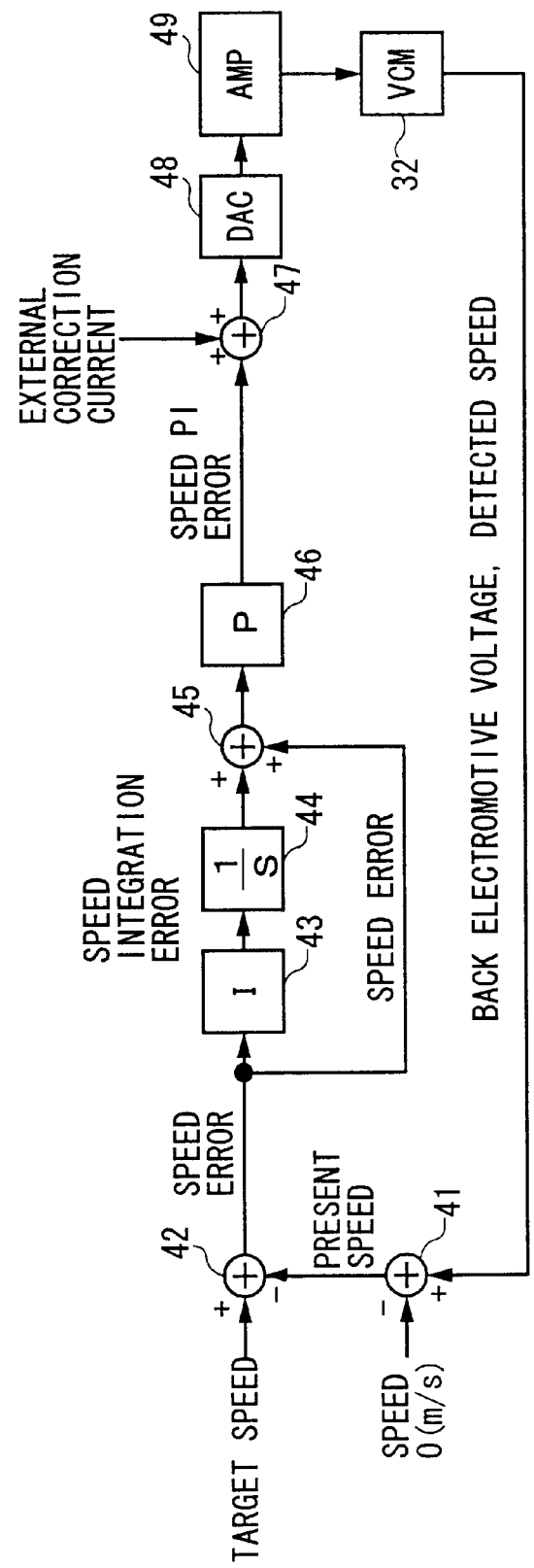
FIG. 10 is a functional block diagram showing a ramp load and/or unload control system.

FIG. 10 is a functional block diagram showing a head speed control section of a ramp load and/or unload control system. The ramp load and/or unload control system shown in FIG. 10 is realized by the MPU 25 and the SVC 27 shown in FIG. 2.

In FIG. 10, the ramp load and/or unload control system includes subtracters 31 and 42, multipliers 43 and 46, an integrator 44, adders 45 and 47, a digital-to-analog converter (DAC) 48, a power amplifier 49, and the VCM 32. The subtracter 41 subtracts an offset correction value of a speed 0 m/s, for example, from the back electromotive voltage from the VCM 32. The offset correction value is used to remove an offset of the head speed which is detected from the back electromotive voltage. The subtracter 42 subtracts a present speed which is output from the subtracter 41 from the target speed of the head speed control, to output a speed error. The speed error is supplied to the multiplier 43 and the adder 45. The multiplier 43 multiplies an integration gain I to the speed error, and the integrator 44 subjects an output of the multiplier 43 to a time integration (1/s) to output a speed integration error which is supplied to the adder 45. The multiplier 46 multiplies a proportionality gain P to an output of the adder 45, and supplies a speed PI error to the adder 47. An external correction current is also supplied to this adder 47. An output of the adder 47 is supplied to the VCM 32 via the DAC 48 and the power amplifier 49, and the head speed is controlled to the target speed. For the sake of convenience, FIG. 10 shows the back electromotive voltage as being output from the VCM 32, but actually, the back electromotive voltage is of course output from the power amplifier IC 270 which includes the power amplifier 49 as shown in FIG. 6.

During the ramp load operation in which the head 5 is returned to the position on the recording surface of the disk 3, the operation that is carried out is basically in reverse to that carried out during the ramp unload operation described above. In the case of the ramp load operation, it is necessary to control the head speed so that the head 5 will not hit the recording surface of the disk 3. Hence, the head speed is controlled similarly as in the case of the ramp unload operation. For example, the head speed is reduced when the position P3 shown in FIG. 3 is passed, so as to positively prevent the head 5 from hitting the disk 3.

Therefore, according to this embodiment, it is possible to prevent the generation of the mechanical contact noise when the ramp unload operation is carried out, by appropriately controlling the head speed during the ramp unload operation. In addition, it is possible to prevent the head 5 from hitting the disk 3 during the ramp load operation, by appropriately controlling the head speed during the ramp load operation. Furthermore, it is possible to carry out the ramp unload operation and the ramp load operation at a high speed.

Figure 11:
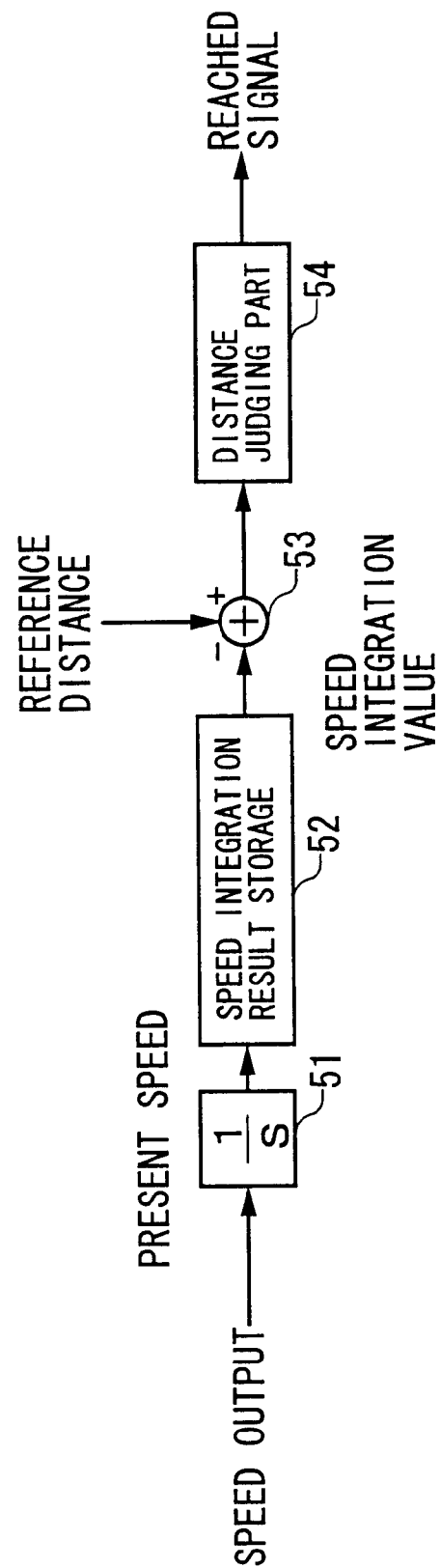
FIG. 11 is a functional block diagram showing a head position detecting section of the control system.

FIG. 11 is a functional block diagram showing a head position detecting section of the control system. The control system shown in FIG. 11 is realized by the MPU 25 and the SVC 27 shown in FIG. 2.

In FIG. 11, the control system includes an integrator 51, a speed integration result storage 52, a subtracter 53 and a distance judging part 54. The integrator 51 subjects the present speed of the head 5 a time integration (1/s), and the speed integration result storage 52 stores a speed integration value which is obtained as a speed integration result. The speed integration value corresponds to a moving distance of the head 5, and is supplied to the subtracter 53. The subtracter 53 subtracts the stored moving distance from a reference distance from a reference position the head 5 is to move in order to reach the target position. The distance judging part 54 judges whether or not the moving distance of the head 5 reached the reference distance, based on a subtraction result of the subtracter 53, and outputs a reached signal when the moving distance of the head 5 reaches the reference distance. Hence, by setting the reference position which enables the head position to be specified, and carrying out the time integration of the head speed from this reference position, it is possible to calculate different distances from the head positions to the target position by calculating the time integration value of the head speed. Consequently, it is possible to simply and positively detect that the moving distance of the head 5 reached the reference distance.

It is possible to accurately recognize the head position when the head 5 moves from the ramp member 6 onto the disk 3 during the ramp load operation. For this reason, it is unnecessary to supply power to the head 5 while the head 5 is on the ramp member 6, thereby reducing the power consumption and extending the serviceable life of the head 5.

Figure 12:
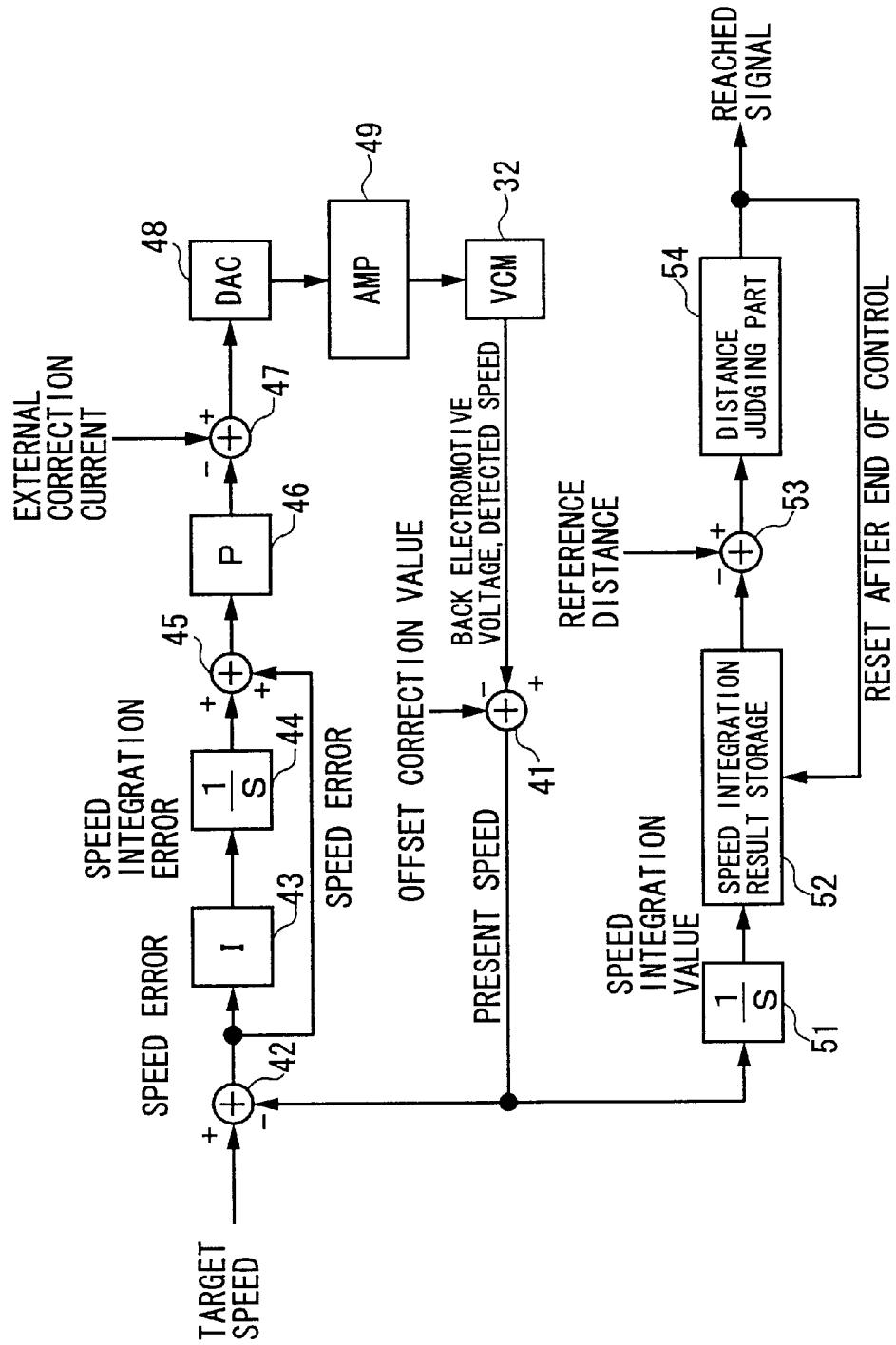
FIG. 12 is a functional block diagram showing a head speed control section and a head position detecting section of the control system.

FIG. 12 is a functional block diagram showing a head speed control section and a head position detecting section of the control system. The control system shown in FIG. 12 is realized by the MPU 25 and the SVC 27 shown in FIG. 2. In FIG. 12, those parts which are the same as those corresponding parts in FIGS. 10 and 11 are designated by the same reference numerals, and a description thereof will be omitted.

In the control system shown in FIG. 12, the present speed of the head 5 which is supplied to the integrator 51 is obtained from the subtracter 41. In addition, the reached signal which is output from the distance judging part 54 is supplied to the speed integration result storage 52, so as to reset the speed integration value stored in the speed integration result storage 52 after the speed control of the head 5 ends.

Figure 13:
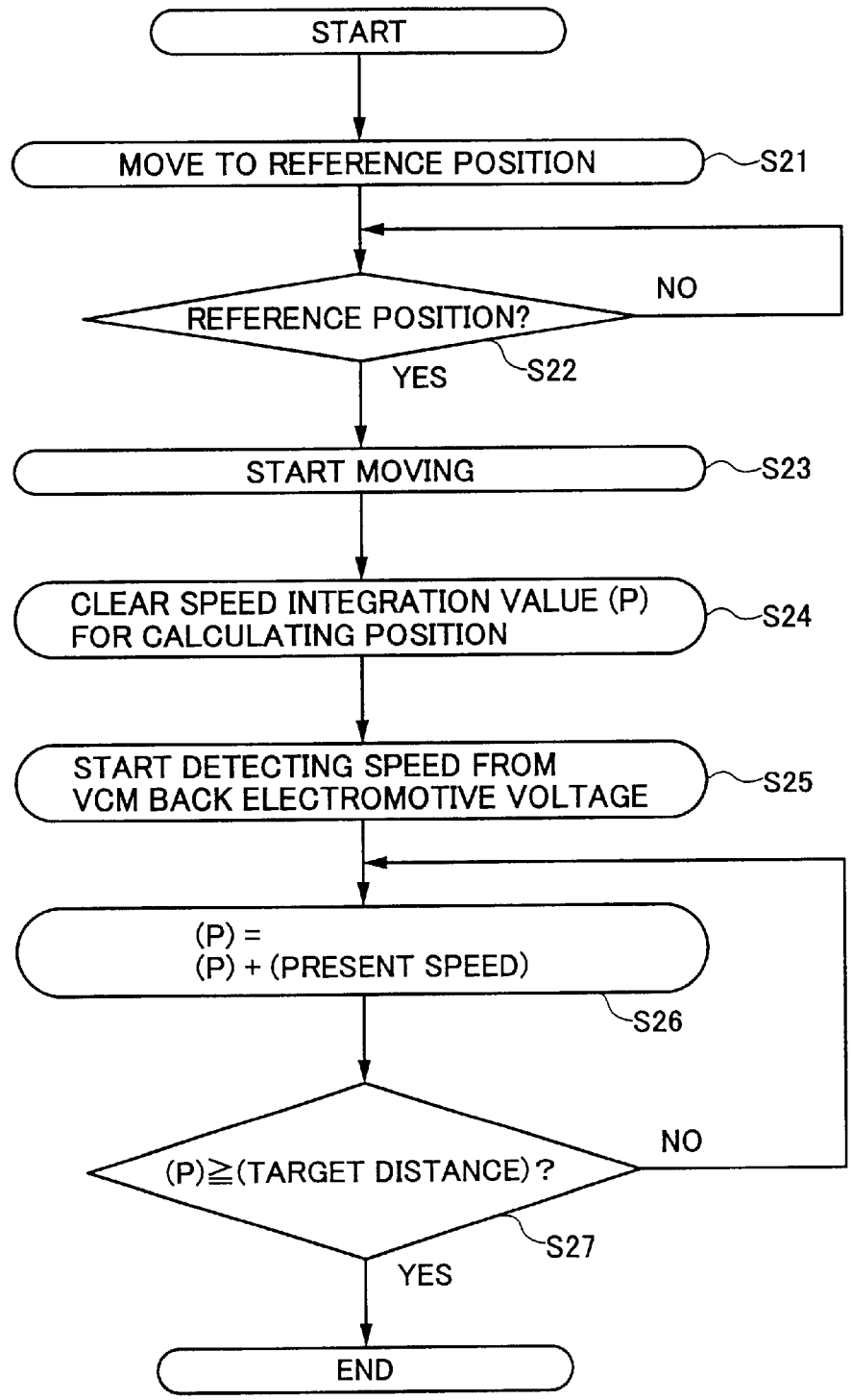
FIG. 13 is a flow chart for explaining a process which judges whether or not a head reached a target position and obtains a present position of the head from an integration value of a head speed during the ramp unload operation.

FIG. 13 is a flow chart for explaining a process which judges whether or not the head 5 reached the target position and obtains the present position of the head 5 from the integration value of the head speed during the ramp unload operation, by the functional blocks shown in FIGS. 11 and 12. The process shown in FIG. 13 corresponds to the processes of the MPU 25 and the SVC 27 shown in FIG. 2.

In FIG. 13, a step S21 moves the head 5 to the reference position, and a step S22 decides whether or not the head 5 reached the reference position. When the decision result in the step S22 becomes YES, a step S23 starts to move the head 5 towards the ramp member 6. A step S24 clears a speed integration value (P) which is used for the calculation of the head position. In addition, a step S25 starts to detect the head speed from the back electromotive voltage of the VCM 32. A step S26 obtains the moving distance (P) of the head 5 from (P)=(P)+(present speed). A step S27 decides whether or not the moving distance (P) of the head 5 is greater than or equal to a target distance, and the process ends if the decision result in the step S27 is YES. On the other hand, the process returns to the step S26 if the decision result in the step S27 is NO.

Figure 14:
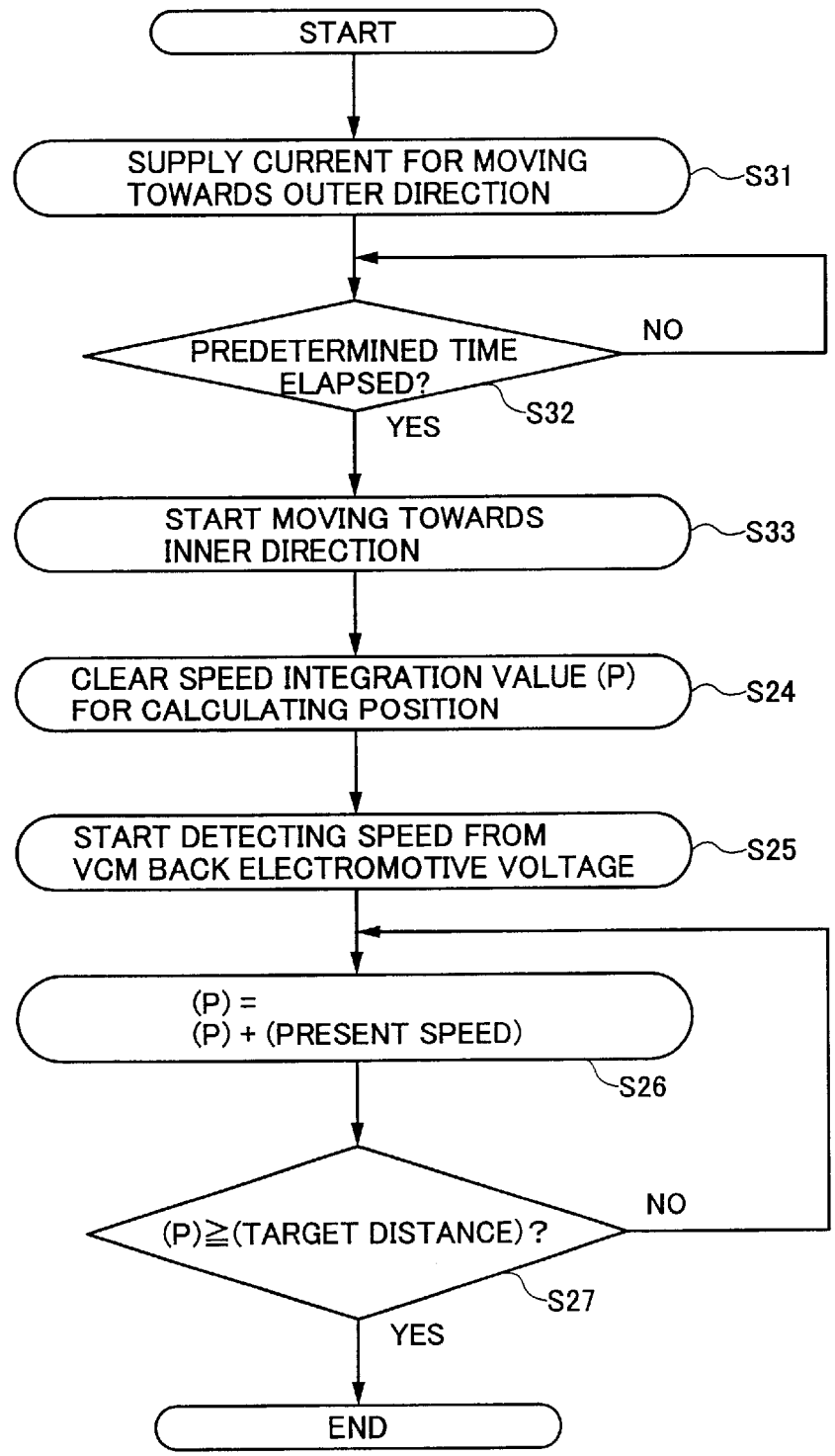
FIG. 14 is a flow chart for explaining a process which obtains the present position of the head from the integration value of the head speed during the ramp load operation.

FIG. 14 is a flow chart for explaining a process which obtains the present position of the head 5 from the integration value of the head speed during the ramp load operation, by the functional block shown in FIG. 12. The process shown in FIG. 14 corresponds to the process of the MPU 25 and the SVC 27 shown in FIG. 2. In FIG. 14, those steps which are the same as those corresponding steps in FIG. 13 are designated by the same reference numerals, and a description thereof will be omitted.

In FIG. 14, a step S31 supplies to the VCM 32 a current for moving the head 5 towards the outer periphery of the disk 3, and a step S32 decides whether or not a predetermined time has elapsed. When the decision result in the step S32 becomes YES, a step S33 starts to move the head 5 towards the inner periphery of the disk 3, and the step S24 through S27 are carried out thereafter.

Figure 15:
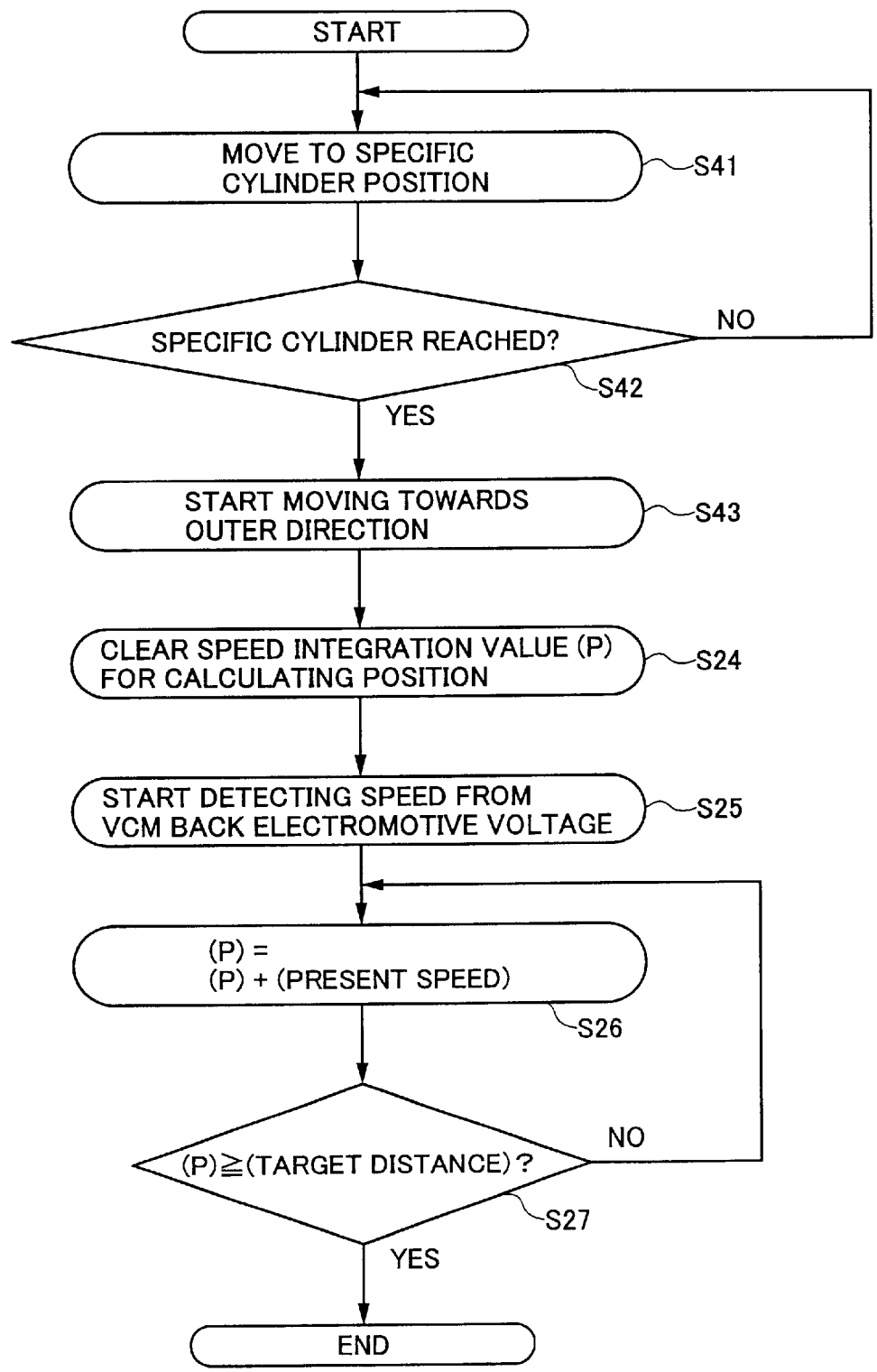
FIG. 15 is a flow chart for explaining a process which judges whether or not the head reached the target position using a reference position on a disk.

FIG. 15 is a flow chart for explaining a process which judges whether or not the head 5 reached the target position by using the reference position on the disk 3, by the functional block shown in FIG. 12. The process shown in FIG. 15 corresponds to the processes of the MPU 25 and the SVC 27 shown in FIG. 2. In FIG. 15, those steps which are the same as those corresponding steps in FIG. 13 are designated by the same reference numerals, and a description thereof will be omitted.

In FIG. 15, a step S41 moves the head 5 to a reference position on the disk 3, that is, to a specific cylinder position. A step S42 decides whether or not the head 5 has reached the specific cylinder position, based on the Gray code which indicates the cylinder number and the sector number within the servo field in the signal which is read from the disk 3. When the decision result in the step S42 becomes YES, a step S43 starts to move the head 5 towards the outer periphery of the disk 3, and the steps S24 through S27 are carried out thereafter.

Figure 16:
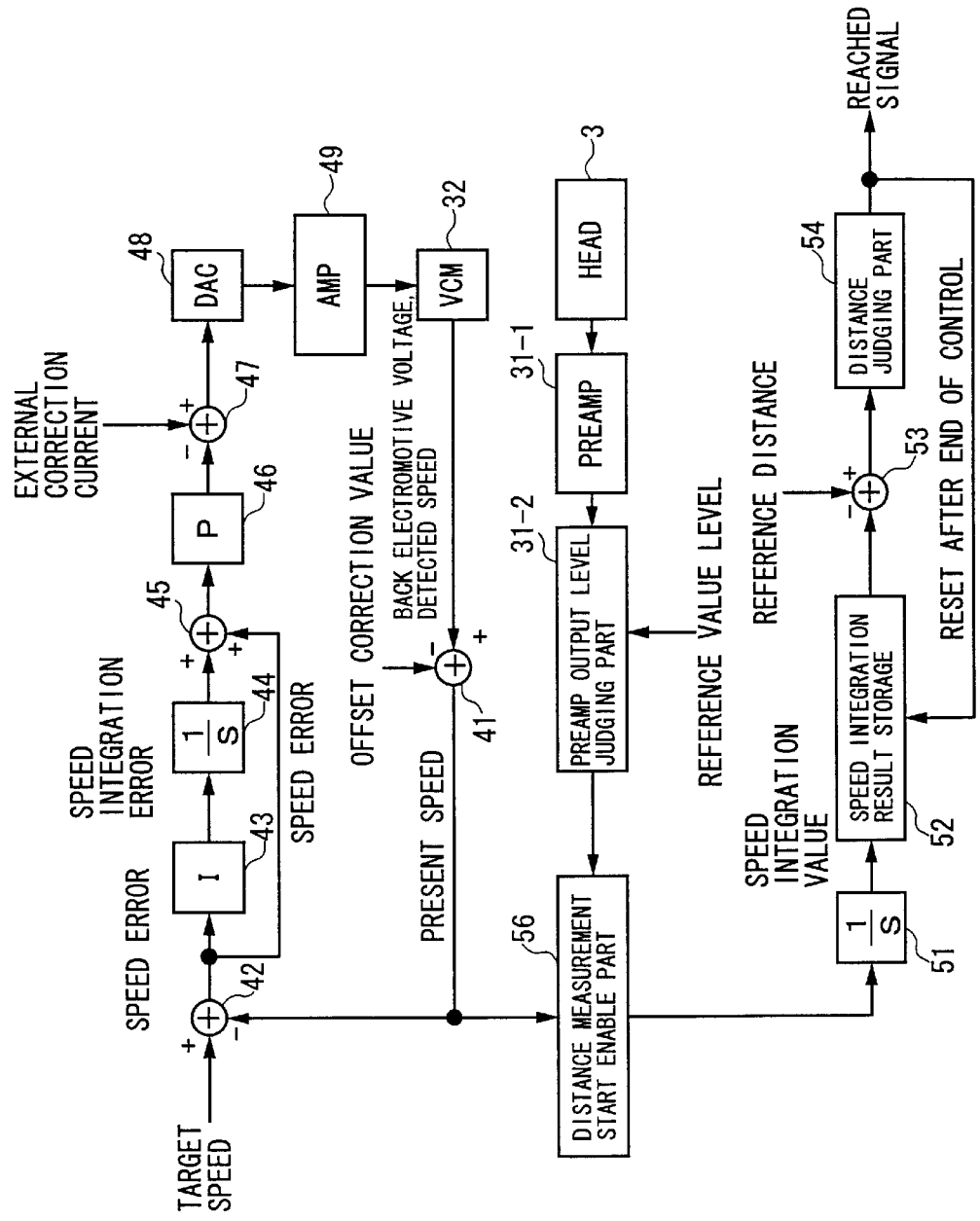
FIG. 16 is a functional block diagram showing a head speed control section and a head position detecting section of the control system.

FIG. 16 is a functional block diagram showing a head speed control section and a head position detecting section of the control system. The control system shown in FIG. 16 is realized by the MPU 25 and the SVC 27 shown in FIG. 2. In FIG. 16, those parts which are the same as those corresponding parts in FIG. 12 are designated by the same reference numerals, and a description thereof will be omitted.

In the control system shown in FIG. 16, the read signal output from the head 5 is supplied to a preamplifier output level judging part 31-2 via a preamplifier 31-1 within the head IC 31. A reference value level is also supplied to the preamplifier output level judging part 31-2. The preamplifier output level judging part 31-2 supplies an enable signal to a distance measurement start enable part 56 when the level of the read signal from the preamplifier 31-1 is smaller than the reference value level. The distance measurement start enable part 56 receives the present speed of the head 5 from the subtracter 41, and supplies the present speed to the integrator 51 only when the enable signal is received from the preamplifier output level judging part 31-2. Hence, the reference position during the ramp unload operation is set to the position where it no longer becomes possible to read the signal from the preamplifier 31-1.

Figure 17:
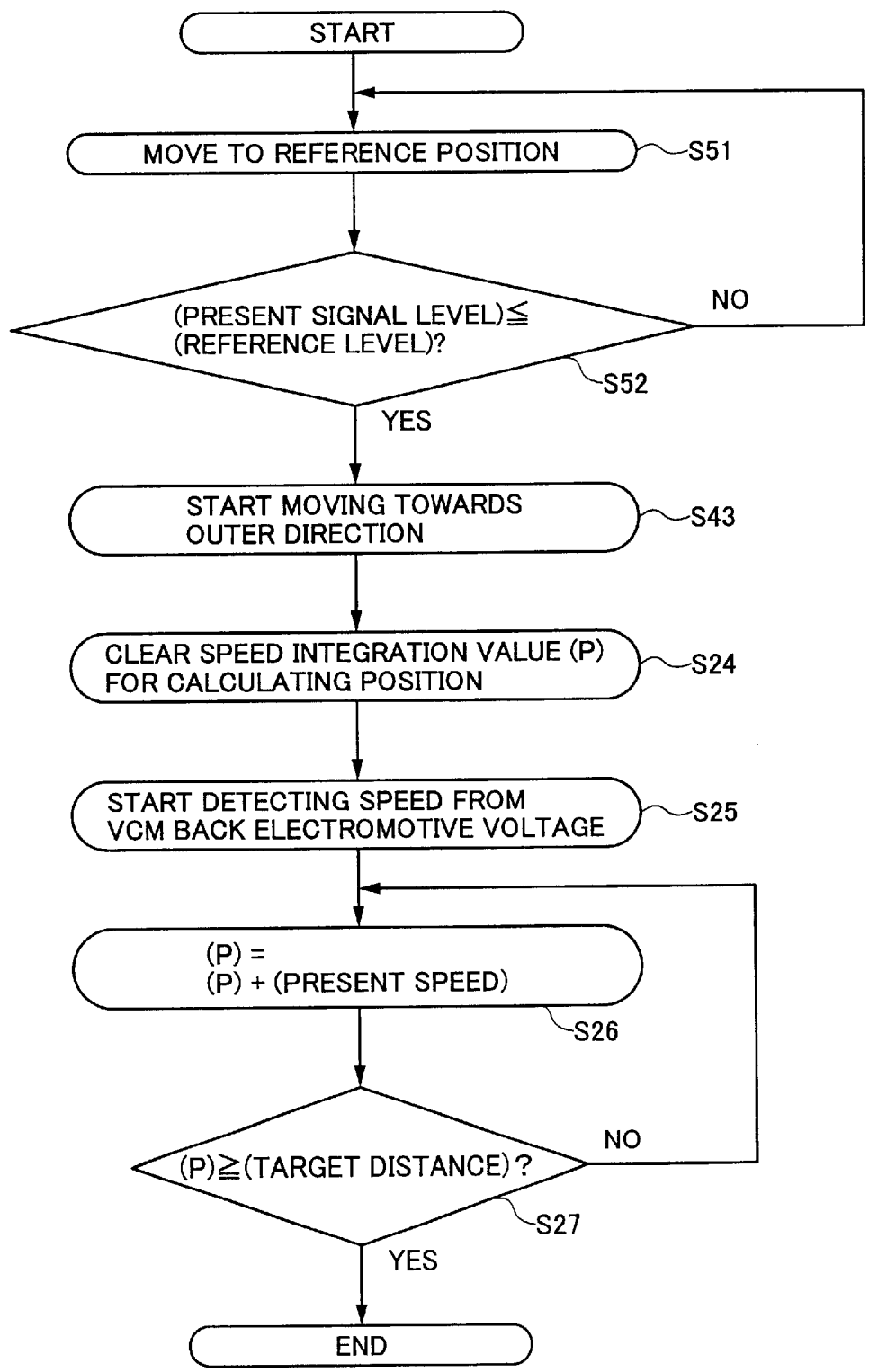
FIG. 17 is a flow chart for explaining a process which judges whether or not the head reached the target position using a reference position where it no longer becomes possible to read a signal from a preamplifier.

FIG. 17 is a flow chart for explaining a process which judges whether or not the head 5 has reached the target position by using the reference position where it no longer becomes possible to read the signal from the preamplifier 31-1, by the functional block shown in FIG. 16. The process shown in FIG. 17 corresponds to the processes of the MPU 25 and the SVC 27 shown in FIG. 2. In FIG. 17, those steps which are the same as those corresponding steps in FIG. 15 are designated by the same reference numerals, and a description thereof will be omitted.

In FIG. 17, a step S51 moves the head 5 to the reference position by setting the reference position to a position of the head 5 at the time when the read signal from the preamplifier 31-1 becomes smaller than a reference level. A step S52 decides whether or not the present signal level read from the disk 3 is less than or equal to the reference level. When the decision result in the step S52 becomes YES, the step S43 starts to move the head 5 towards the outer periphery of the disk 3, and the steps S24 through S27 are carried out thereafter.

Figure 18:
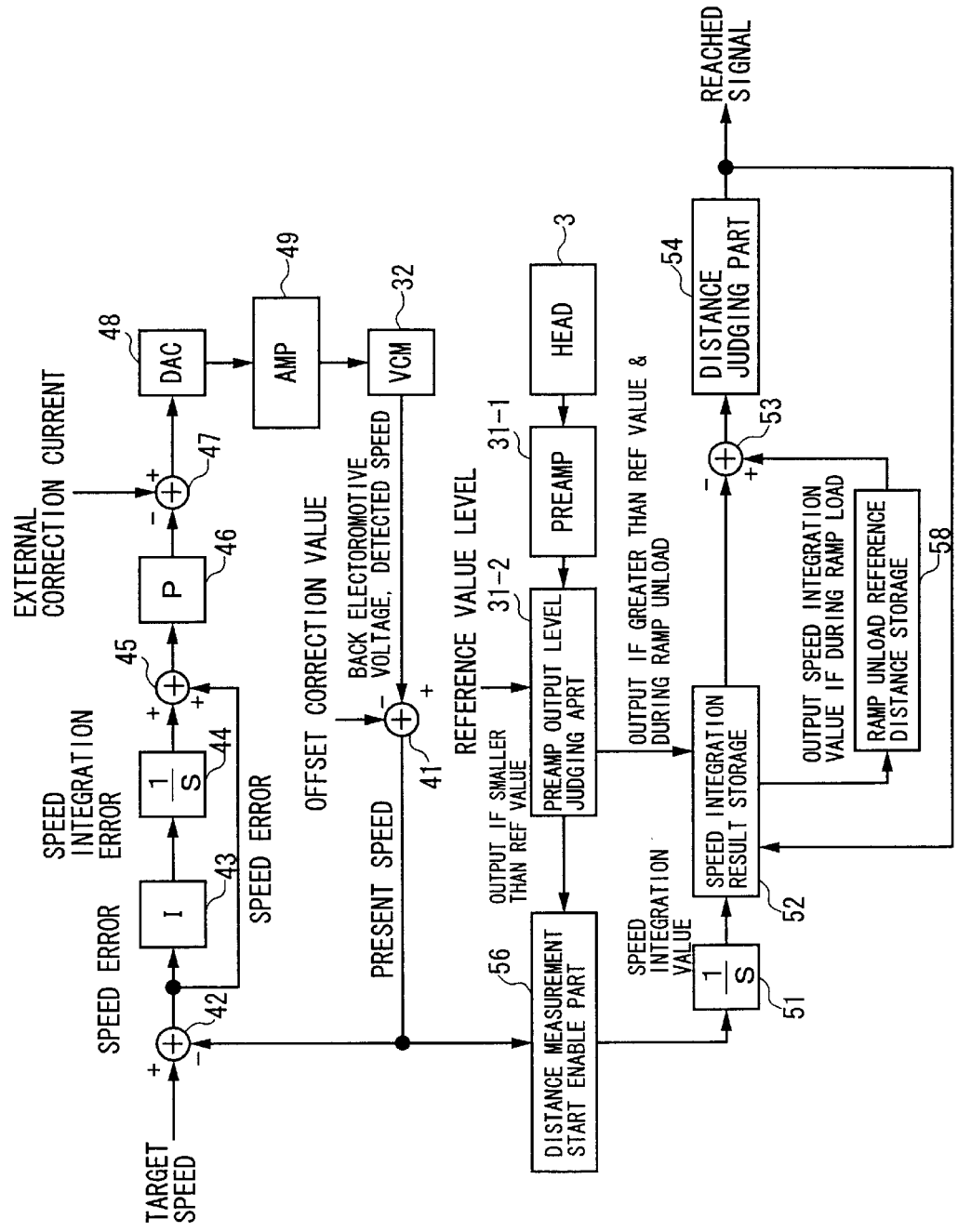
FIG. 18 is a functional block diagram showing a head speed control section and a head position detecting section of the control system.

FIG. 18 is a functional block diagram showing a head speed control section and a head position detecting section of the control system. The control system shown in FIG. 18 is realized by the MPU 25 and the SVC 27 shown in FIG. 2. In FIG. 18, those parts which are the same as those corresponding parts in FIG. 16 are designated by the same reference numerals, and a description thereof will be omitted.

In the control system shown in FIG. 18, when the output signal level of the preamplifier 31-1 is greater than a reference value and the ramp load operation is being carried out, the preamplifier output level judging part 31-2 supplies a status signal indicating this state to the speed integration result storage 52. When the speed integration result storage 52 receives the status signal from the preamplifier output level judging part 31-2, the speed integration result storage 52 supplies the speed integration value stored therein to a ramp unload reference distance storage 58. Thus, the stored speed integration value at the time of the ramp load operation is stored in the ramp unload reference distance storage 58. The stored speed integration value at the time of the ramp load operation is supplied to the subtracter 53 as the reference distance. Accordingly, by carrying out the speed integration from the terminal position P7 of the parking area 6-1 and storing in the ramp unload reference distance storage 58 the distance to the position where the read signal from the preamplifier 31-1 can be obtained during the ramp load operation, the reference position for the ramp unload operation is set based on the reference distance which is stored in the ramp unload reference distance storage 58.

Figure 19:
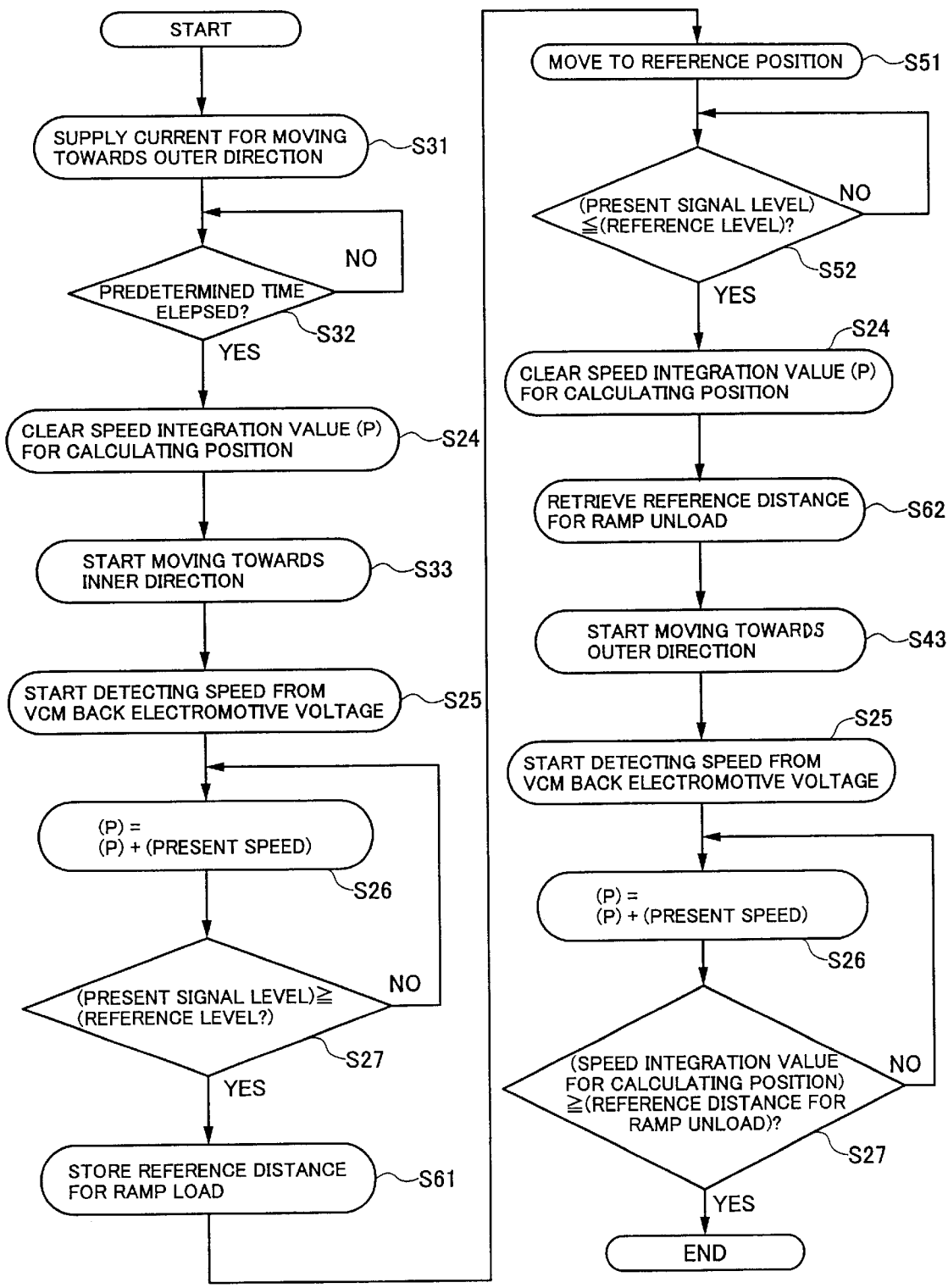
FIG. 19 is a flow chart for explaining a process which sets a reference position for the ramp unload operation based on a distance to a position where a signal can be read from the preamplifier at the time of the ramp load operation.

FIG. 19 is a flow chart for explaining a process which sets the reference position for the ramp unload operation based on the distance to the position where the read signal can be obtained from the preamplifier 31-1 at the time of the ramp load operation, by the functional block shown in FIG. 18. The process shown in FIG. 19 corresponds to the processes of the MPU 25 and the SVC 27 shown in FIG. 2. In FIG. 19, those steps which are the same as those corresponding steps in FIGS. 13, 14 and 17 are designated by the same reference numerals, and a description thereof will be omitted.

In FIG. 19, after the steps S31, S32, S24, S33, S25 and S26, if the decision result in the step S27 is YES, a step S61 stores in the ramp unload reference distance storage 58 the distance to the position where the read signal can be obtained from the preamplifier 31-1 from the time when the head 5 starts to move from the terminal position P7 of the parking area 6-1 during the ramp load operation. The process advances to the step S51 after the step S61. After the steps S52 and S24, a step S62 retrieves the distance stored in the ramp unload reference distance storage 58, and uses this distance as the reference distance. After the step S62, the process successively advances to the steps S43, S25, S26 and S27.

Figure 20:
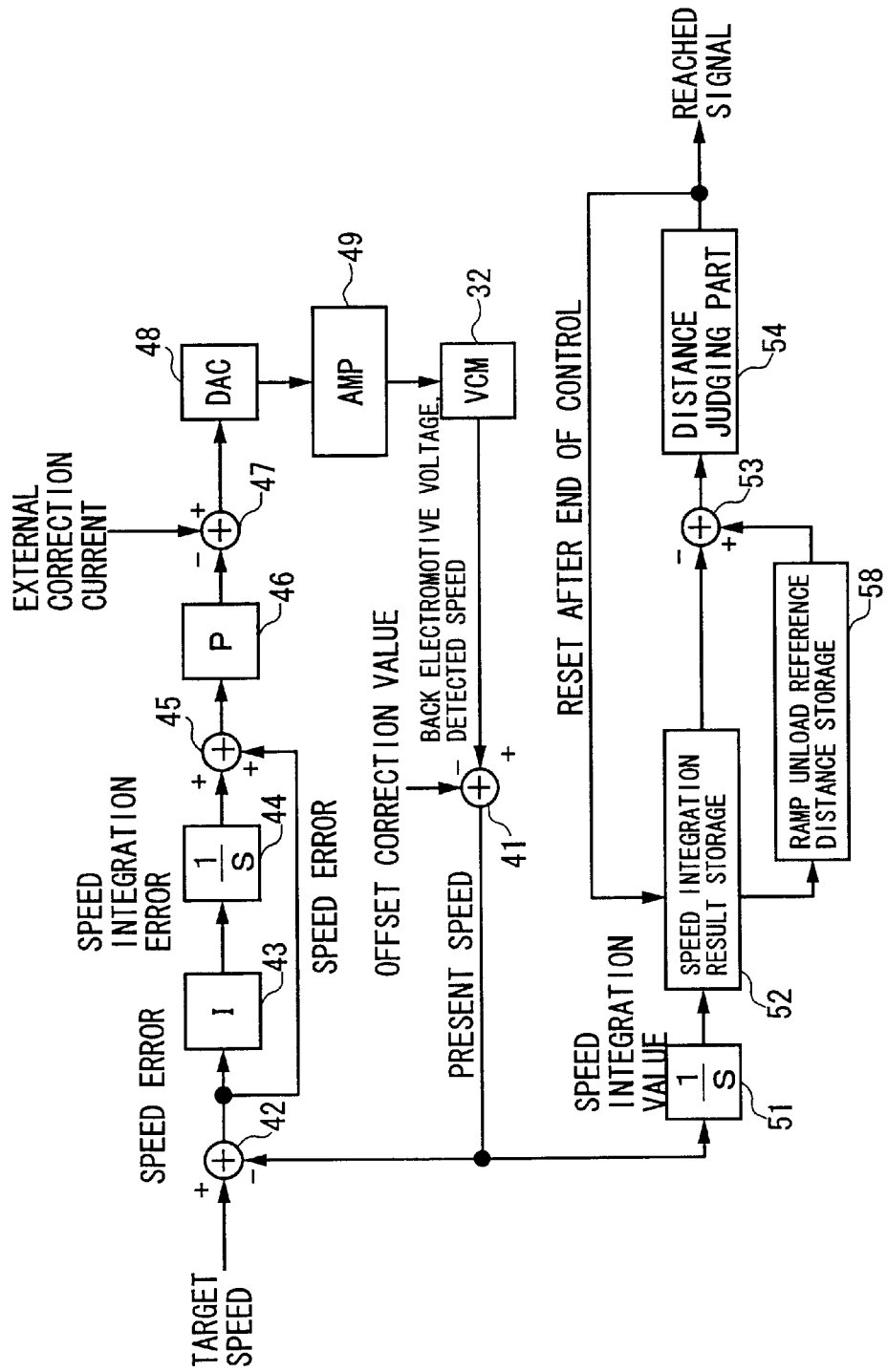
FIG. 20 is a functional block diagram showing a head speed control section and a head position detecting section of the control system.

FIG. 20 is a functional block diagram showing a head speed control section and a head position detecting section of the control system. The control system shown in FIG. 20 is realized by the MPU 25 and the SVC 27 shown in FIG. 2. In FIG. 20, those parts which are the same as those corresponding parts in FIGS. 12 and 18 are designated by the same reference numerals, and a description thereof will be omitted.

In the control system shown in FIG. 20, the speed integration result storage 52 supplies the stored speed integration value to the ramp unload reference distance storage 58 during the ramp load operation. Hence, the speed integration value at the time of the ramp load operation is stored in the ramp unload reference distance storage 58. The stored speed integration value at the time of the ramp load operation is supplied to the subtracter 53 as the reference distance. Accordingly, when the speed integration is carried out from the terminal position P7 of the parking area 6-1 and the specific cylinder on the disk 3, that is, the position where a specific Gray code can be read, is reached, the distance to this specific cylinder is stored in the ramp unload reference distance storage 58. As a result, the reference position for the ramp unload operation is set based on the reference distance stored in the ramp unload reference distance storage 58.

Figure 21:
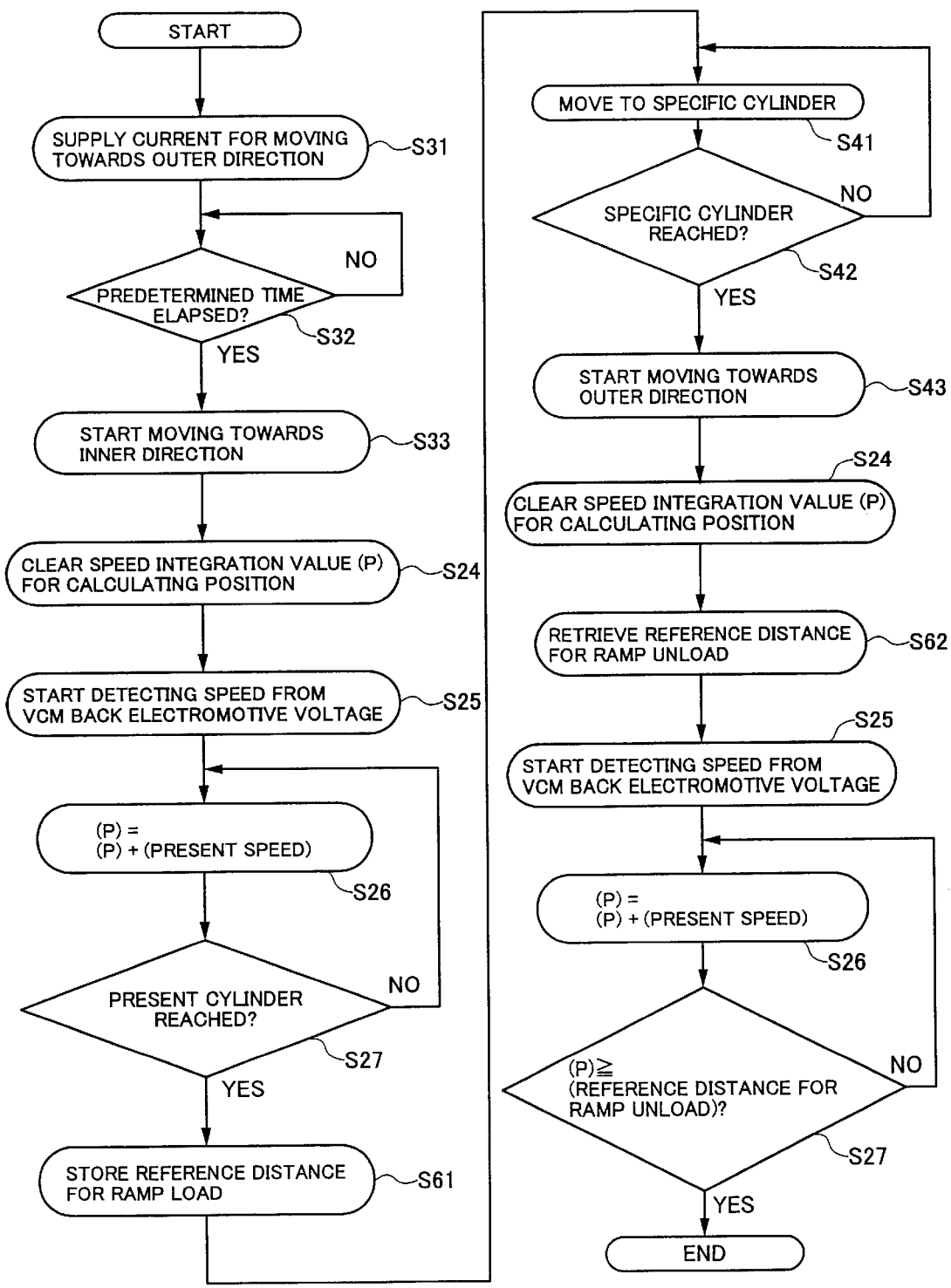
FIG. 21 is a flow chart for explaining a process which sets a reference position for the ramp unload operation based on a distance to a specific cylinder at the time of the ramp load operation.

FIG. 21 is a flow chart for explaining a process which sets the reference position for the ramp unload operation based on the distance to the specific cylinder at the time of the ramp load operation, by the functional block shown in FIG. 20. The process shown in FIG. 21 corresponds to the process of the MPU 25 and the SVC 27 shown in FIG. 2. In FIG. 21, those steps which are the same as those corresponding steps in FIGS. 13 through 15, 17 and 18 are designated by the same reference numerals, and a description thereof will be omitted.

In FIG. 21, after the steps S31, S32, S33, S24, S25 and S26, if the decision result in the step S27 is YES, the step S61 stores in the ramp unload reference distance storage 58 the distance to the specific cylinder from the time when the head 5 starts to move from the terminal position P7 of the parking area 6-1 at the time of the ramp load operation, and the process advances to the step S41. After the steps S42, S43 and S24, the step S62 retrieves the distance stored in the ramp unload reference distance storage 58, and uses this distance as the reference distance. After the step S62, the process successively advances to the steps S25, S26 and S27.

Figure 22:
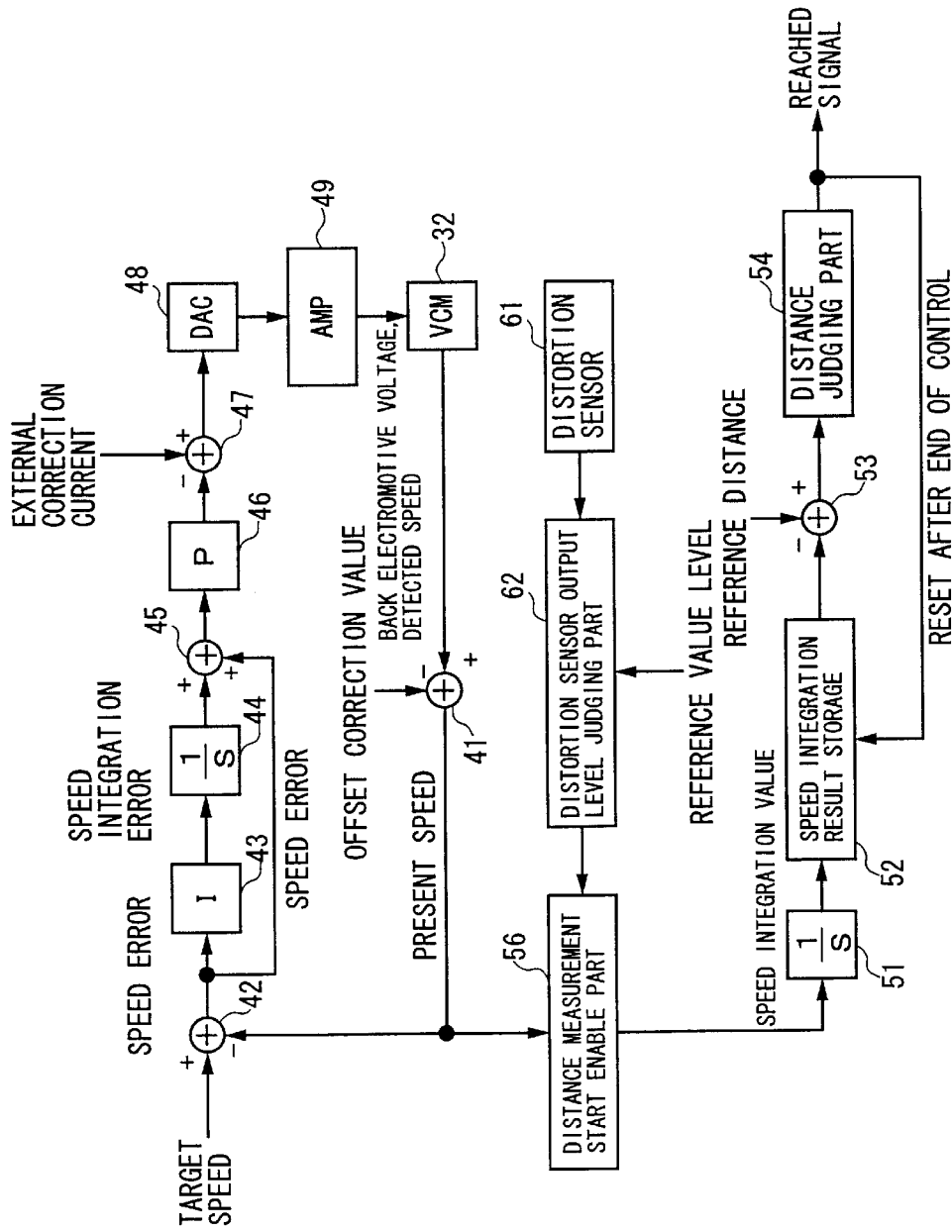
FIG. 22 is a functional block diagram showing a head speed control section and a head position detecting section of the control system.

FIG. 22 is a functional block diagram showing a head speed control section and a head position detecting section of the control system. The control system shown in FIG. 22 is realized by the MPU 25 and the SVC 27 shown in FIG. 2. In FIG. 22, those parts which are the same as those corresponding parts in FIG. 16 are designated by the same reference numerals, and a description thereof will be omitted.

In the control system shown in FIG. 22, a distortion sensor 61 detects a distortion of a suspension 4-1 of the arm 4 which supports the head 5, and supplies a distortion detection signal to a distortion sensor output level judging part 62.

Figure 23:
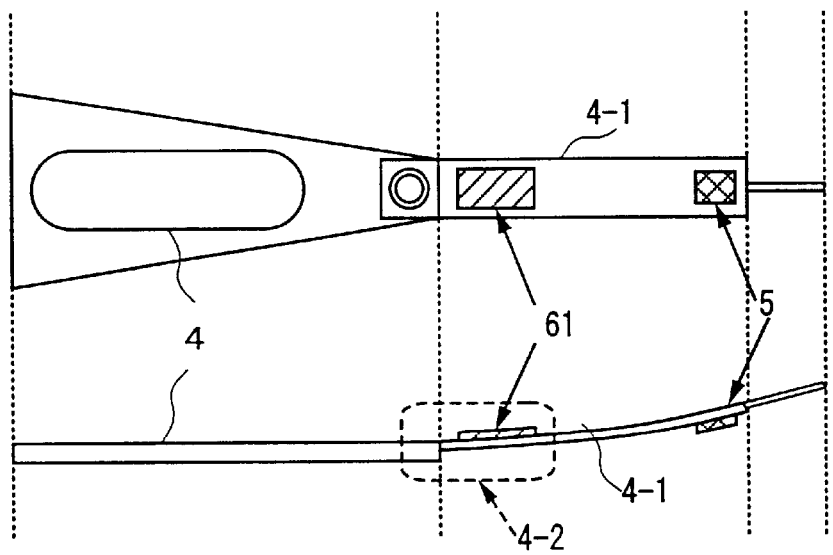
FIGS. 23A and 23B are a plan view and a side view respectively showing a mounting position of a distortion sensor.

FIGS. 23A and 23B respectively are a plan view and a side view respectively showing a mounting position of the distortion sensor 61. FIG. 23A shows a plan view of the arm 4, and FIG. 23B shows a side view of the arm 4. For the sake of convenience, both FIGS. 23A and 23B show a state where the suspension 4-1 rides on the ramp member 6. The distortion sensor 61 is mounted on the suspension 4-1 within a region 4-2 where the distortion of the suspension 4-1 is a maximum.

Returning now to the description of FIG. 22, A reference value level is supplied to the distortion sensor output level judging part 62. This distortion sensor output level judging part 62 supplies an enable signal to the distance calculation start enable part 56 when the distortion detection signal from the distortion sensor 61 is greater than the reference value level. The distance calculation start enable part 56 receives the present speed of the head 5 from the subtracter 41, and supplies the present speed to the integrator 51 only when the enable signal is received. Hence, the reference position at the time of the ramp unload operation is set to a position where the suspension 4-1 of the arm 4 rides on the ramp member 6 and the distortion of the suspension 4-1 detected by the distortion sensor 61 becomes larger than the reference value.

Figure 24:
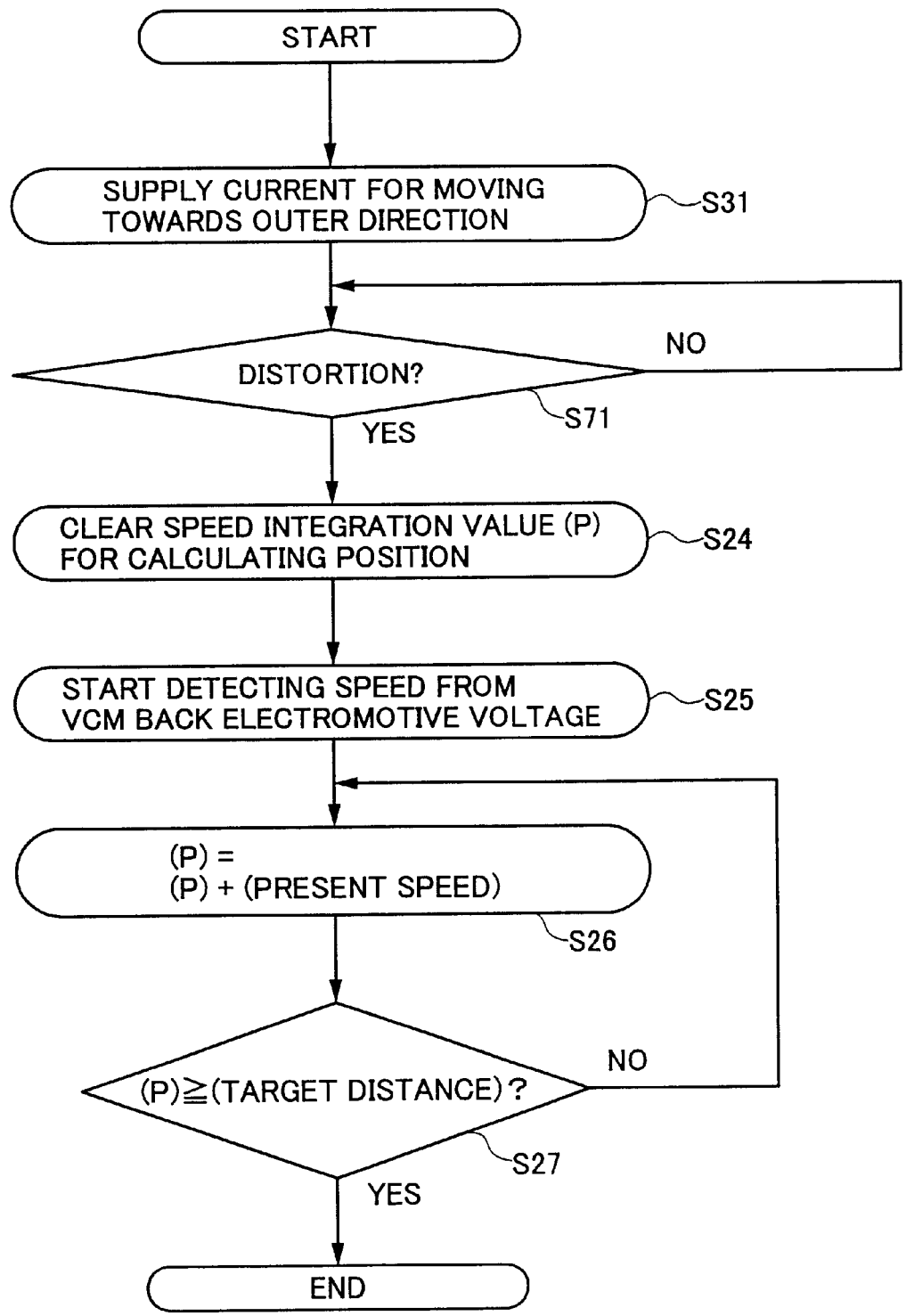
FIG. 24 is a flow chart for explaining a process which sets a reference position for the ramp load operation based on a distortion of a suspension.

FIG. 24 is a flow chart for explaining a process which sets the reference position for the ramp unload operation based on the distortion of the suspension 4-1, by the functional block shown in FIG. 22. The process shown in FIG. 24 corresponds to the processes of the MPU 25 and the SVC 27 shown in FIG. 2. In FIG. 24, those steps which are the same as those corresponding steps in FIG. 15 are designated by the same reference numerals, and a description thereof will be omitted.

In FIG. 24, after the step S31, a step S71 decides whether or not the distortion detection signal from the distortion sensor 61 is greater than the reference value. If the decision result in the step S71 becomes YES, the process successively advances to the steps S24, S25, S26 and S27.

Figure 25:
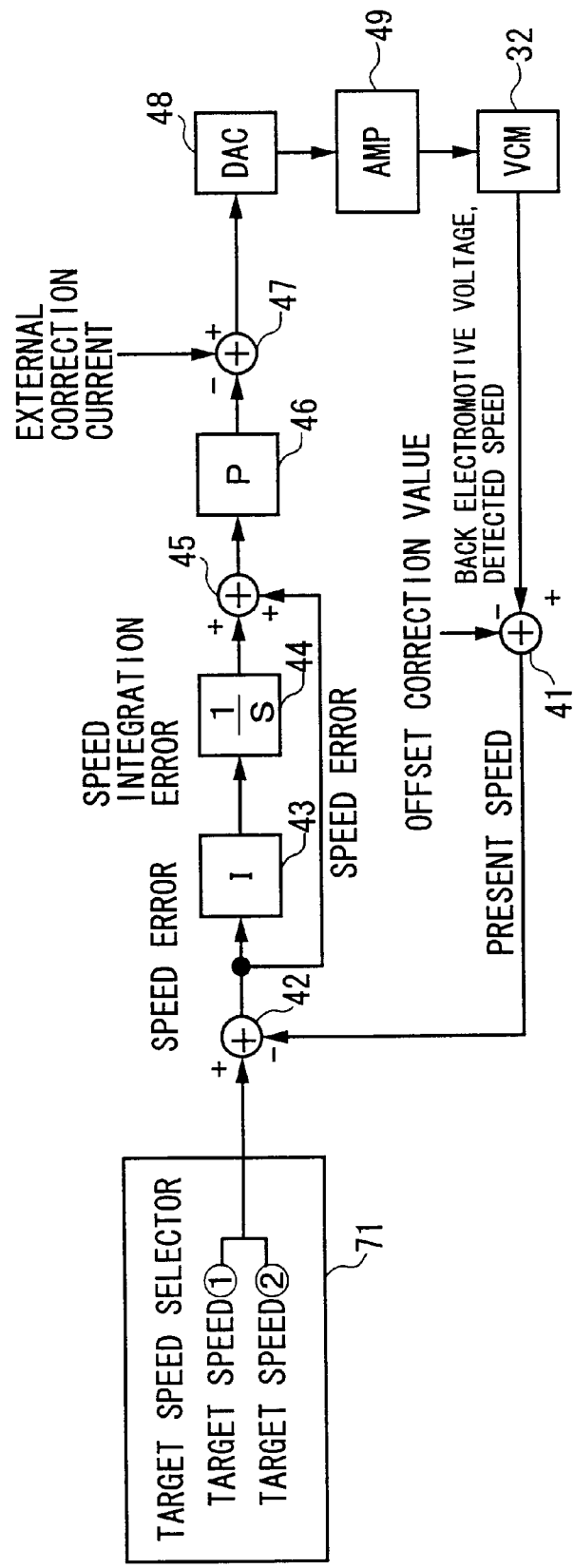
FIG. 25 is a functional block diagram showing a head speed control section of the control system.

FIG. 25 is a functional block diagram showing a head speed control section of the control system. The control system shown in FIG. 25 is realized by the MPU 25 and the SVC 27 shown in FIG. 2. In FIG. 25, those parts which are the same as those corresponding parts in FIG. 10 are designated by the same reference numerals, and a description thereof will be omitted.

In the control system shown in FIG. 25, a target speed selector 71 switches and sets the target speed of the head 5 for the ramp load operation and/or the ramp unload operation to one of a plurality of target speeds. In this embodiment, it is assumed for the sake of convenience that the target speed is switched between two target speeds ① and ②. Each of the target speeds ① and ② is supplied to the subtracter 42 as the target speed. The plurality of target speeds set in the target speed selector 71 may be supplied from the host system, for example, to the MPU 25 and the SVC 27 via the HDC 21. Hence, the target speed can be switched and set to one of the plurality of target speeds during the ramp load operation and/or the ramp unload operation, so that the head speed is controlled to a speed suited for the head position. In other words, it is possible to variably control the head speed during the ramp load operation and/or the ramp unload operation.

Figure 26:
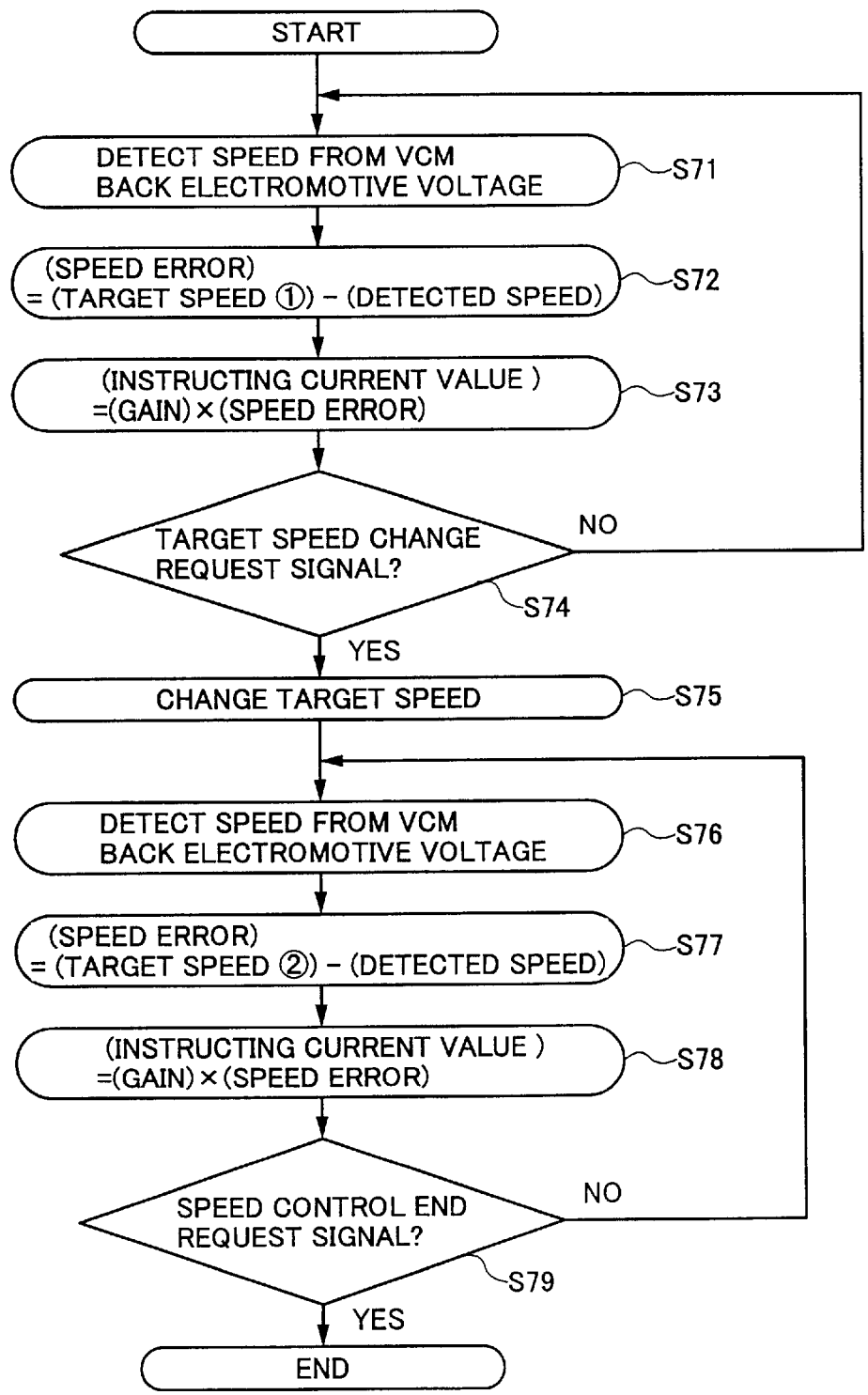
FIG. 26 is a flow chart for explaining a process which variably controls a head speed during the ramp load operation and/or the ramp unload operation.

FIG. 26 is a flow chart for explaining a process which variably controls the head speed during the ramp load operation and/or the ramp unload operation, by the functional block shown in FIG. 25. In FIG. 26, a step S71 detects the head speed from the back electromotive voltage of the VCM 32, and a step S72 obtains a speed error by subtracting the detected head speed from the target speed ①. A step S73 multiplies a predetermined gain to the speed error, and obtains an instructing current value for the VCM 32. A step S74 decides whether or not a target speed change request signal is received from the target speed selector 71, and the process returns to the step S71 if the decision result in the step S74 is NO.

On the other hand, if the decision result in the step S74 is YES, a step S75 changes the target speed ① to the target speed ② prior to the change. A step S76 detects the head speed from the back electromotive voltage of the VCM 32, and a step S77 obtains the speed error by subtracting the detected head speed from the target speed ②. A step S78 multiplies a predetermined gain to the speed error, and obtains an instructing current value for the VCM 32. A step S79 decides whether or not a speed control end request signal is received, and the process returns to the step S76 if the decision result in the step S79 is NO. The process ends if the decision result in the step S79 is YES.

Figure 27:
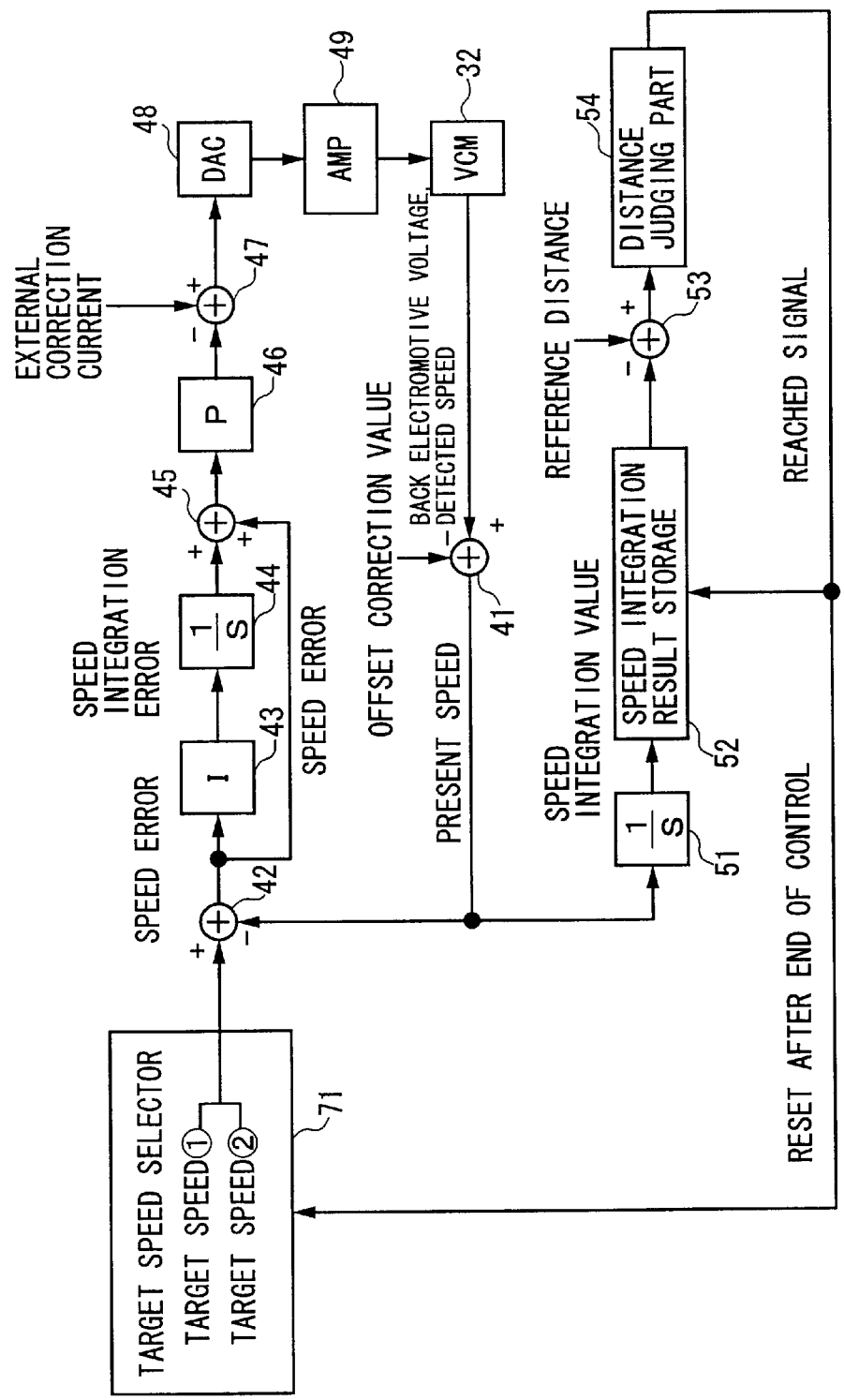
FIG. 27 is a functional block diagram showing a head speed control section and a head position detecting section of the control system.

FIG. 27 is a functional block diagram showing a head speed control section and a head position detecting section of the control system. The control system shown in FIG. 27 is realized by the MPU 25 and the SVC 27 shown in FIG. 2. In FIG. 27, those parts which are the same as those corresponding parts in FIG. 25 are designated by the same reference numerals, and a description thereof will be omitted.

In the control system shown in FIG. 27, the target speed selector 71 switches and sets the target speed of the head 5 for the ramp load operation and/or the ramp unload operation to one of a plurality of target speeds in response to the reached signal from the distance judging part 54. In this embodiment, it is assumed for the sake of convenience that the target speed selector 71 outputs the target speed ① before the reached signal is received, and outputs the target speed ② after the reached signal is received.

Figure 28:
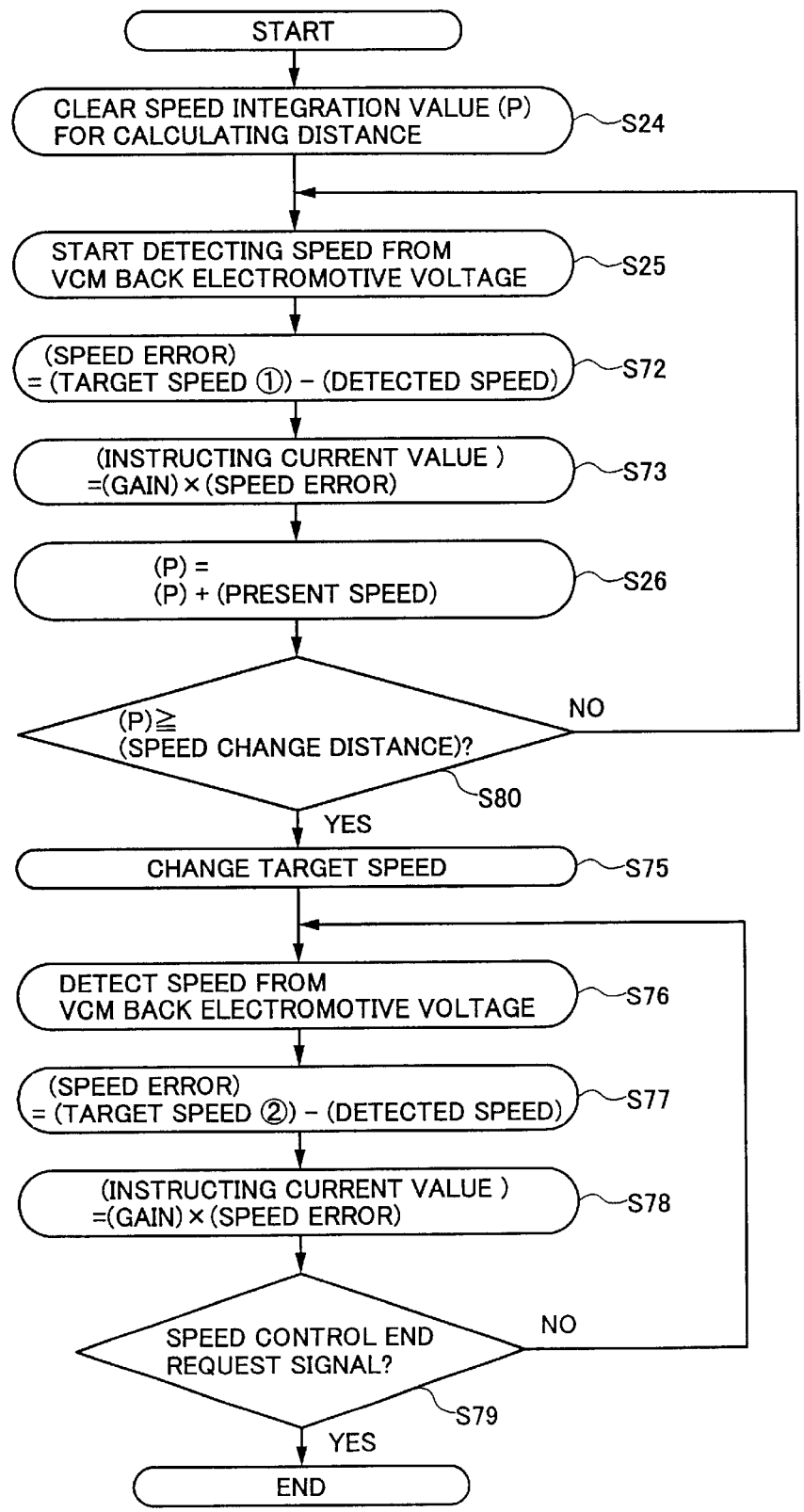
FIG. 28 is a flow chart for explaining a process which variably controls the head speed during the ramp load operation and/or the ramp unload operation.

FIG. 28 is a flow chart for explaining a process which variably controls the head speed during the ramp load operation and/or the ramp unload operation, by the functional block shown in FIG. 27. In FIG. 28, those steps which are the same as those corresponding steps in FIGS. 13 and 26 are designated by the same reference numerals, and a description thereof will be omitted. In FIG. 28, after the steps S24, S25, S72, S73 and S26 are successively carried out, a step S80 decides whether or not the moving distance (P) of the head 5 is greater than or equal to a distance at which the speed change is to be made. The process returns to the step S25 if the decision result in the step S80 is NO. On the other hand, if the decision result in the step S80 is YES, the process advances to the step S75, and the steps S75 through S79 are successively carried out. Hence, when the head 5 reaches the position which is set in advance, it is possible to control the head speed to the target speed which is set in advance.

Figure 29:
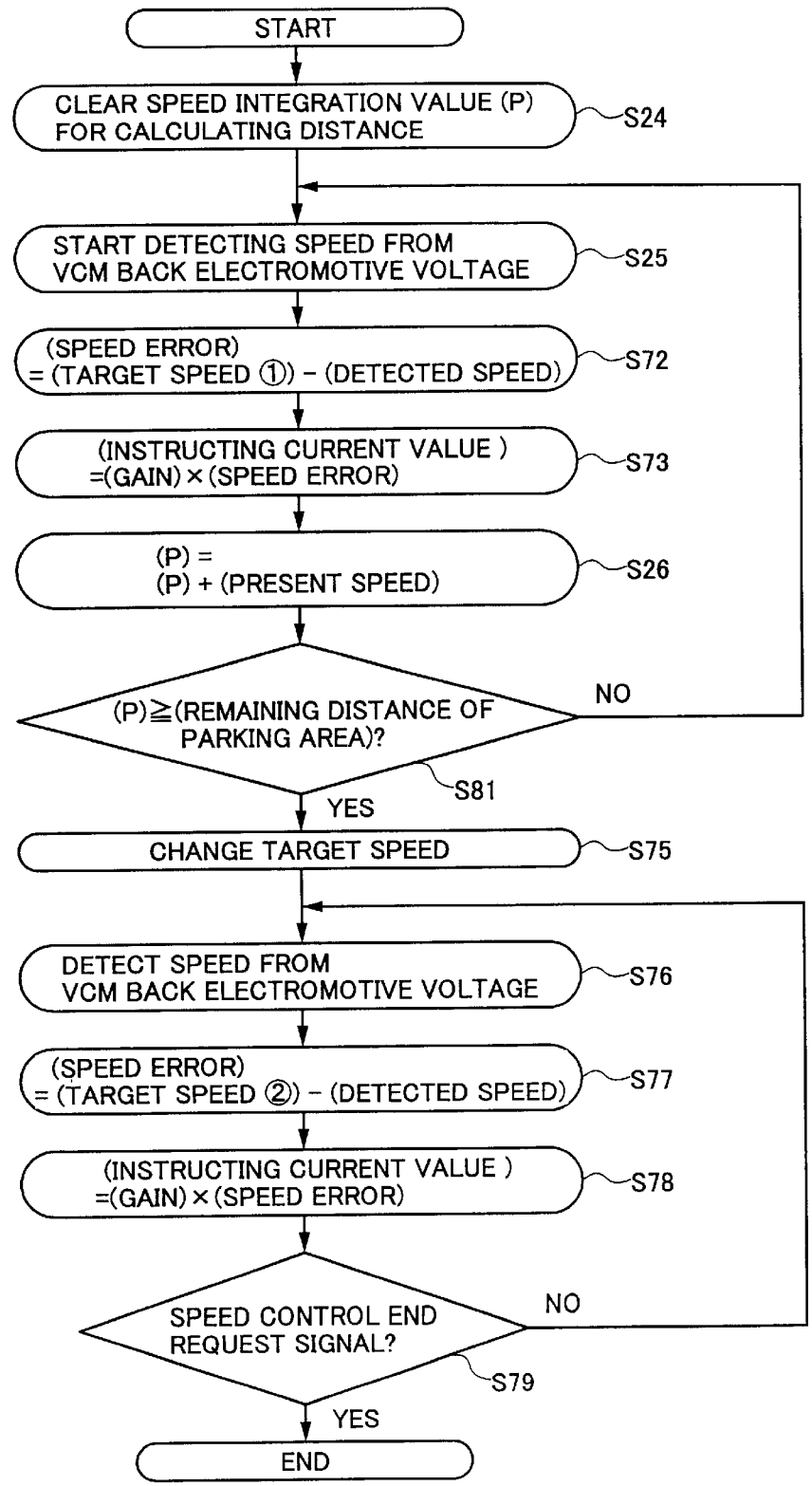
FIG. 29 is a flow chart for explaining a process which variably controls the head speed during the ramp load operation and/or the ramp unload operation.

FIG. 29 is a flow chart for explaining a process which variably controls the head speed during the ramp load operation and/or the ramp unload operation, by the functional block shown in FIG. 27. In FIG. 29, those steps which are the same as those corresponding steps in FIG. 28 are designated by the same reference numerals, and a description thereof will be omitted. In FIG. 29, a step S81 decides whether or not the moving distance (P) of the head 5 is greater than or equal to a remaining distance to the parking area 6-1 of the ramp member 6. The process returns to the step S25 if the decision result in the step S81 is NO. On the other hand, if the decision result in the step S81 is YES, the process advances to the step S75, and the steps S75 through S79 are successively carried out. As a result, when the head 5 approaches the parking area 6-1, it is possible control the head speed to the target speed which is set in advance, and the generation of the mechanical contact noise can be suppressed by appropriately reducing the head speed when the base portion of the arm 4 makes contact with the stopper 7.

Figure 30:
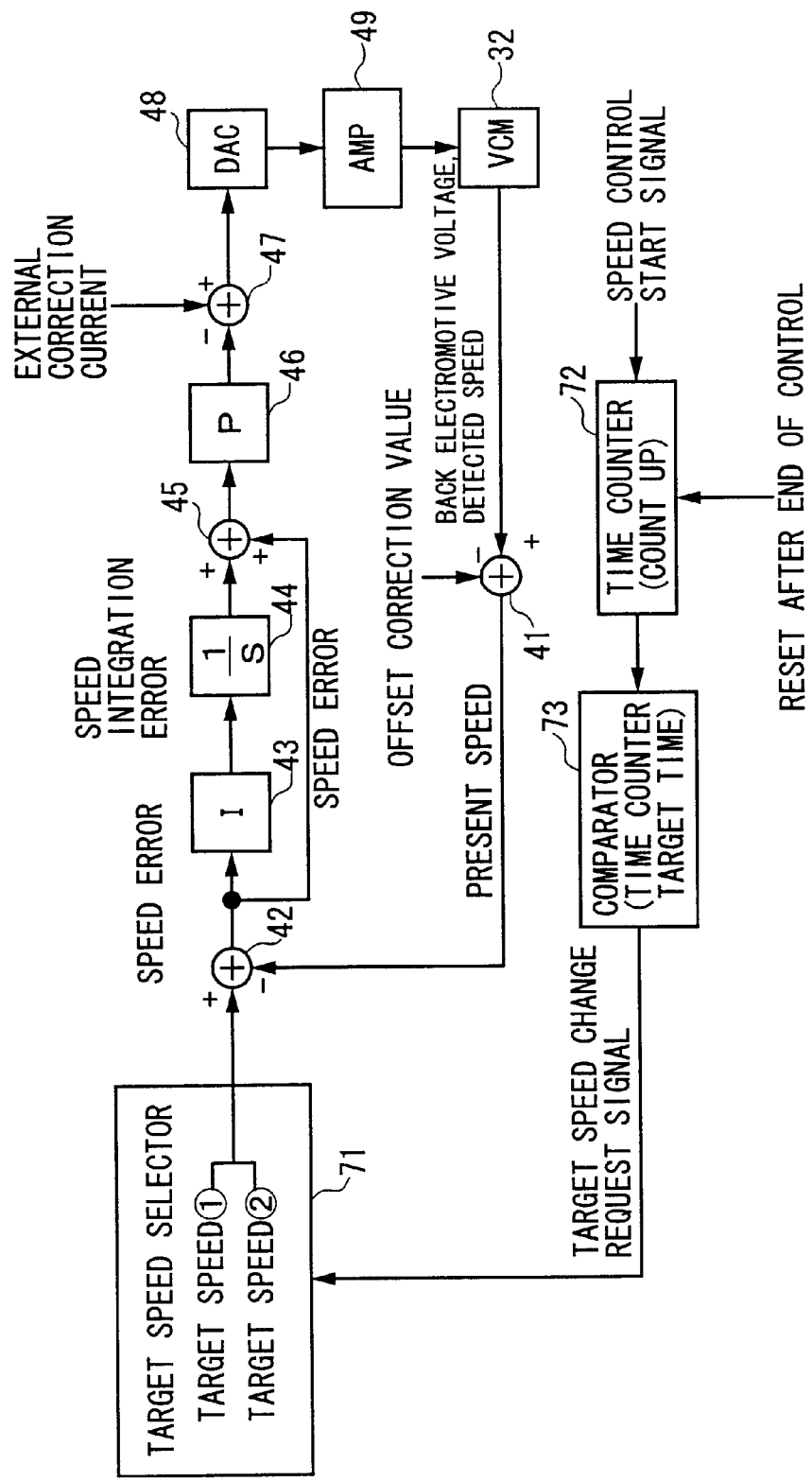
FIG. 30 is a functional block diagram showing a head speed control section and a head position detecting section of the control system.

FIG. 30 is a functional block diagram showing a head speed control section and a head position detecting section of the control system. The control system shown in FIG. 30 is realized by the MPU 25 and the SVC 27 shown in FIG. 2. In FIG. 30, those parts which are the same as those corresponding parts in FIG. 25 are designated by the same reference numerals, and a description thereof will be omitted.

In the control system shown in FIG. 30, the target speed selector 71 switches and sets the target speed of the head 5 for the ramp load operation and/or the ramp unload operation to one or a plurality of target speeds in response to the reached signal from the distance judging part 54. In this embodiment, a time counter 72 starts to count up the time in response to a speed control start signal, and is reset in response to a speed control end request signal. A counted value of the time counter 72 is supplied to a comparator 73 and is compared with a target time which is set in advance. The comparator 73 supplies a target speed change request signal which is dependent on the comparison result to the target speed selector 71. Hence, the target speed selector 71 outputs the target speed ① until the target time is reached, and outputs the target speed ② after the target sped is reached.

Figure 31:
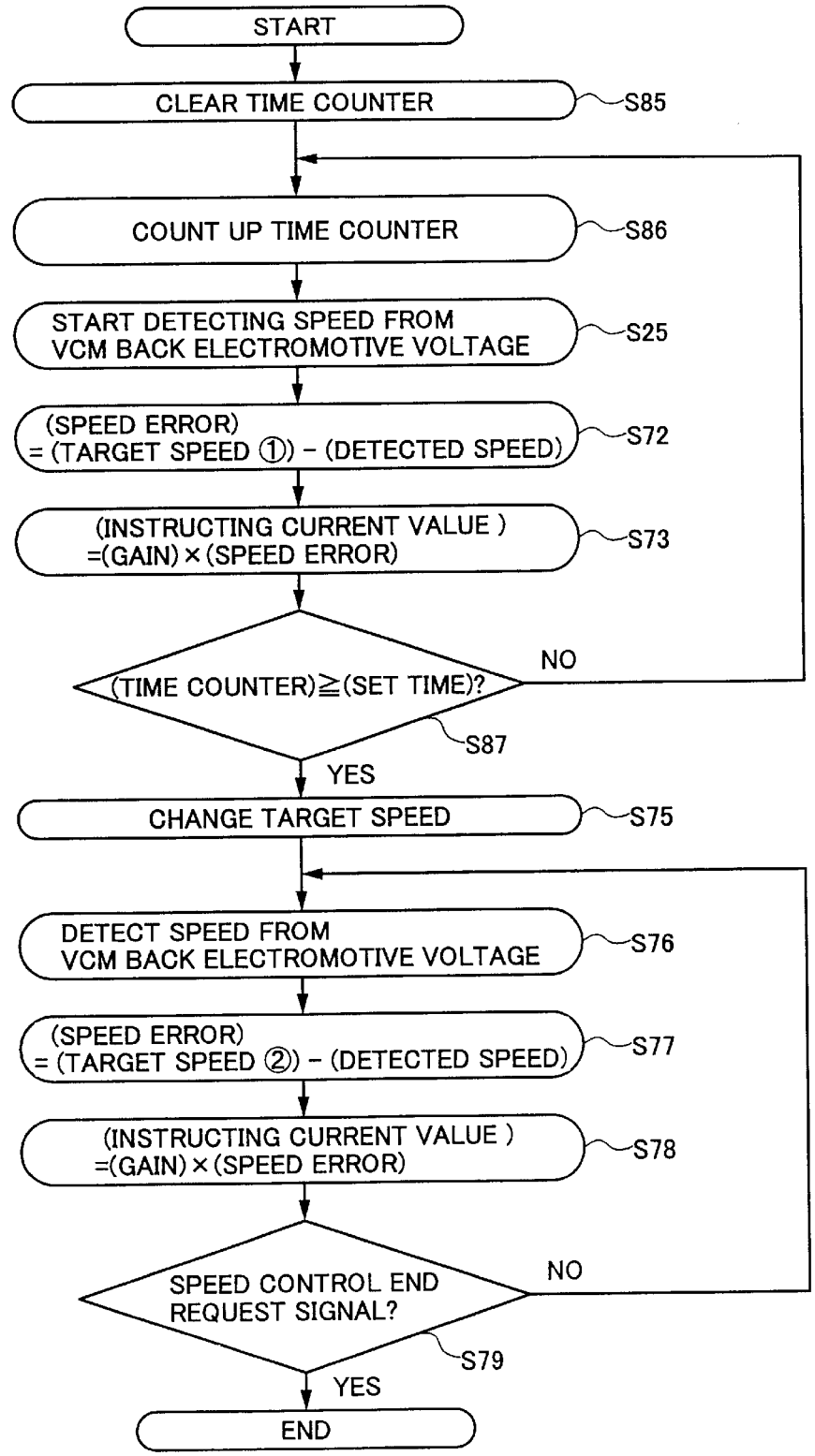
FIG. 31 is a flow chart for explaining a process which variably controls the head speed during the ramp load operation and/or the ramp unload operation.

FIG. 31 is a flow chart for explaining a process which variably controls the head speed during the ramp load operation and/or the ramp unload operation, by the functional block shown in FIG. 30. In FIG. 31, those steps which are the same as those corresponding steps in FIG. 26 are designated by the same reference numerals, and a description thereof will be omitted. In FIG. 31, a step S85 clears the time counter 72, and a step S86 starts the count up operation of the time counter 72. After the steps S25, S72 and S73 are successively carried out, a step S87 decides whether or not the counted value of the time counter 72 is greater than or equal to the target time. The process returns to the step S86 if the decision result in the step S87 is NO. On the other hand, if the decision result in the step S87 is YES, the steps S75 through S79 are successively carried out.

Figure 32:
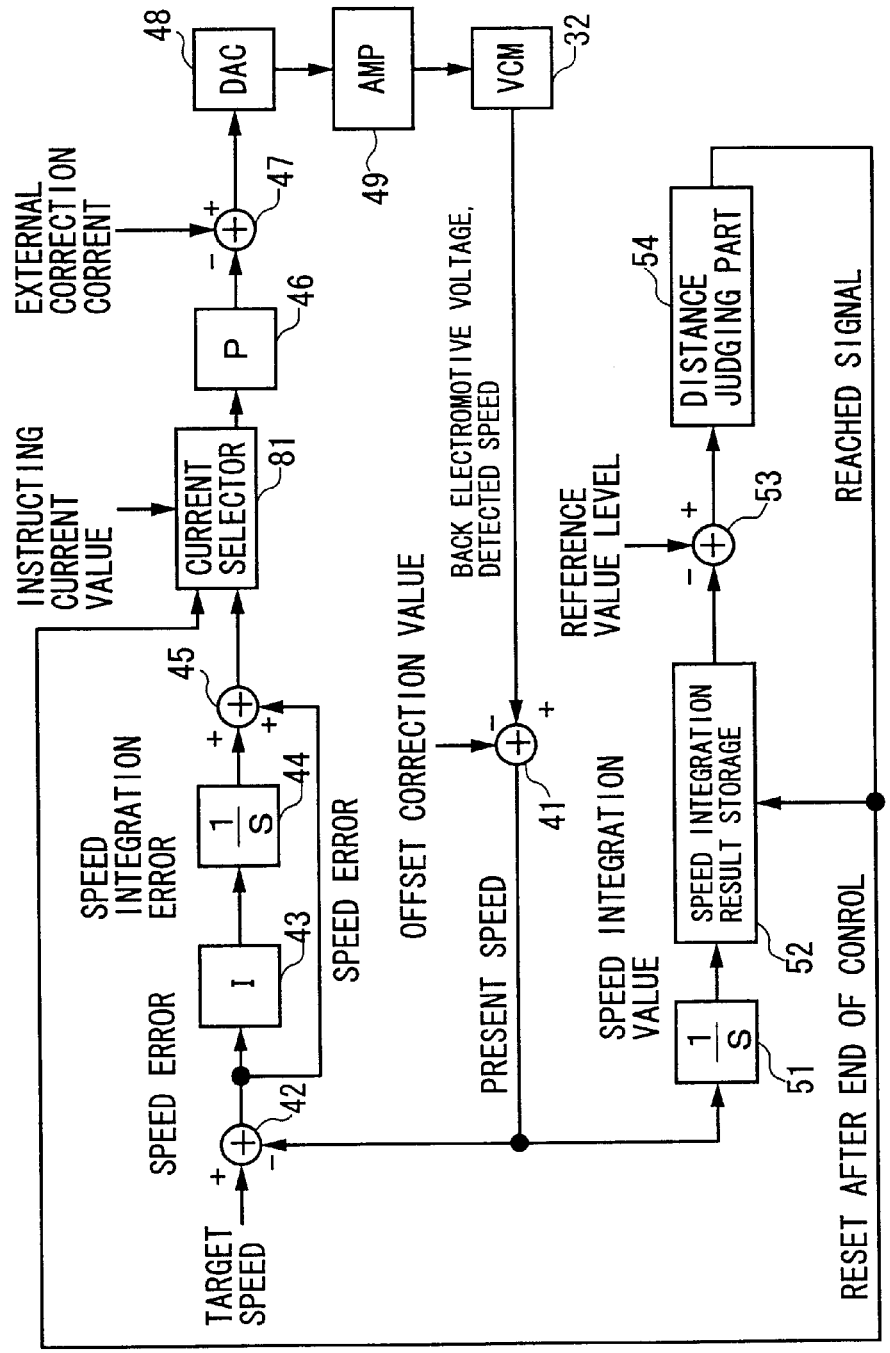
FIG. 32 is a functional block diagram showing a head speed control section and a head position detecting section of the control system.

FIG. 32 is a functional block diagram showing a head speed control section and a head position detecting section of the control system. The control system shown in FIG. 32 is realized by the MPU 25 and the SVC 27 shown in FIG. 2. In FIG. 32, those parts which are the same as those corresponding parts in FIG. 12 are designated by the same reference numerals, and a description thereof will be omitted.

In the control system shown in FIG. 32, a current selector 81 is provided between the adder 45 and the multiplier 46. An instructing current value and the reached signal from the distance judging part 54 are supplied to the current selector 81. The current selector 81 supplies the output of the adder 45 to the multiplier 46 before the reached signal is received, so that the speed control is carried out similarly as described above. In addition, after the reached signal is received, the current selector 81 supplies the instructing current value to the multiplier 46. In other words, the speed of the head 5 for the ramp load operation and/or the ramp unload operation can be controlled to a target speed dependent on the instructing current value which is set depending on the head position on the ramp member 6. For this reason, when the head 5 approaches the parking area 6-1 during the ramp unload operation, for example, it is possible to brake the head 5 by controlling the head speed to the target speed dependent on the instructing current value which is set in advance. Consequently, the head speed when the base portion of the arm 4 makes contact with the stopper 7 can be reduced appropriately so as to suppress the generation of the mechanical contact noise.

Figure 33:
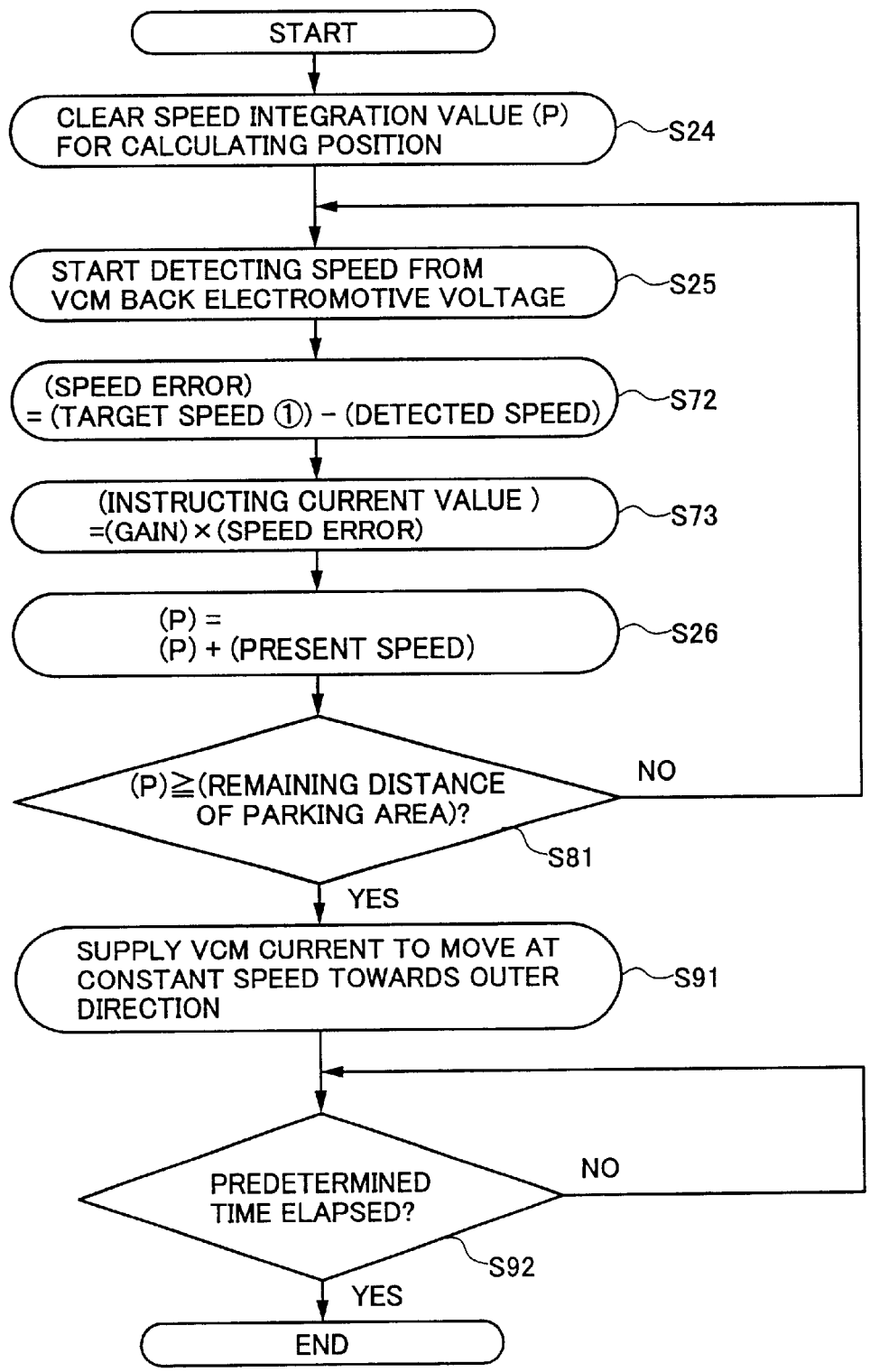
FIG. 33 is a flow chart for explaining a process which variably controls the head speed during the ramp load operation and/or the ramp unload operation.

FIG. 33 is a flow chart for explaining a process which variably controls the head speed during the ramp load operation and/or the ramp unload operation, by the functional block shown in FIG. 32. In FIG. 33, those steps which are the same as those corresponding steps in FIG. 28 are designated by the same reference numerals, and a description thereof will be omitted. In FIG. 33, a step S81 decides whether or not the moving distance (P) of the head 5 is greater than or equal to the remaining distance to the parking area 6-1, and the process returns to the step S25 if the decision result in the step S81 is NO. If the decision result in the step S81 is YES, a step S91 supplies a current which moves the head 5 at a constant speed towards the outer periphery of the disk 3, that is, the instructing current value, to the VCM 32. In addition, a step S92 decides whether or not a predetermined time has elapsed. The process ends if the decision result in the step S92 becomes YES.

Figure 34:
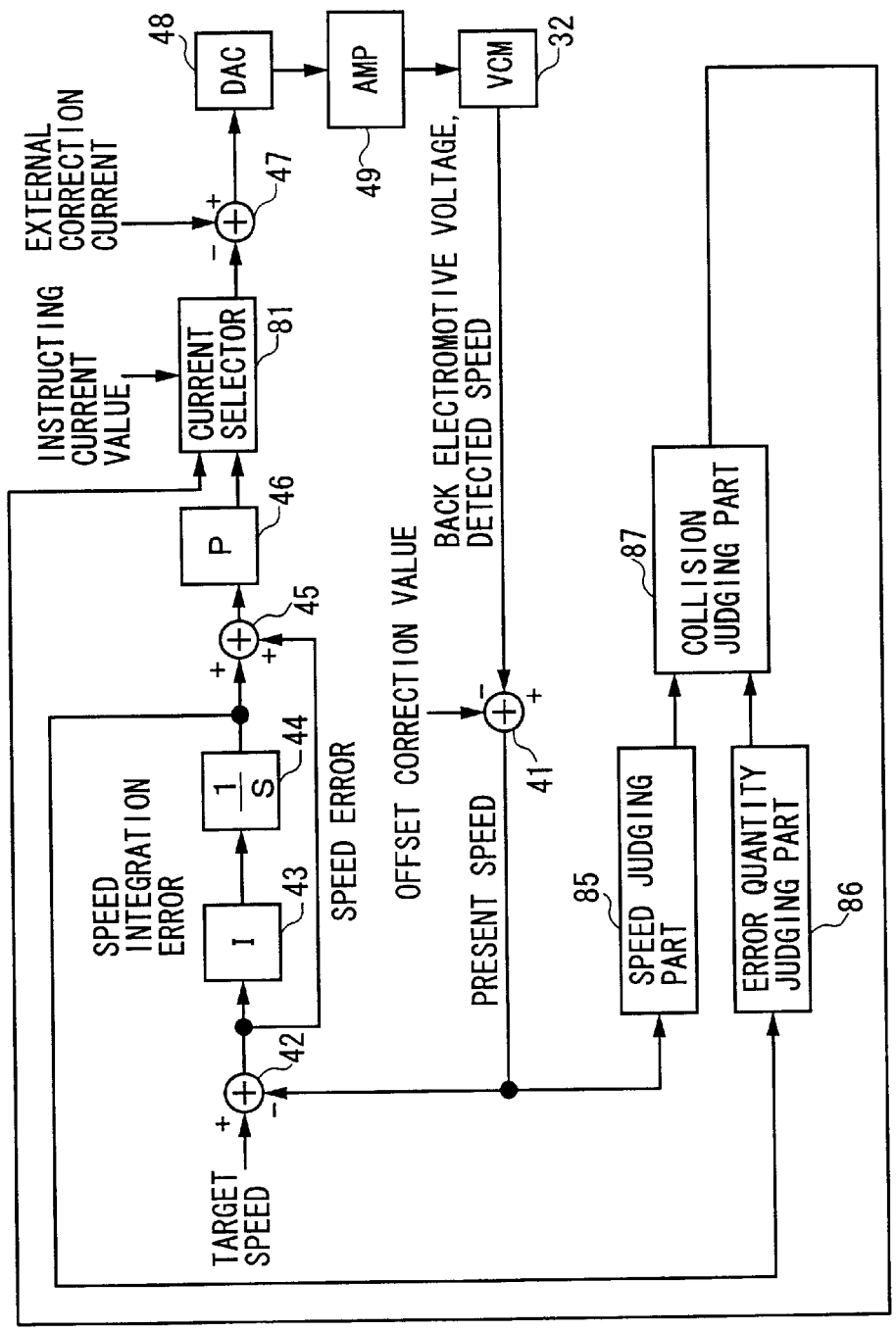
FIG. 34 is a functional block diagram showing a head speed control section and a head position detecting section of the control system.

FIG. 34 is a functional block diagram showing a head speed control section and a head position detecting section of the control system. The control system shown in FIG. 34 is realized by the MPU 25 and the SVC 27 shown in FIG. 2. In FIG. 34, those parts which are the same as those corresponding parts in FIG. 32 are designated by the same reference numerals, and a description thereof will be omitted.

In the control system shown in FIG. 34, a speed judging part 85 outputs a signal when the present speed supplied from the subtracter 41 is 0 m/s. An error quantity judging part 86 outputs a signal when the speed integration error from the integrator 44 is greater than or equal to a predetermined value. A collision judging part 87 judges that the base portion of the arm 4 has hit the stopper 7 when both the signal from the speed judging part 85 and the signal from the error quantity judging part 86 are received, and outputs a reached signal which indicates that the head 5 has reached the terminal position P7 of the parking area 6-1. The collision judging part 87 supplies the reached signal to the current selector 81. The current selector 81 supplies the output of the adder 45 to the adder 47 before the reached signal is received, so as to carry out a speed control similar to that described above. In addition, after the reached signal is received, the current selector 81 supplies an instructing current value to the adder 47. The instructing current value in this case is set so as to supply to the VCM 32 a current for moving the head 5 towards the outer periphery of the disk 3 at a constant speed. In other words, after the head 5 reaches the terminal position P7 of the parking area 6-1 during the ramp unload operation, the instructing current value for further moving the head 5 towards the outer periphery of the disk 3 is supplied to the VCM 32, so that the head 5 is urged towards the outer periphery from the terminal position P7 and is positively positioned at the terminal position P7.

Figure 35:
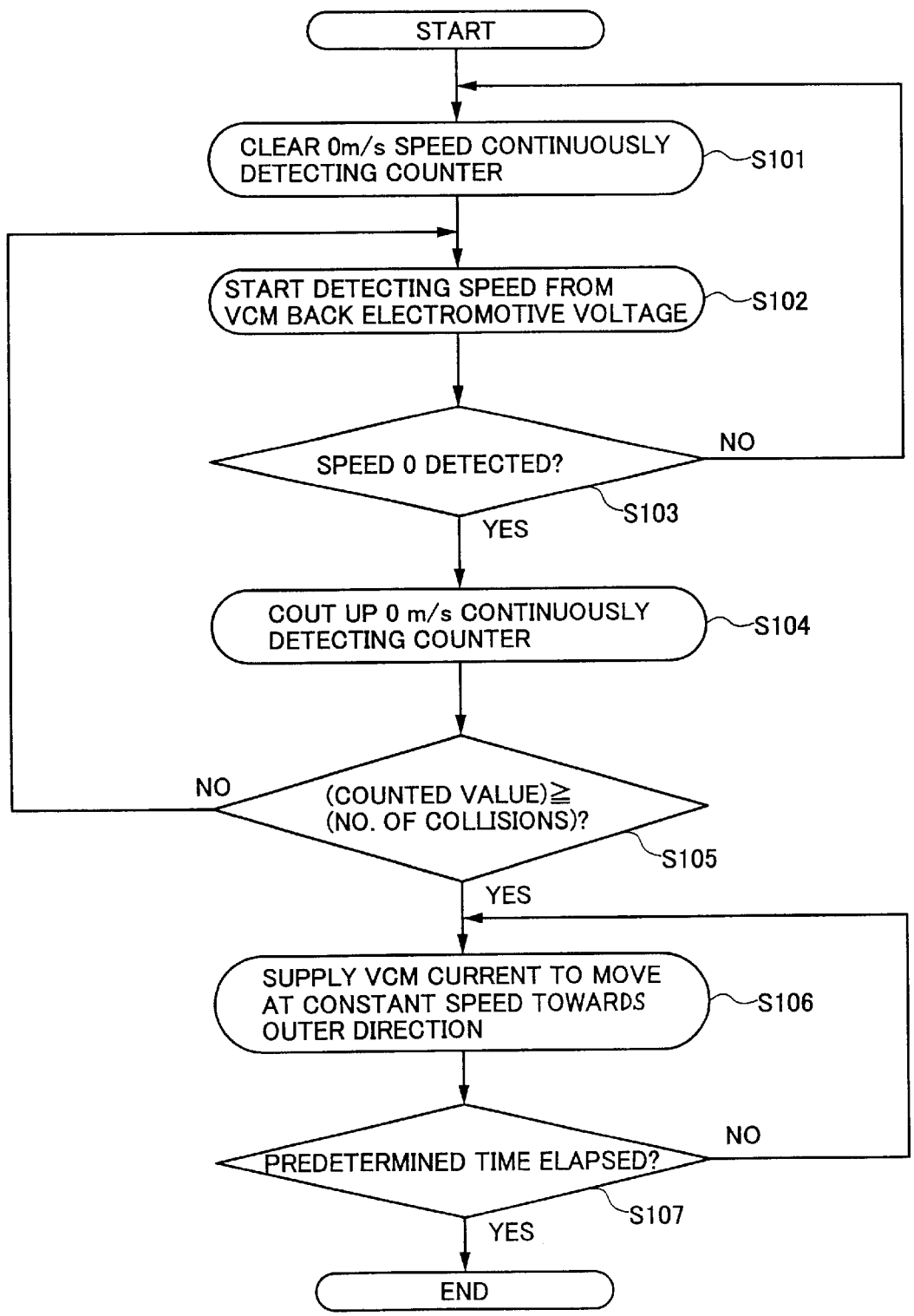
FIG. 35 is a flow chart for explaining a process which variably controls the head speed during the ramp load operation and/or the ramp unload operation.

FIG. 35 is a flow chart for explaining a process which variably controls the head speed during the ramp load operation and/or the ramp unload operation. In FIG. 35, a step S101 clears an internal counter of the collision judging part 87. This internal counter counts the number of times the present speed of 0 m/s is continuously detected by the speed judging part 85. A step S102 detects the present speed of the head 5 from the back electromotive voltage of the VCM 32. A step S103 decides whether or not the speed judging part 85 has detected that the present speed is 0 m/s, based on the detection signal from the speed judging part 85, and the process returns to the step S101 if the decision result in the step S103 is NO.

On the other hand, if the decision result the step S103 is YES, a step S104 counts up the internal counter based on the detection signal from the speed judging part 85. A step S105 decides whether or not a counted value of the internal counter is greater than or equal to a number of times the collision at the terminal position P7 of the parking area 6-1 is to be counted. This number is set in advance. The process returns to the step S102 if the decision result in the step S105 is NO. But if the decision result in the step S105 is YES, a step S106 supplies to the VCM 32 the instructing current value for moving the head 5 towards the outer periphery of the disk 3 at the constant speed. A step S107 decides whether or not a predetermined time has elapsed, and the process returns to the step S106 if the decision result in the step S107 is NO. On the other hand, the process ends if the decision result in the step S107 is YES.

Figure 36:
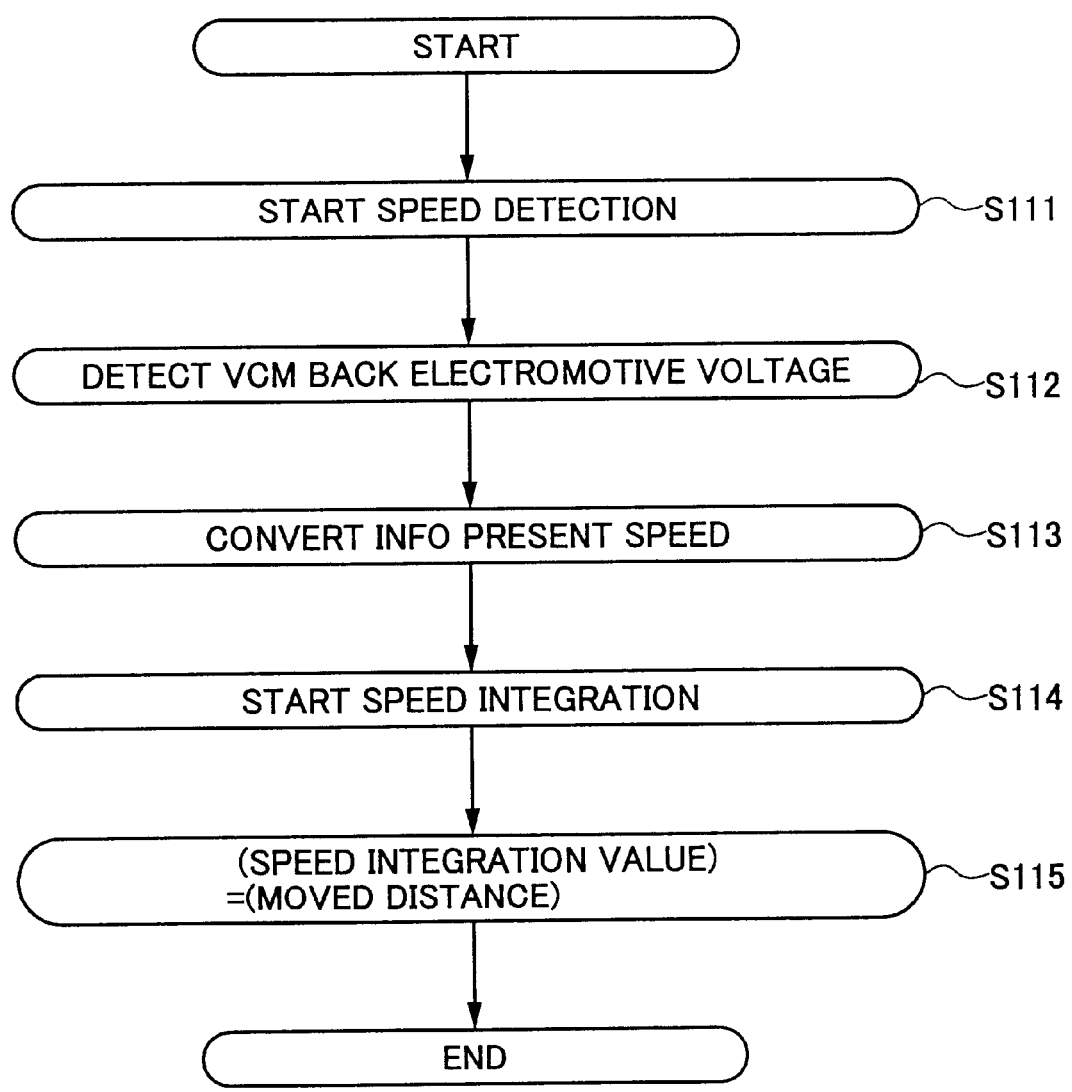
FIG. 36 is a flow chart for explaining a process which obtains a moving distance of the head.

Next, a description will be given of a process which obtains the moving distance of the head 5. FIG. 36 is a flow chart for explaining the process which obtains the moving distance of the head 5. The process shown in FIG. 36 is particularly suited for obtaining the moving distance of the head 5 in the step S26 shown in FIG. 13, for example.

In FIG. 36, a step Sill starts a speed detecting operation of the control system shown in FIG. 10, for example. A step S112 detects the back electromotive voltage of the VCM 32. A step S113 converts the back electromotive voltage to the present speed of the head 5. A step S114 starts integration of the present speed of the head 5. A step S115 obtains the moving distance of the head 5 from the speed integration value, and the process ends. Hence, it is possible to obtain the present speed of the head 5 from the back electromotive voltage of the VCM 32, and to obtain the moving distance of the head 5 by integrating the present speed.

Figure 37:
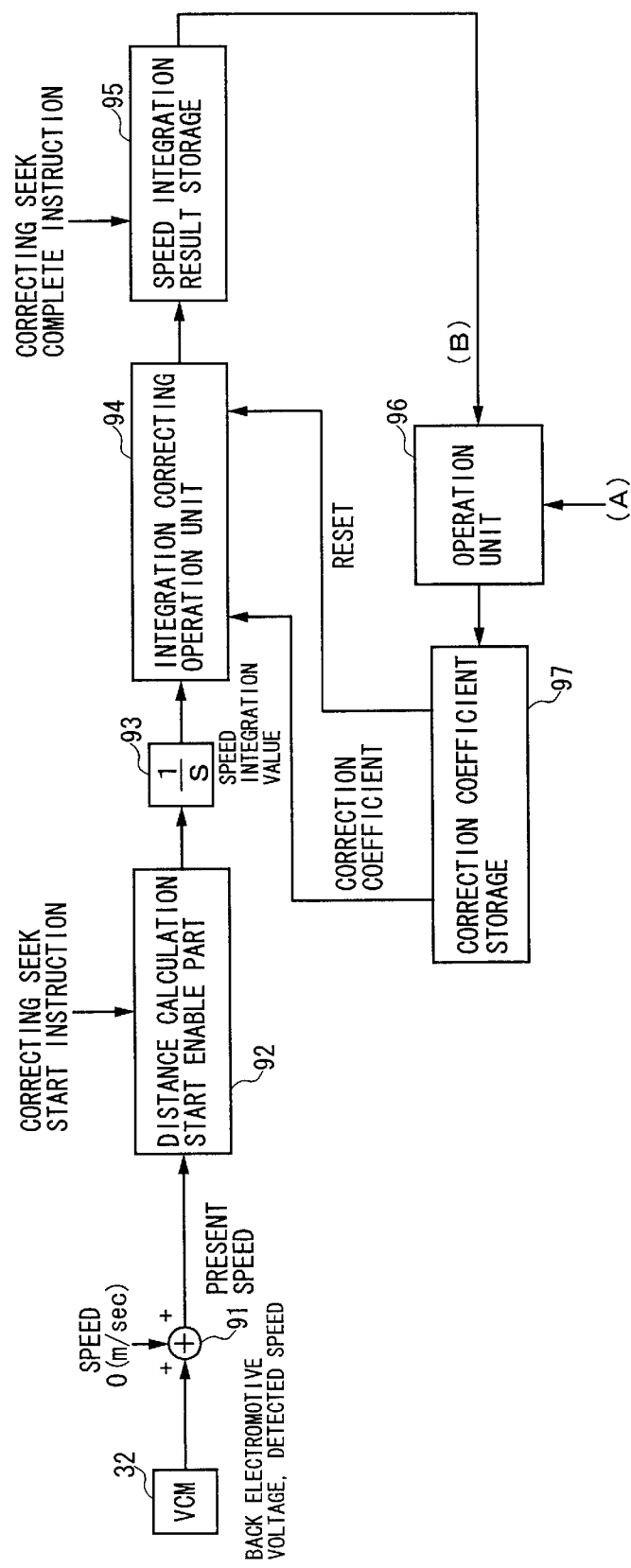
FIG. 37 is a functional block diagram showing a head moving distance correcting section of the control system.

FIG. 37 is a functional block diagram showing a head moving distance correcting section of the control system. The head moving distance correcting section corrects the moving distance of the head 5 based on position information which is written on the disk 3. The control system shown in FIG. 37 is realized by the MPU 25 and the SVC 27 shown in FIG. 2. In FIG. 37, those parts which are the same as those corresponding parts in FIG. 32 are designated by the same reference numerals, and a description thereof will be omitted.

In the control system shown in FIG. 37, a subtracter 91 subtracts the back electromotive voltage from the VCM 32 from an offset correction value of a speed 0 m/s, and supplies the present speed of the head 5 to a distance calculation start enable part 92. The distance calculation start enable part 92 enables the start of the distance calculation based on a correcting seek start instruction, and supplies the present speed to an integrator 93. A speed integration value from the integrator 93 is supplied to an integration correcting operation unit 94 which receives a correction coefficient stored in a correction coefficient storage 97. The integration correcting operation unit 94 multiplies the correction coefficient to the speed integration value (moving distance of the head 5) to obtain the true moving distance of the head 5, and supplies the true moving distance to an integration result storage 95.

A correcting seek complete instruction and a reset signal from the correction coefficient storage 97 are supplied to the speed integration result storage 95. The correction coefficient storage 97 resets the speed integration result storage 95 by the reset signal after the correction ends. The true moving distance stored in the speed integration result storage 95 is supplied to an operation unit 96 in response to the correcting seek complete instruction. The operation unit 96 calculates the correction coefficient A/B from the moving distance A which is obtained from a difference between the track numbers at the start and completion of the correcting seek, and the true distance B stored in the speed integration result storage 95. The calculated correction coefficient A/B is stored in the correction coefficient storage 97. Of course, the moving distance A can be obtained using the cylinder numbers in place of the track numbers.

Figure 38:
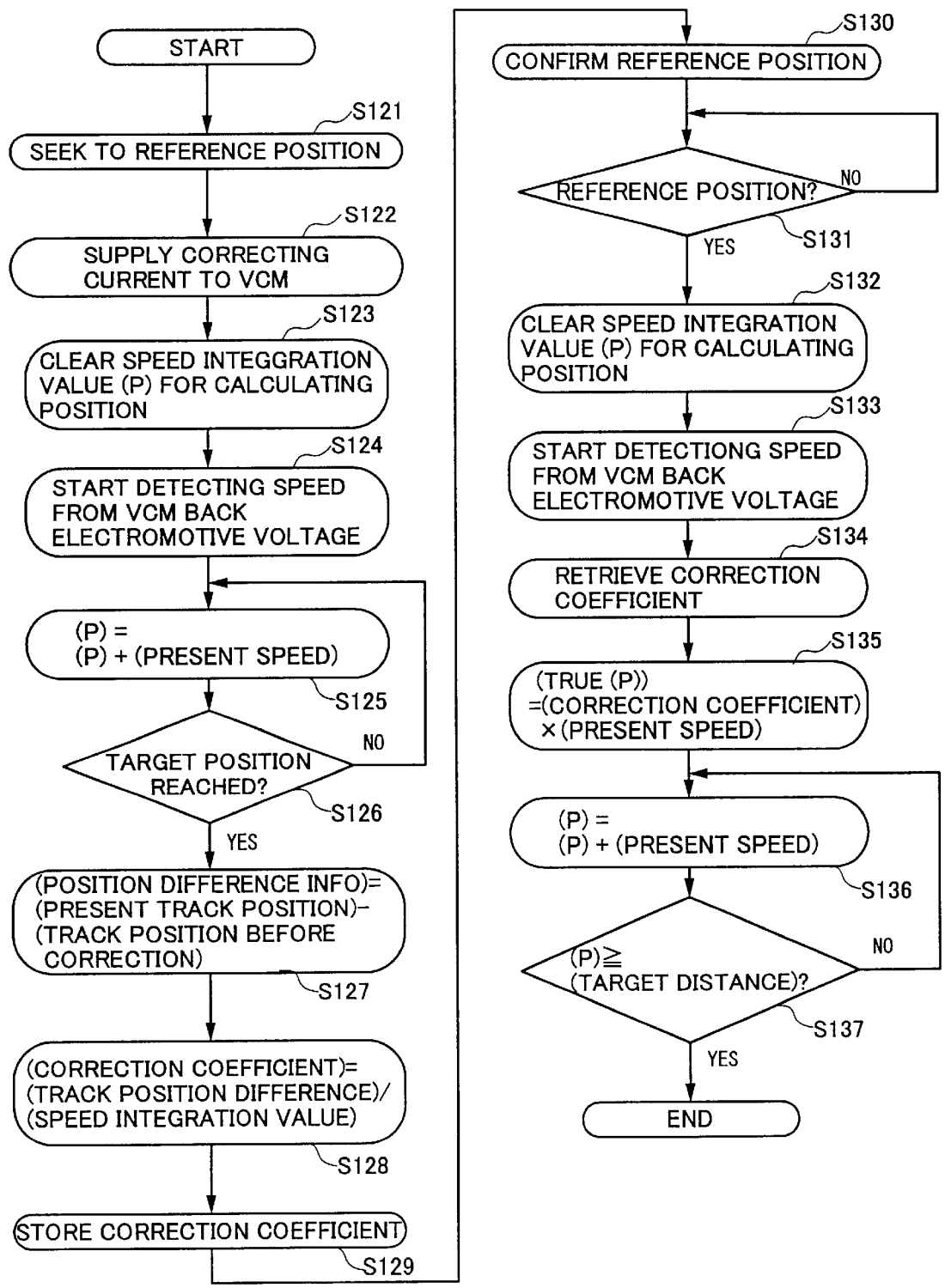
FIG. 38 is a flow chart for explaining a process which corrects the moving distance of the head based on position information written on the disk.

FIG. 38 is a flow chart for explaining a process which corrects the moving distance of the head 5 based on the position information written on the disk 3, by the functional block shown in FIG. 37.

In FIG. 38, a step S121 controls the VCM 32 to make the head 5 seek to a reference position on the disk 3, and a step S122 supplies a correcting current to the VCM 32. A step S123 clears the speed integration value (P) which is used to calculated the head position, and a step S124 starts detecting the head speed from the back electromotive voltage of the VCM 32. A step S125 obtains the moving distance (P) from (P)=(P)+(present speed), and a step S126 decides whether or not the head 5 reached a target position. The process returns to the step S125 if the decision result in the step S126 is NO. On the other hand, if the decision result in the step S126 is YES, a step S127 obtains the track position difference information A by subtracting the track position before the correction from the present track position. A step S128 calculates the correction coefficient A/B from the true moving distance information B which is obtained from the speed integration value and the track position difference information A. A step S129 stores the correction coefficient.

A step S130 confirms the reference position, and a step S131 decides whether or not the head 5 has reached the reference position. If the decision result in the step S131 is YES, a step S132 clears the speed integration value (P). In addition, a step S133 starts detecting the head speed from the back electromotive voltage of the VCM 32. A step S134 retrieves the stored correction coefficient, and a step S135 calculates the true moving distance of the head 5 by multiplying the correction coefficient to the speed integration value (P). A step S136 obtains the moving distance (P) of the head 5 from (P)=(P)+(present speed), and a step S137 decides whether or not the moving distance (P) is greater than or equal to a target distance. The process returns to the step S136 if the decision result in the step S137 is NO, and the process ends if the decision result in the step S137 is YES.

In the embodiment described above, the description is given with respect to the head speed control and the head position detection during the ramp load operation and/or the ramp unload operation. However, the present invention is not limited thereto, and it is also possible to carry out the head speed control and the head position detection in a case such as when the signal written on the disk 3 cannot be read for some reason. Accordingly, even in a case where the head 5 is positioned on the disk 3 but the detection of the head position based on the read signal is impossible due to a failure or the like of the disk unit, the present invention can still recognize the head speed and the head position in this case, and immediately carry out the ramp unload operation to unload the head 5 so as to protect the head 5 and the disk 3.

Therefore, according to the above described embodiments, it is possible to realize a head speed control method which can appropriately control the head speed and a head position detection method which can detect the head position, even when the head is located at a position where the information on the disk cannot be read, and to realize a disk unit which can reduce the mechanical contact noise during the ramp load operation by employing such a head speed control method and/or head position detection method.

Next, a description will be given of a further aspect of the present invention which generally relates to disk units provided with a ramp load mechanism and methods of controlling the disk unit, and more particularly to a disk unit which controls a moving speed of a head by detecting a head speed from a back electromotive voltage of a VCM during a ramp loading operation when the head is moved from the ramp member to a landing region on a recording medium and during a ramp unloading operation when the head is receded onto the ramp member, and to a method of controlling such a disk unit.

Recently, in magnetic disk units for 2.5-inch hard disk drive (HDD) or the like, a ramp load mechanism is provided, and a head is moved to a ramp member and a driving current of a voice coil motor (hereinafter simply referred to as a VCM) is cut off in an access waiting state which waits for an access from a host system. Hence, a current consumption of the VCM in the access waiting state is suppressed, so as to extend a life of a battery in a lap-top personal computer or the like which is mounted with the HDD.

In the disk unit which is provided with such a ramp load mechanism, a speed control is generally carried out to control a landing speed to $\frac{1}{10}$ or less than that during a normal seek operation, in order to avoid the head from making contact with a landing region on a recording medium when the head moves to the landing region during the ramp load operation.

During the ramp load operation, it is not possible to use position information written on the recording medium, and thus, it is not possible to detect a moving speed of the head from the position information. For this reason, a head speed signal during the ramp load operation is detected from a back electromotive voltage generated from a coil of the VCM.

However, when the head speed signal which is used for the speed control during the ramp load operation is detected from the back electromotive voltage of the VCM, the back electromotive voltage is normally an extremely small or weak signal on the order of only approximately several tens of mV at the maximum.

On the other hand, because of the need to reduce the size, weight, cost and the like of the HDD, the integration density of the circuits has increased. As a result, a circuit which uses a relatively large power and a circuit which processes small amplitude signals such as for detecting the head speed from the back electromotive voltage of the VCM are disposed extremely close to each other or, even integrated on the same integrated circuit.

Consequently, a mutual interference noise from a peripheral circuit part, included in the head speed signal which is detected from the back electromotive voltage of the VCM and is used for the speed control during the ramp load operation, is causing a serious problem in that the mutual interference noise deteriorates the speed control during the ramp load operation.

Accordingly, it is an object of the further aspect of the present invention to provide a disk unit which can carry out an accurate and stable speed control during a ramp load operation, by reducing effects of the mutual interference noise from the peripheral circuit part on the head speed signal which is detected from the back electromotive voltage of the VCM.

Figure 39A:
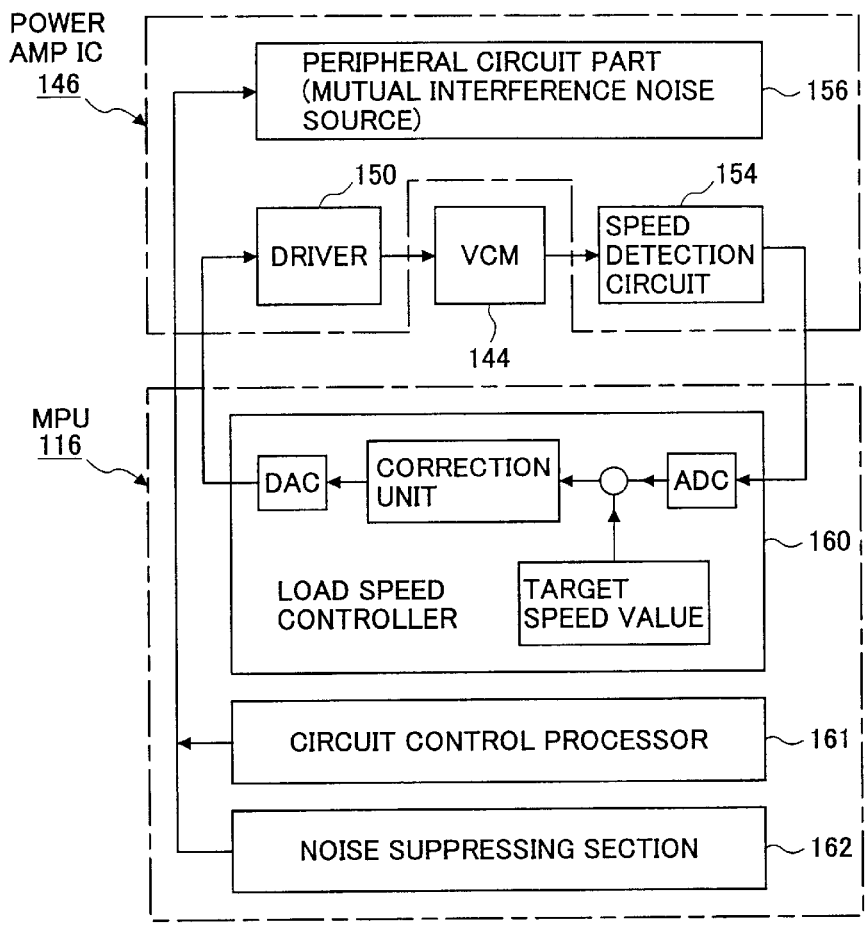
FIGS. 39A and 39B respectively are diagrams for explaining an operating principle of a further aspect of the present invention.
Figure 39B:
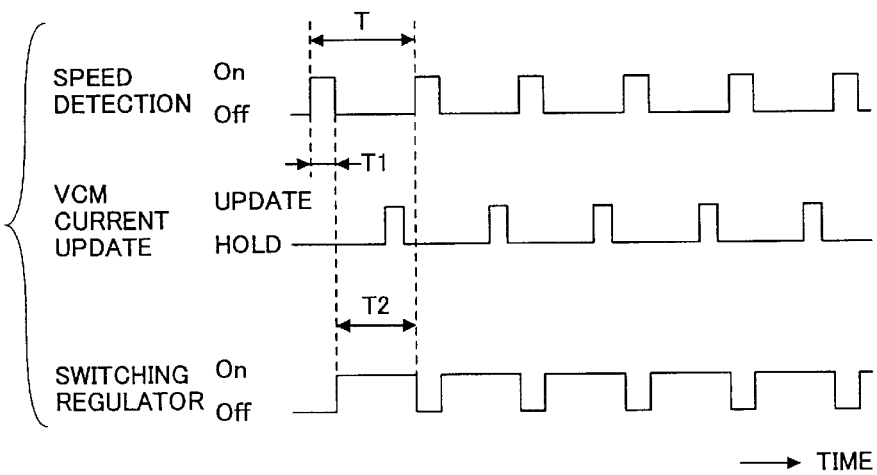

FIGS. 39A and 39B respectively are a system block diagram and a time chart for explaining an operating principle of the further aspect of the present invention. A disk unit according to the present invention is provided with a ramp load mechanism, and is characterized by a load speed controller 160 which controls a speed of a head when the head moves on a ramp member during a ramp load operation or a ramp unload operation, and a circuit control processor 161 which controls an operation of a peripheral circuit part while the speed of the head is controlled.

While a speed control is carried out during the ramp load operation by detecting a weak head speed signal from a back electromotive voltage of a VCM, the operation of the peripheral circuit part is stopped or made to slow down, so as to eliminate or suppress a mutual interference noise from mixing into the head speed signal from the peripheral circuit part. As a result, it is possible to accurately and stably carry out the speed control during the ramp load operation based on the back electromotive voltage of the VCM, so as to improve the reliability of the disk unit.

While the speed of the head is controlled, the circuit control processor 161 may stop an operation of a switching regulator. The switching regulator may be regarded as a switching noise source, and causes a strongest noise interference with respect to the weak head speed signal which is detected from the back electromotive voltage of the VCM. For this reason, the noise suppressing effect is extremely large when the switching regulator is stopped during a head speed detection.

On the other hand, the circuit control processor 161 may reduce a frequency of a clock of a peripheral circuit part 156 while the speed of the head is controlled, so as to slow down an operation of the peripheral circuit part 156 which operates responsive to the clock. The peripheral circuit part 156 which operates responsive to the clock also becomes a noise source, but the operation of this peripheral circuit part 156 cannot be stopped. Hence, while the head speed signal is detected from the back electromotive voltage of the VCM, the frequency of the clock is reduced to slow down the operation of the peripheral circuit part 156, so as to suppress the mixing of the noise caused by the clock as much as possible.

More particularly, in a case where the peripheral circuit part 156 is provided with a main controller including a main control unit (hereinafter simply referred to as a MCU) and a memory which operate responsive to the clock, the circuit control processor 161 reduces the frequency of the clock of the main controller while the speed of the head is controlled.

The disk unit according to the present invention may be provided with a ramp member which confronts a head when a rotation of a disk is stopped, and a switching regulator which assumes a switch off state while the head moves on the ramp member. In other words, the present invention may not only be applied to the case where the head is loaded from the ramp member, but also to a case where the head is unloaded onto the ramp member.

According to still another aspect of the present invention, the disk unit according to the present invention is provided with a ramp load mechanism, and is characterized by a load speed controller 160 which controls a speed of a head when the head moves on a ramp member, and a noise suppressing section 162 which suppresses mixture of a noise caused by an operation of a peripheral circuit part 156 while the speed of the head is controlled.

For example, in a case where the peripheral circuit part 156 is provided with a power amplifier for a VCM and a through rate, a dynamic range (a non-distorted signal amplifying frequency band) and/or a current feedback of this power amplifier can be reduced or stopped by a control signal from a MCU, the noise suppressing section 162 stops updating an output caused by at least one of reduction of the through rate, reduction of the dynamic range and the stopping of the current feedback, while the speed of the head is controlled, and reduces the effects of the noise by consequently slowing down the operation of the peripheral circuit part 156.

In addition, in a case where the peripheral circuit part 156 is provided with a power amplifier for a VCM capable of switching between a linear driving mode and a PWM driving mode, the noise suppressing section 162 operates the power amplifier in the linear driving mode while the speed of the head is controlled, and operates the power amplifier in the PWM driving mode or the linear driving mode at times other than detecting the head speed. When the power amplifier for driving the VCM is operated in the PWM driving mode, the PWM operation causes the generation of a pulse noise source and affects the weak head speed signal. Hence, the PWM driving mode is stopped and the power amplifier is operated in the linear driving mode while the head speed signal is detected, so as to suppress the noise.

In this case, the noise suppressing section 162 may change a driving frequency of the power amplifier to a frequency which does not interfere with the head speed signal when detecting the head speed signal.

Furthermore, the noise suppressing section 162 may be provided with a filter which eliminates, from the head speed signal, frequency components including a fundamental wave and harmonics of a PWM driving frequency of the power amplifier. While the speed of the head is controlled, this filter eliminates the frequency components including the fundamental wave and the harmonics of the PWM driving frequency of the power amplifier, from the head speed signal.

More particularly, a notch filter which suppresses the frequency components including the fundamental wave and the harmonics of the PWM driving frequency or, a lowpass filter which suppresses a frequency band which includes the frequency components including the fundamental wave and the harmonics to a predetermined order of the PWM driving frequency, is used as the above filter.

Figure 40:
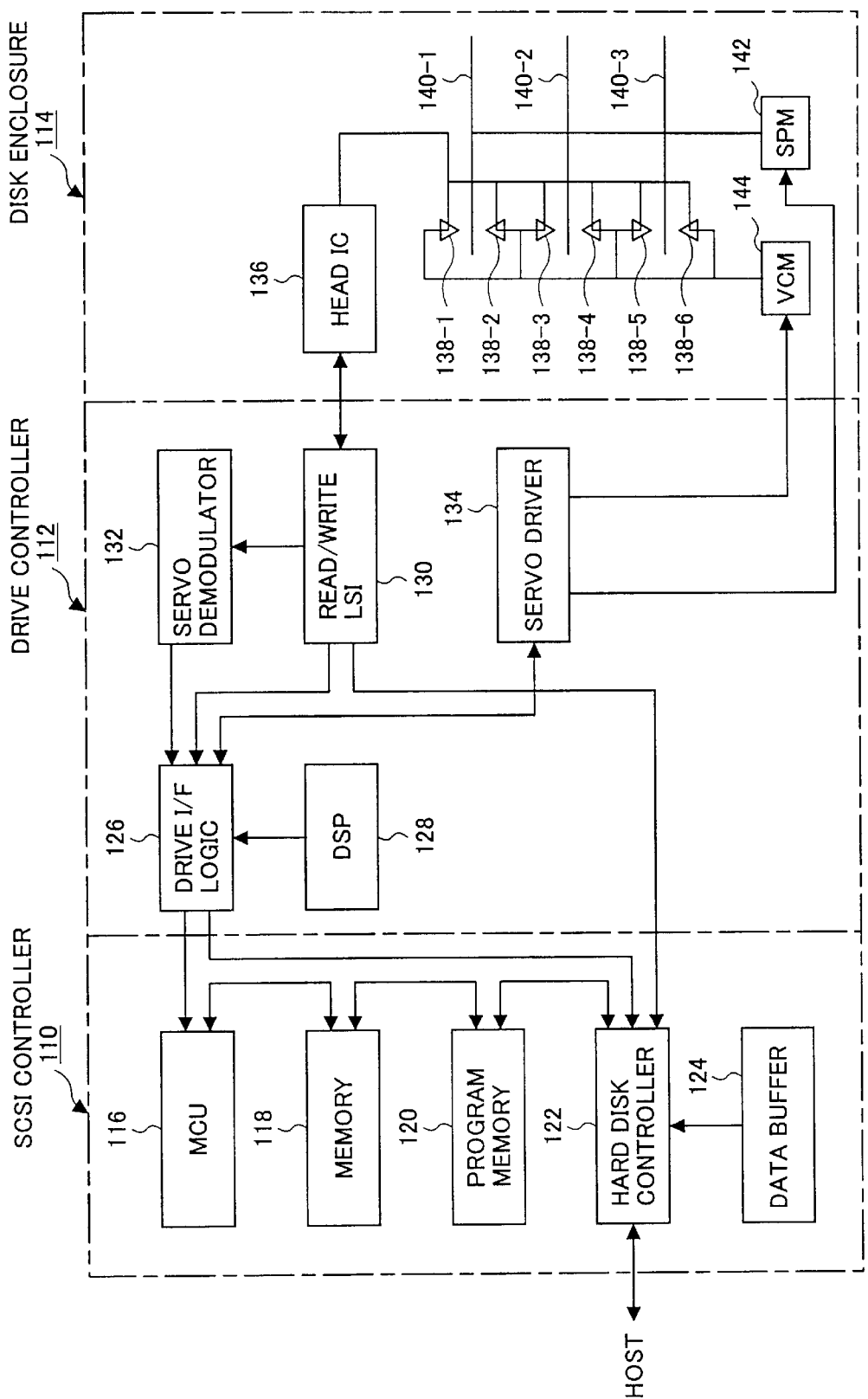
FIG. 40 is a system block diagram showing a hard disk drive employing the further aspect of the present invention.

FIG. 40 is a system block diagram showing a hard disk drive employing the further aspect of the present invention. In FIG. 40, the hard disk drive includes a SCSI controller 110, a drive controller 112, and a disk enclosure 114. Of course, an interface between a host system and the hard disk drive is not limited to the SCSI controller 110, and any appropriate interface controller may be used instead.

The SCSI controller 110 includes a main control unit (MCU) 116, a memory 118 formed by a DRAM or SRAM which is used as a control storage, a program memory 120 formed by a non-volatile memory such as a flash memory for storing control programs, a hard disk controller (HDC) 122, and a data buffer 124. The drive controller 112 includes a drive interface logic 126, a digital signal processor (DSP) 128, a read/write LSI 130, a servo demodulator 132, and a servo driver 134.

The disk enclosure 114 includes a head IC 136, and composite heads 138-1 through 138-6 respectively made up of a write head and a read head are connected to the head IC 136. The composite heads 138-1 through 138-6 are provided with respect to corresponding recording surfaces of magnetic disks 140-1 through 140-3, and are moved to arbitrary track positions on the magnetic disks 140-1 through 140-3 being driven by a rotary actuator using a VCM 144. The magnetic disks 140-1 through 140-3 are rotated at a constant speed by a spindle motor (SPM) 142.

The hard disk drive having the construction described above operates in the following manner. For example, when a write command is issued from the host system, this write command is stored in a command queue of the memory 118 via the hard disk controller 122.

The MCU 116 retrieves the write command from a starting position of the command queue in the memory 118, and uses the hard disk controller 122 to request transfer of write data with respect to the host system. The write data transferred from the host system are stored in the data buffer 124. When the storage of the write data into the data buffer 124 ends, the MCU 116 starts the hard disk controller 122 to write the write data on the magnetic disks 140-1 through 140-3.

The write data stored in the data buffer 124 are supplied to the write head of the composite head 138-1, for example, via the hard disk controller 122, the drive interface logic 126, a write system of the read/write LSI 130 and the head IC 136, and are written at a sector position of a track which is specified by the write command.

At the same time, the DSP 128 carries out a head positioning by the VCM 144 with respect to the track position specified by the write command. In other words, the DSP 128 controls the servo driver 134 by a servo demodulated signal which is obtained via the servo demodulator 132, and writes the write data when the composite head 138-1 is positioned to a target sector which is specified by the write command.

When the write operation ends, the MCU 116 supplies a status signal which indicates a normal end of the write operation to the host system via the hard disk controller 122.

On the other hand, when a read command is issued from the host system, the MCU 116 retrieves the read command from the command queue of the memory 118, and the read head of the composite head 138-1, for example, reads the data written at a sector position of a track which is specified by the read command. The read data are transferred to the host system via the head IC 136, a read system of the read/write LSI 130, the driver interface logic 126 and the hard disk controller 122.

Furthermore, in an access waiting state where no write command is received from the host system, the MCU 116 instructs a head recede process to the DSP 128 with respect to a ramp load mechanism. Hence, the DSP 128 operates the VCM 144 via the driver interface logic 126 and the servo driver 134, and makes the composite heads 138-1 through 138-6 recede onto ramp members of the ramp load mechanism which is arranged in a vicinity of outer peripheral parts of the magnetic disks 140-1 through 140-3. The DSP 128 turns off a driving current to the VCM 144 when the composite heads 138-1 through 138-6 stop in a state pushed against outer stoppers on the ramp members.

When a seek command is received from the host system in a state where the composite heads 138-1 through 138-6 are positioned to the receded position of the ramp load mechanism, the DSP 128 first carries out a ramp load operation to move the composite heads 138-1 through 138-6 from the ramp members onto the magnetic disks 140-1 through 140-3 based on a seek instruction from the MCU 116. Then, after the composite heads 138-1 through 138-6 are loaded onto the magnetic disks 140-1 through 140-3, the DSP 128 carries out a seek control to a target sector which is specified by the seek command, and each composite head is positioned to the target sector position after an on-track state is achieved.

During the ramp load operation in which the composite heads 138-1 through 138-6 are moved onto the magnetic disks 140-1 through 140-3 by the driving of the VCM 144, it is not possible to detect the head position from servo information written on the magnetic disks 140-1 through 140-3 using the servo demodulator 132. Hence in this further aspect of the present invention, a head speed signal is detected from the back electromotive voltage of the VCM 144, and a speed control is carried out during the ramp load operation so that the head speed becomes ⅒ or less than that during the seek control, for example.

When carrying out the speed control during the ramp loading operation, the head speed signal which is detected from the back electromotive voltage of the VCM 144 is a weak signal on the order of only approximately several tens of mV at the maximum. In addition, the head speed signal is detected from the back electromotive voltage of the VCM 144 by a speed detection circuit provided in the servo driver 134. A mutual interference noise from a peripheral circuit part provided in a periphery of this speed detection circuit affects the detection of the head speed signal from the back electromotive voltage of the VCM 144.

Accordingly, in the present invention, during the ramp load operation when the head is moved from the ramp member onto the magnetic disk and the head speed detection is necessary, the operation of the peripheral circuit part is stopped or is made to slow down, so as to suppress the effects of the mutual interference noise on the head speed signal which is detected by the speed detection circuit based on the back electromotive voltage of the VCM.

Moreover, during the ramp unload operation when the head is moved from the magnetic disk and receded onto the ramp member in order to stop rotation of the magnetic disk, the effects of the mutual interference noise on the head speed signal is suppressed similarly as during the ramp load operation. In the following description, the operation during the ramp load operation will be described, but the operation during the ramp unload operation is similar to that during the ramp load operation and easily understood therefrom.

Figure 41:
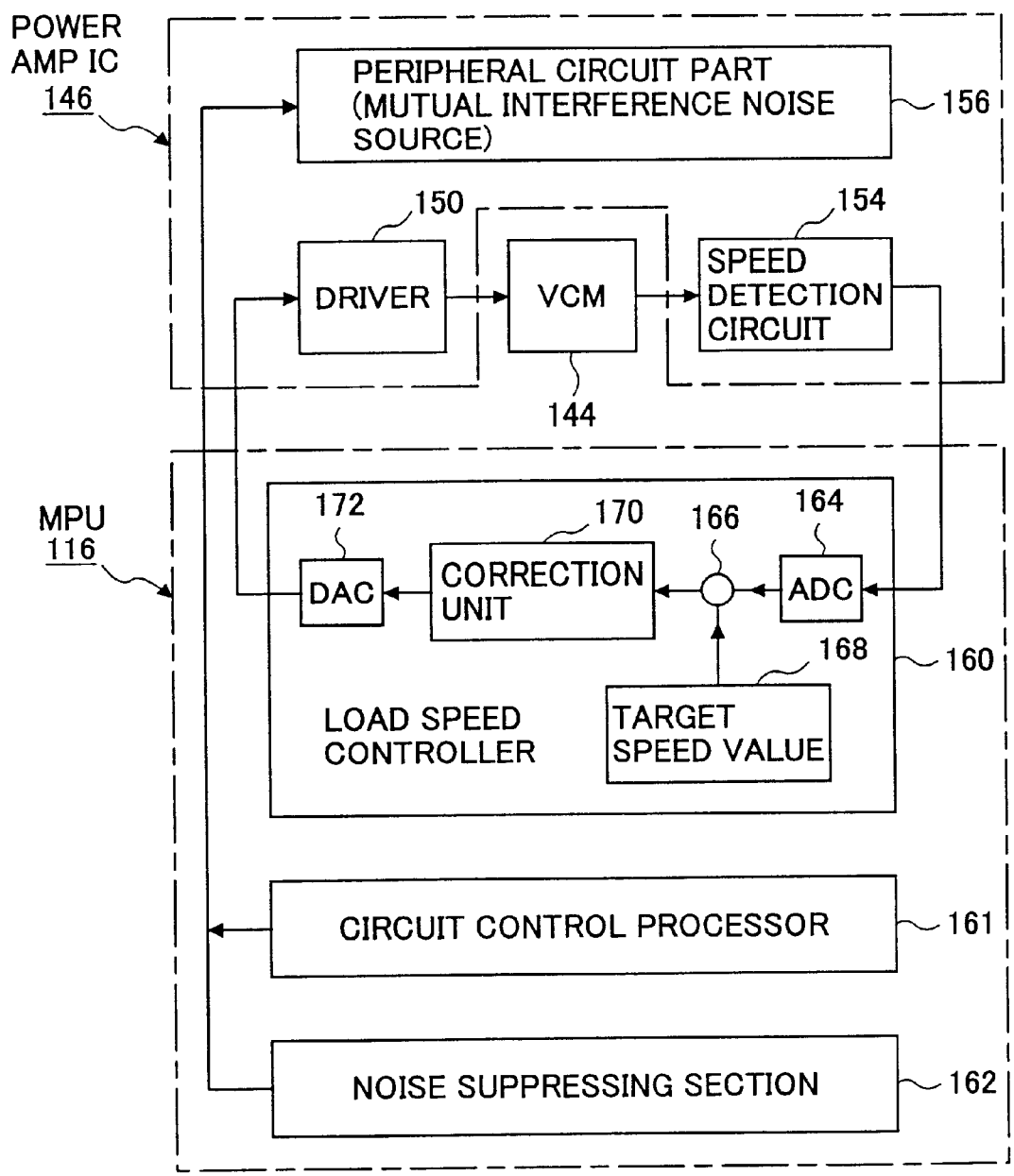
FIG. 41 is a functional block diagram showing a construction of the present invention which suppresses noise when carrying out a speed control during a ramp load operation.

FIG. 41 is a functional block diagram showing a construction of the present invention for suppressing the effects of the noise when carrying out the speed control during the ramp load operation.

In FIG. 41, the speed control during the ramp load operation is carried out by the load speed controller 160 provided in the MCU 116, and the power amplifier IC 146 used in the servo driver 134 shown in FIG. 40. The power amplifier IC 146 includes a driver 150 for driving the VCM 144, and a speed detection circuit 154 for detecting the head speed and outputting a head speed signal based on the back electromotive voltage of the VCM 144.

The load speed controller 160 of the MCU 116 includes an analog-to-digital converter (ADC) 164 for converting the head speed signal from the speed detection circuit 154 into digital data, a setting unit 168 for setting a target speed value for the ramp load operation, a node 166 for obtaining a speed deviation between the target speed value from the setting unit 168 and the detected speed obtained from the ADC 164, a correction unit 170 for calculating a correction value from the speed deviation, and a digital-to-analog converter (DAC) 172 for converting digital data, that is, current instruction value, from the correction unit 170 into an analog current instruction signal.

In addition to the functional elements described above for controlling the ramp load operation, the present invention further includes the circuit control processor 161 and the noise suppressing section 162 within the MCU 116. The circuit control processor 161 stops or suppresses the operation of the peripheral circuit part 156 with respect to the speed detection circuit 154 within the power amplifier IC 146 while the head speed is controlled, that is, while the head speed signal is detected from the back electromotive voltage of the VCM 144 by the speed detection circuit 154, in order to carry out the speed control in the load speed controller 160 during the ramp load operation, so as to suppress the mixture of noise into the head speed signal.

More particularly, the noise suppressing section 162 stops the operation of the peripheral circuit part 156 or, slows down the clock of the peripheral circuit part 156 when the peripheral circuit part 156 is operating in response to the clock, so as to slow down the operation of the peripheral circuit part 156.

The noise suppressing section 162 suppresses the mixture of noise into the head speed signal due to the operation of the peripheral circuit part 156 with respect to the speed detection circuit 154 within the power amplifier IC 146, while the head speed signal is detected from the back electromotive voltage of the VCM 144 by the speed detection circuit 154 in order to carry out the speed control in the load speed controller 160 during the ramp load operation.

For example, in a case where the peripheral circuit part 156 is provided with a power amplifier for the VCM 144 and a through rate, a dynamic range (a non-distorted signal amplifying frequency band) and/or a current feedback of this power amplifier can be reduced or stopped by a control signal from a MCU 116, the noise suppressing section 62 stops updating an output caused by at least one of reduction of the through rate, reduction of the dynamic range and the stopping of the current feedback, while the speed of the head is controlled, and reduces the effects of the noise by consequently slowing down the operation of the peripheral circuit part 156. A noise elimination filter may be provided at an output stage of the speed detection circuit 154, if necessary.

It is possible to provide both the circuit control processor 61 and the noise suppressing section 162 or, to provide only one of the circuit control processor 161 and the noise suppressing section 162.

Figure 42:
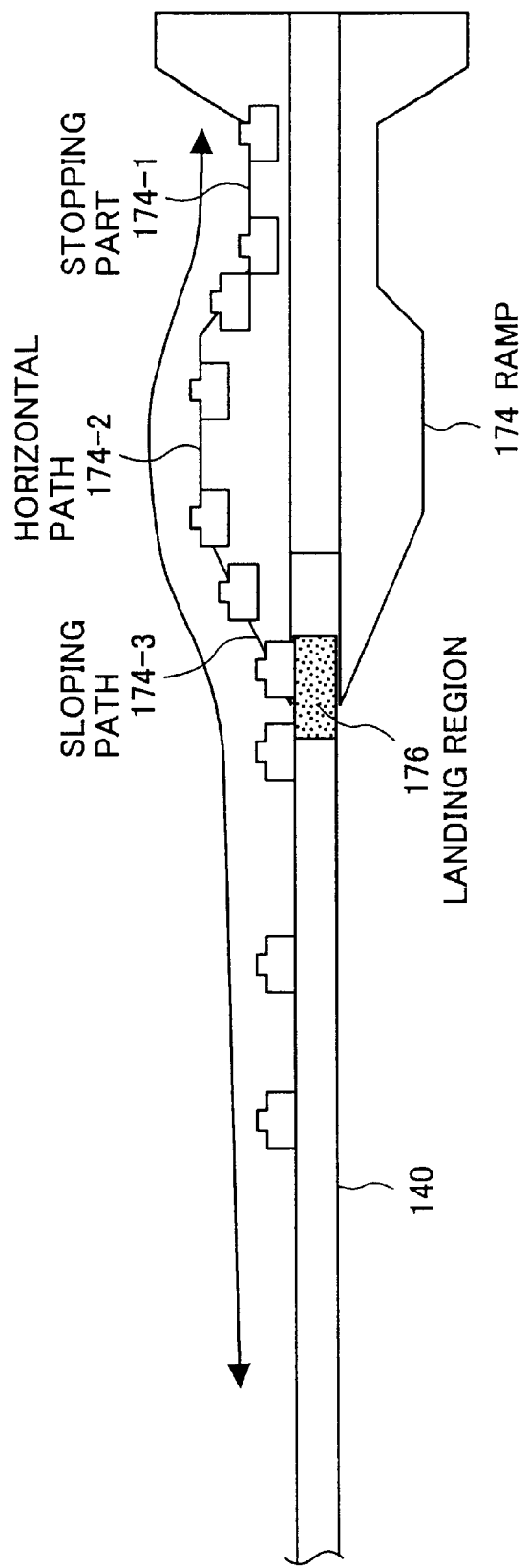
FIG. 42 is a diagram for explaining the ramp load operation with respect to a head by a ramp load mechanism.

FIG. 42 is a diagram showing a ramp load mechanism used in the present invention. In FIG. 42, ramp members 174 are provided on an outer peripheral side of the magnetic disk 140 along a ratio direction in which the composite head is moved by the rotary actuator. With respect to a landing region 176 on the outer peripheral part of the magnetic disk 140, each ramp member 174 includes a sloping path 174-3, followed by a horizontal path 174-2, further followed by a stopping part 174-1 towards the outer periphery. The stopping part 174-1 is the position where the receded composite head is stopped and held.

The composite head in the receded position is stopped in a state where the composite head is pushed against the outer side at the stopping part 174-1. When positioning the composite head with respect to the magnetic disk 140 in response to a command received from the host system, an inner driving current is supplied to the VCM 144 to start moving the composite head from the stopping part 174-1 towards the magnetic disk 140. Hence, the composite head passes the horizontal path 174-2 and the sloping path 174-3, and is loaded onto the landing region 176 on the magnetic disk 140. A pull-in by an automatic gain control (AGC) adjustment and a phase locked loop (PLL) adjustment: is completed at the landing region 176, and the speed control with respect to the composite head based on the head speed signal detected from the back electromotive voltage of the VCM 144 is carried out until the composite head assumes an on-track state with respect to an arbitrary track on the magnetic disk 140.

The head speed during this speed control is relatively slow compared to the head speed during a seek operation.

That is, the head speed during the speed control is 1/10 or less than that during the seek operation. Accordingly, when the composite head is loaded onto the landing region 176 at the outer periphery of the magnetic disk 140 from the sloping path 174-3 of the ramp member 174, the composite head is smoothly landed above the landing region 176 in a floating state without hitting the recording surface of the magnetic disk 140. Since the head position can be obtained from the servo information written on the magnetic disk 140 after the composite head assumes the on-track state on the arbitrary track, it is possible to thereafter carry out the seek operation to the target sector position based on the received command.

Figure 43:
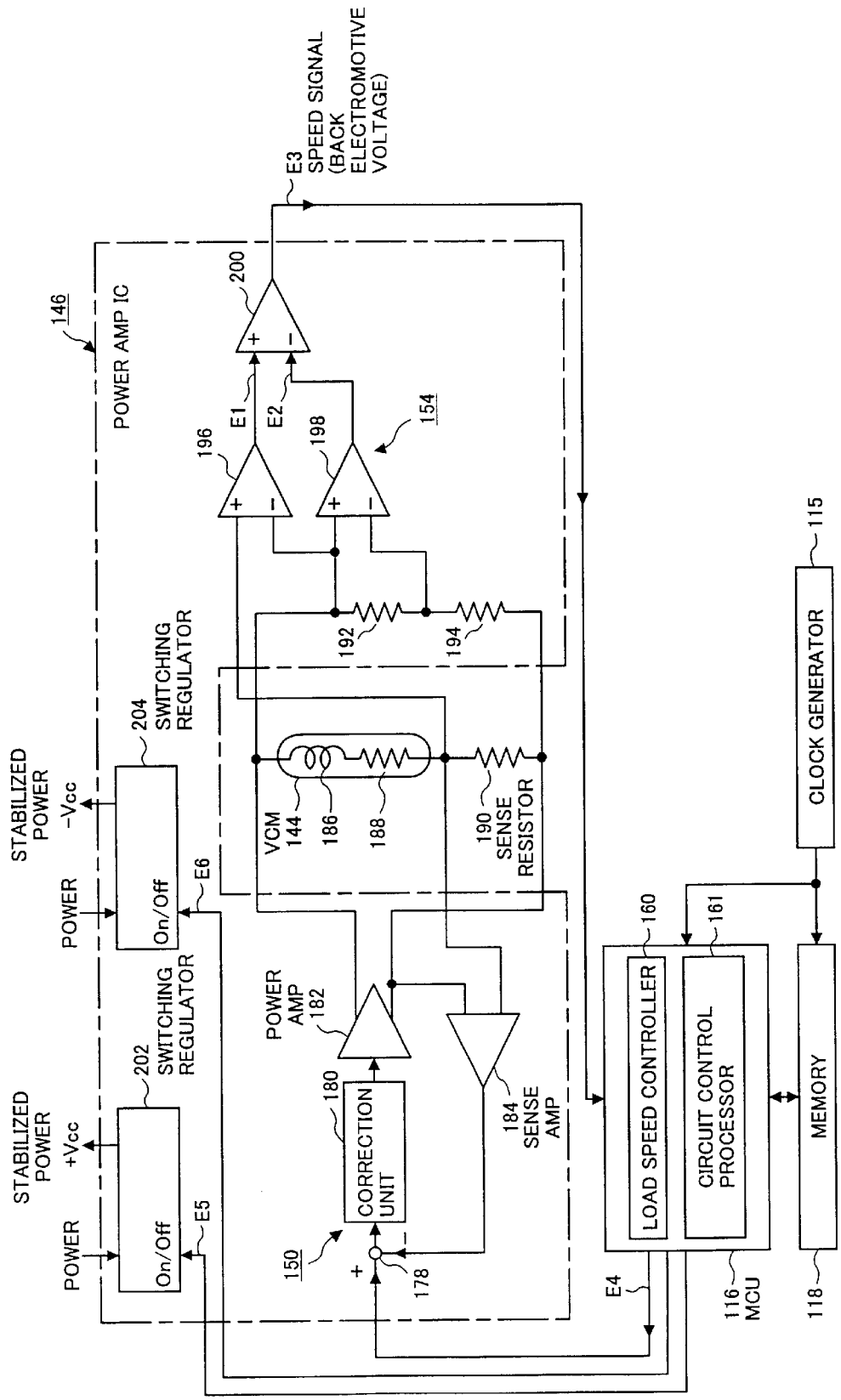
FIG. 43 is a circuit block diagram showing a second embodiment of the present invention which stops switching regulators.

FIG. 43 is a circuit block diagram showing a second embodiment of the present invention which stops the operation of a switching regulator provided in the peripheral circuit part during the detection of the head speed based on the back electromotive voltage of the VCM.

In FIG. 43, a driver 150 of the power amplifier IC 146 is formed by a node 178, a correction unit (PI correction unit) 180 which carries out a proportional-plus-integral correction, a power amplifier 182 and a sense amplifier 184. The VCM 144 can be represented by an equivalent series circuit made up of a coil 186 and a resistor 188. A driving current is supplied to the VCM 144 from the power amplifier 182, and a sense resistor 190 for detecting the current is connected in series to the VCM 144.

A voltage proportional to the driving current of the VCM 144 is generated across the terminals of the sense resistor 190, and this voltage is detected by the sense amplifier 184 and is applied to the node 178 as a current feedback signal. A current instruction signal E4 from the load speed controller 160 of the MCU 116 is also input to the node 178.

As may be seen from the construction of the MCU 116 shown in FIG. 41, the current instruction signal E4 corresponds to the speed deviation between the target speed value and the head speed signal which is based on the back electromotive voltage of the VCM 144. For this reason, the driver 150 carries out a feedback control so as to supply the current instruction signal E4 from the load speed controller 160 to the VCM 144 as the driving current.

The speed detection circuit 154 includes differential amplifiers 196, 198 and 200. A series circuit made up of resistors 192 and 194 is connected in parallel to a series circuit which is made up of the sense resistor 190 and the VCM 144 which is represented by the coil 186 and the resistor 188. The resistor 192 has a resistance corresponding to a resistance of the resistor 188 of the VCM 144, and the resistor 194 has a resistance equal to a resistance of the sense resistor 190. DC-wise, the coil 186 of the VCM 144 is negligible, thereby forming a bridge circuit which is made up of the resistors 188, 190, 192 and 194.

When the VCM 144 is driven by the power amplifier 182, a voltage E1 is generated across the terminals of the VCM 144. This voltage E1 is a sum of a driving voltage Ea of the power amplifier 182 and a back electromotive voltage Eb generated by the operation of the VCM 144, that is, E1=Ea+Eb. On the other hand, only the driving voltage Ea from the power amplifier 182 is applied across the resistor 192.

Hence, the differential amplifier 196 detects the voltage E1=Ea+Eb generated across the terminals of the VCM 144, and at the same time, the differential amplifier 198 detects a voltage E2=Ea generated across the terminals of the resistor 192. The differential amplifier 200 obtains an error between the voltages E1 and E2 output from the differential amplifiers 196 and 198, so as to detect a head speed signal E3. This head speed signal E3 can be described by E3=E1−E2= (Ea+Eb)−Eb=Eb, and thus, the back electromotive voltage Eb of the VCM 144 can be detected as the head speed signal.

The power amplifier IC 146 which includes the driver 150 and the speed detection circuit 154 described above, is also provided with switching regulators 202 and 204. The switching regulator 202 receives external power and outputs stabilized power of a positive power supply voltage +Vcc.

In addition, the switching regulator 204 receives external power and outputs stabilized power of a negative power supply voltage −Vcc. The switching regulators 202 and 204 respectively include a DC—DC converter which operates at a predetermined switching frequency, and the switching operation causes a switching noise to be output therefrom. For this reason, because the speed detection circuit 154 which detects the head speed signal E3 from the back electromotive voltage Eb of the VCM 144 is provided in the same power amplifier IC 146 which includes these switching regulators 202 and 204, the speed detection circuit 154 is greatly affected by the switching noise from the switching regulators 202 and 204.

Accordingly, in this second embodiment, in order to carry out the speed control by the load speed controller 160 of the MCU 116, the circuit control processor 161 supplies control signals E5 and E6 to the switching regulators 202 and 204, respectively, to stop the operations of the switching regulators 202 and 204, while the head speed signal E3 is detected from the back electromotive voltage of the VCM 144 in the speed detection circuit 154.

While the speed detection circuit 154 detects the head speed signal E3 from the back electromotive voltage of the VCM 144, no switching noise is generated from the switching regulators 202 and 204 because the operations of the switching regulators 202 and 204 are stopped. As a result, the head speed signal E3 output from the speed detection circuit 154 is unaffected by the switching noise, and the head speed signal E3 accurately indicates the moving speed of the head based on the back electromotive voltage of the VCM 144.

FIG. 44(A) is a diagram showing the current supplied to the VCM 144 (VCM current) during the ramp load operation in this second embodiment shown in FIG. 43, and FIG. 44(B) shows the control of the switching regulators 202 and 204 associated therewith.

The VCM current which is zero V on the ordinate indicates that the composite head is stopped, a positive value on the ordinate indicates that the composite head is driven in the inner peripheral direction of the magnetic disk 140, and a negative value on the ordinate indicates that the composite head is driven in the outer peripheral direction of the magnetic disk 140. At a time t1, the composite head is positioned at the stopping part 174-1 of the ramp member 174 as shown in FIG. 42. By supplying a predetermined outer driving VCM current 202 for pushing the composite head against the outer periphery of the ramp member 174 from a time t2 to a time t3, the composite head is pushed against the outermost periphery of the ramp member 174 at the stopping part 174-1.

Next, in order to load the composite head from the ramp member 174 onto the magnetic disk 140, a predetermined inner driving VCM current 204 for moving the composite head towards the magnetic disk 140 is read from table information and supplied from the time t3 to a time t4. The table information may be prestored in the memory 18, for example. This predetermined inner driving VCM current 204 is an acceleration current of a feed forward control for moving the composite head from the ramp member 174 towards the magnetic disk 140.

Then, a speed control for loading the composite head from the ramp member 174 onto the magnetic disk 140 in response to the head speed signal which is detected based on the back electromotive voltage of the VCM 144 is carried out from the time t4 to a time t5. During the speed control carried out from the time t4 to the time t5, the head speed is controlled based on the target speed value which is 1/10 or less that during the seek operation, and a current feedback control for maintaining the target speed value is carried out with respect to the VCM current by a feedback system of the load speed controller 160 shown in FIG. 41 and the driver 150 of the power amplifier IC 146 shown in FIG. 43.

Figure 44:
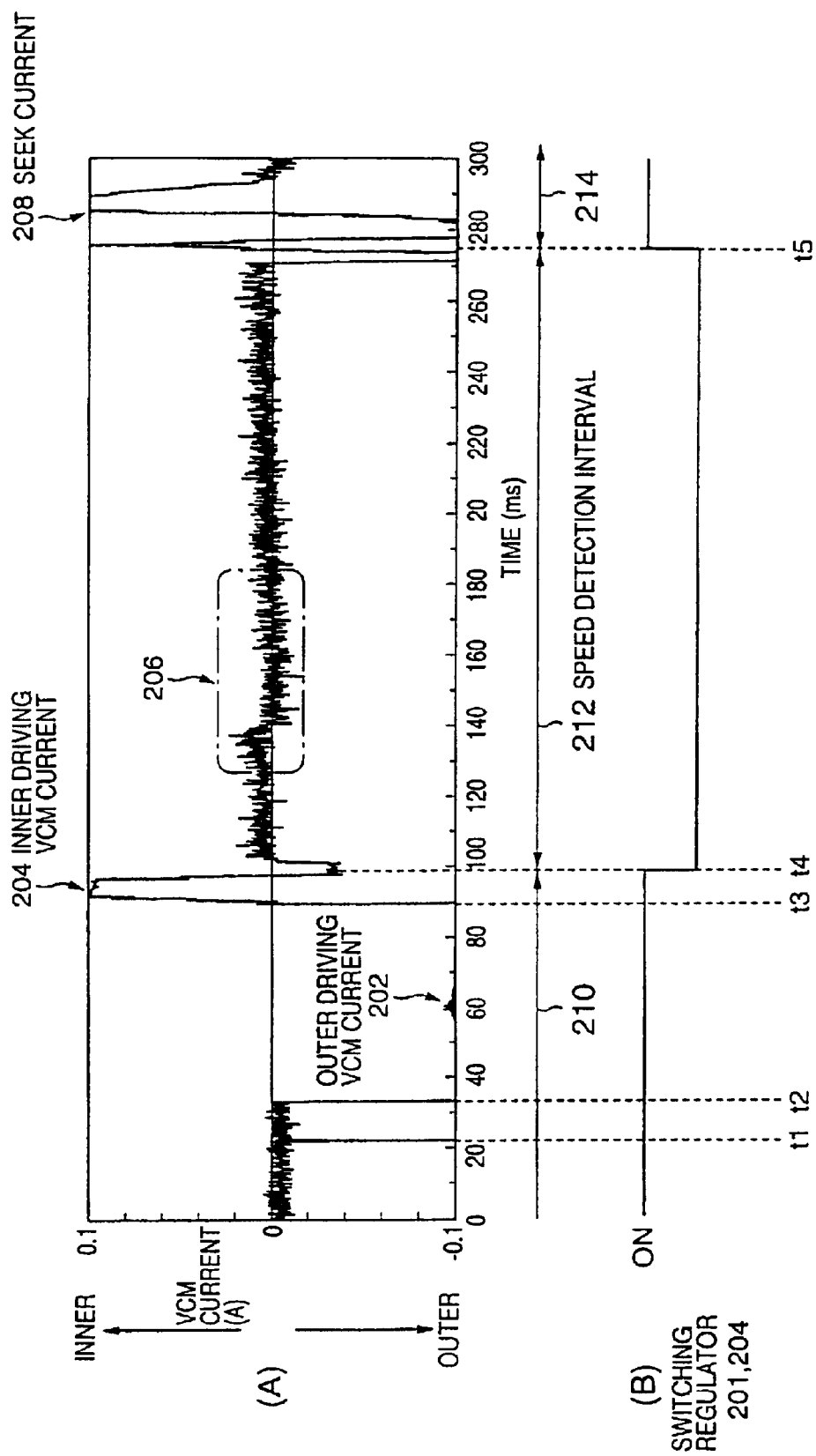
FIG. 44 is a time chart for explaining a VCM current of the speed control during the ramp load operation of FIG. 42 and a stopping of the switching regulators.

Particularly the VCM current at a part surrounded by a one-dot chain line 206 in FIG. 44 indicates a current waveform during the time when the composite head passes the sloping path 174-3 of the ramp member 174 shown in FIG. 42 and is loaded to the landing region 176 on the magnetic disk 140.

When the loading of the composite head to the landing region 174 ends at the time t5, the on-track state is achieved by detecting the head position from the servo information written on the magnetic disk 140. Hence, after this on-track state is achieved, a seek VCM current 208 is supplied so as to move the composite head to the target sector position.

As the VCM current changes with time when carrying out the ramp load operation, no head speed detection is carried out during an interval 210 up to the time t4, the head speed detection is carried out during an interval 214 from the time t4 to the time t5, and no head speed detection is carried out during an interval 214 from the time t5. Accordingly, the noise suppressing section 162 of the MCU 116 shown in FIG. 43 carries out a control to stop the operations of the switching regulators 202 and 204 during the head speed detection interval 212 from the time t4 to the time t5 as shown in FIG. 44(B).

FIG. 45 is a time chart for explaining the head speed detection by the load speed controller 160 of the MCU 116 shown in FIG. 43 and the updating of the VCM current by the driver 150 of the power amplifier IC 146 based on this head speed detection, during the head speed detection interval 212 shown in FIG. 44.

FIG. 45(A) shows a head speed detection timing. In the MCU 116, the head speed signal E3 which is output from the speed detection circuit 154 is sampled at a predetermined sampling period T for a head speed detection interval T1, so as to detect the head speed by converting the head speed signal E3 into digital data. In other words, the head speed detection shown in FIG. 45(A) corresponds to the operation of the ADC 164 which is provided within the load speed controller 160 of the MCU 1116 shown in FIG. 41.

In correspondence with the head speed detection for every sampling period T shown in FIG. 45(A), the VCM current instruction value is updated in the latter half of the sampling period T as shown in FIG. 45(B). While the head speed detection shown in FIG. 45(A) and FIG. 45(B) is carried out, the operations of the switching regulators 202 and 204 are stopped, and it is possible to positively prevent the undesirable effects of the switching noise.

FIG. 46 is a time chart showing another embodiment of the control of the switching regulators 202 and 204 by the noise suppressing section 162 of this second embodiment shown in FIG. 43. A head speed detection shown in FIG. 46(A) and an updating of the VCM current shown in FIG. 46(B) are repeated for every sampling period T for a head speed detection interval T1, similarly as in FIG. 45(A) and FIG. 45(B), and a computed result of the VCM current value is updated in the latter half of the sampling period T.

On the other hand, the operations of the switching regulators 202 and 204 are stopped during the first head speed detection interval T1 of the sampling period T shown in FIG. 46(A), and the operations of the switching regulators 202 and 204 are carried out during a remaining interval T2 in which no head speed detection is carried out, as shown in FIG. 46(C).

For this reason, the switching noise does not mix into the head speed signal, and the undesirable effects of the noise can positively be prevented, because the operations of the switching regulators 202 and 204 are stopped during the head speed detection interval T1 of each sampling period T shown in FIG. 46(A).

The operations of the switching regulators 202 and 204 may be stopped during the head speed detection interval 212 as shown in FIG. 44(B) or, in synchronism with the head speed detection interval T1 within the head speed detection stopping interval 110 as shown in FIG. 46, depending on the capabilities of the switching regulators 202 and 204 to maintain output voltages when the operations thereof are stopped, which capabilities are indicated on the power amplifier IC 146.

The interval in which the operation of the switching regulator is stopped is approximately 180 ms from FIG. 44(A), for example. Hence, if the switching regulator can maintain a stable output when the operation thereof is stopped for such an interval, the operation of the switching regulator may be stopped for the head speed detection interval as shown in FIG. 44(B). On the other hand, if the switching regulator can only maintain the stable output for a shorter interval when the operation thereof is stopped, the operation of the switching regulator may be stopped in synchronism with the head speed detection interval T1 as shown in FIG. 46(C).

Figure 47:
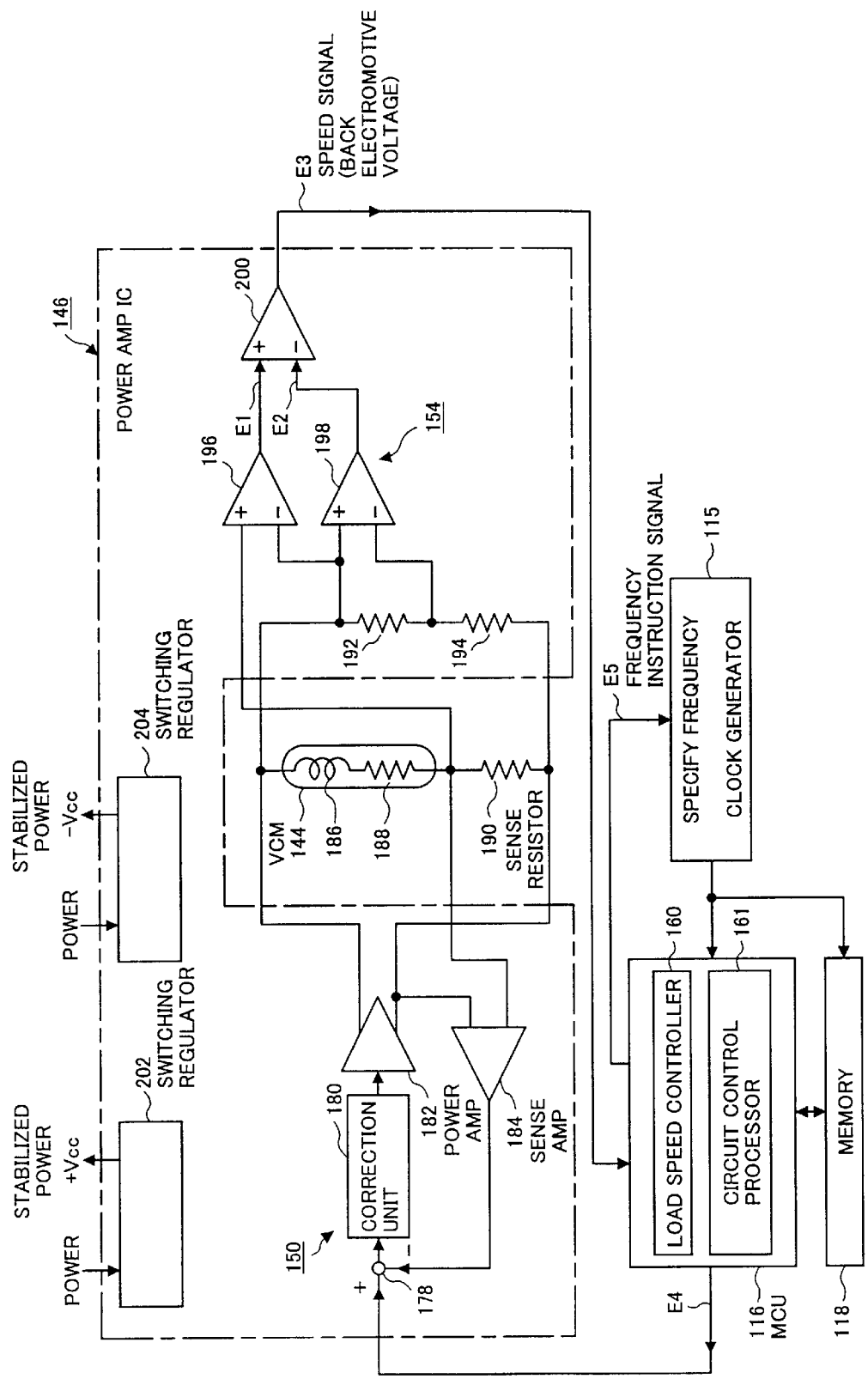
FIG. 47 is a circuit block diagram showing a third embodiment of the present invention which reduces a clock frequency for a MCU and a memory.

FIG. 47 is a circuit block diagram showing a third embodiment of the present invention which reduces the clock frequency of the MCU and the memory, while the head speed is detected from the back electromotive voltage of the VCM. In FIG. 47, those parts which are the same as those corresponding parts in FIG. 43 are designated by the same reference numerals, and a description thereof will be omitted.

In this third embodiment, the circuit control processor 161 which is provided in the MCU 116 outputs a frequency instruction signal E6 with respect to a clock generator 115 which supplies a clock to the MCU 116 and the memory 118, while the load speed controller 160 carries out the head speed detection by sampling the head speed signal E3 from the speed detection circuit 154 in order to control the speed of the composite head loaded from the ramp member 174 onto the magnetic disk 140. For example, the clock frequency is reduced to one-half that during a normal operation, so as to slow down the operations of the MCU 116 and the memory 118 during the head speed detection.

By reducing the clock frequency based on which the MCU 116 and the memory 118 operate, it is possible to reduce a rate with which a noise caused by the clock itself and noises from the MCU 116 and the memory 118 become included at the head speed detection timing, by an amount corresponding to the reduced amount of the clock frequency. As a result, it is possible to reduce the noise included in the head speed signal which is detected based on the back electromotive voltage of the VCM 144.

Of course, the noise suppressing effect of this third embodiment shown in FIG. 47 which reduces the clock frequency becomes larger if used in combination with the stopping of the switching regulators 202 and 204 as in the case of the second embodiment shown in FIG. 43. The construction of the power amplifier IC 146 of this third embodiment shown in FIG. 47 is the same as that of the second embodiment shown in FIG. 43, and this third embodiment only differs from the second embodiment in that the switching regulators 202 and 204 are not controlled to turn ON and OFF responsive to an external signal.

Figure 48:
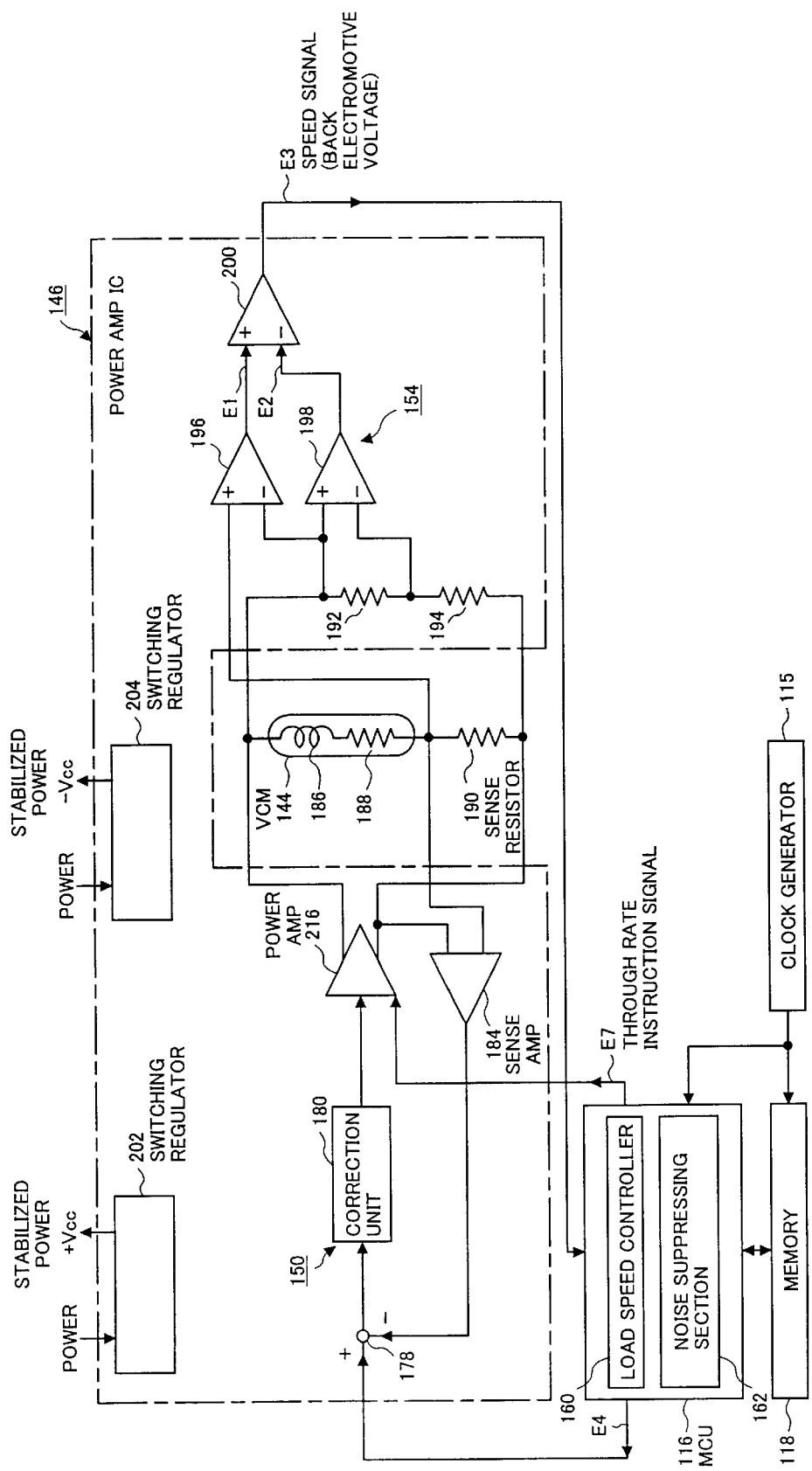
FIG. 48 is a circuit block diagram showing a fourth embodiment of the present invention which reduces a through rate of a power amplifier.

FIG. 48 is a circuit block diagram showing a fourth embodiment of the present invention which reduces a through rate of the power amplifier while the head speed is detected from the back electromotive voltage of the VCM. In FIG. 48, those parts which are the same as those corresponding parts in FIG. 43 are designated by the same reference numerals, and a description thereof will be omitted.

In this fourth embodiment, a through rate (non-distorted signal amplifying frequency band) of a power amplifier 216 which is provided in the driver 150 of the power amplifier IC 146 is variable in response to an external signal.

The noise suppressing section 162 of the MCU 116 outputs a through rate instruction signal E7 to the power amplifier 216, while the load speed controller 160 carries out the head speed detection by sampling the head speed signal E3 from the speed detection circuit 154. Hence, the through rate during the head speed detection is reduced compared to the through rate at the time when no head speed detection is carried out.

By reducing the through rate of the power amplifier 216 while the head speed detection is carried out, the non-distorted signal amplification of the power amplifier 216 becomes limited in a high-frequency region. As a result, a high-frequency component of an output current of the power amplifier 216 is suppressed, to thereby reduce a high-frequency noise in the output signal of the power amplifier 216 with respect to the head speed signal E3. Otherwise, the construction of this fourth embodiment shown in FIG. 48 is basically the same as that of the second embodiment shown in FIG. 43. Furthermore, the noise suppressing effect of this fourth embodiment shown in FIG. 48 becomes larger if used in combination with the second embodiment shown in FIG. 43 and/or the third embodiment shown in FIG. 47.

Figure 49:
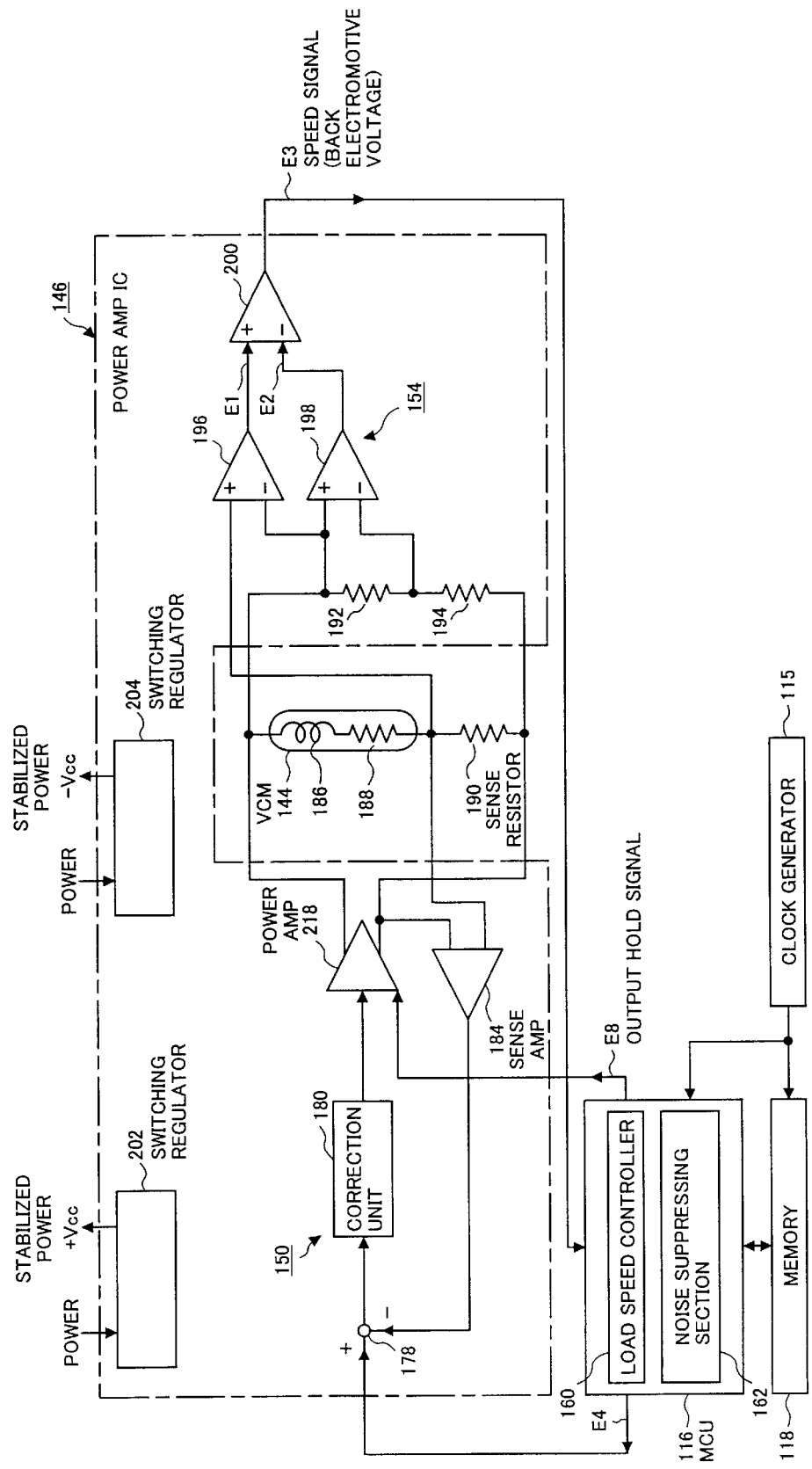
FIG. 49 is a circuit block diagram showing a fifth embodiment of the present invention which stops updating an output by holding a power amplifier.

FIG. 49 is a circuit block diagram showing a fifth embodiment of the present invention which holds the power amplifier and stops updating the output while the head speed is detected from the back electromotive voltage of the VCM. In FIG. 49, those parts which are the same as those corresponding parts in FIG. 43 are designated by the same reference numerals, and a description thereof will be omitted.

In this fifth embodiment, a power amplifier 218 which is provided in the driver 150 of the power amplifier IC 146 has an output hold function for holding an output of the power amplifier 218 constant in response to an external output hold signal E8.

With respect to the power amplifier 218 having the output hold function, the noise suppressing section 162 of the MCU 116 outputs the output hold signal E8 while the load speed controller 160 carries out the head speed detection by sampling the head speed signal E3 from the speed detection circuit 154. Hence, a feedback control of the power amplifier 218 is cancelled, and the mixing of the noise into the head speed signal E3 due to a change in the output current caused by the feedback control is suppressed during the head speed detection.

If the output of the power amplifier 218 were held for the head speed detection interval 212 shown in FIG. 44(A), it would become impossible to carry out the head speed control. Hence, the noise suppressing section 162 outputs the output hold signal E8 to the power amplifier during the first head speed detection interval T1 of the sampling period T shown in FIG. 46(A) to hold the output of the power amplifier 218, and cancels the output hold signal E8 during the remaining interval T2 so as to enable the power amplifier 218 to carry out the feedback control of the driving current with respect to the VCM 144, similarly to the control of switching regulators 202 and 204 described above with reference to the timing chart of FIG. 46.

Otherwise, the construction of this fifth embodiment shown in FIG. 49 is basically the same as that of the second embodiment shown in FIG. 43. Furthermore, the noise suppressing effect of this fifth embodiment shown in FIG. 49 becomes larger if used in combination with the second embodiment shown in FIG. 43, the third embodiment shown in FIG. 47 and/or the fourth embodiment shown in FIG. 48.

Figure 50:
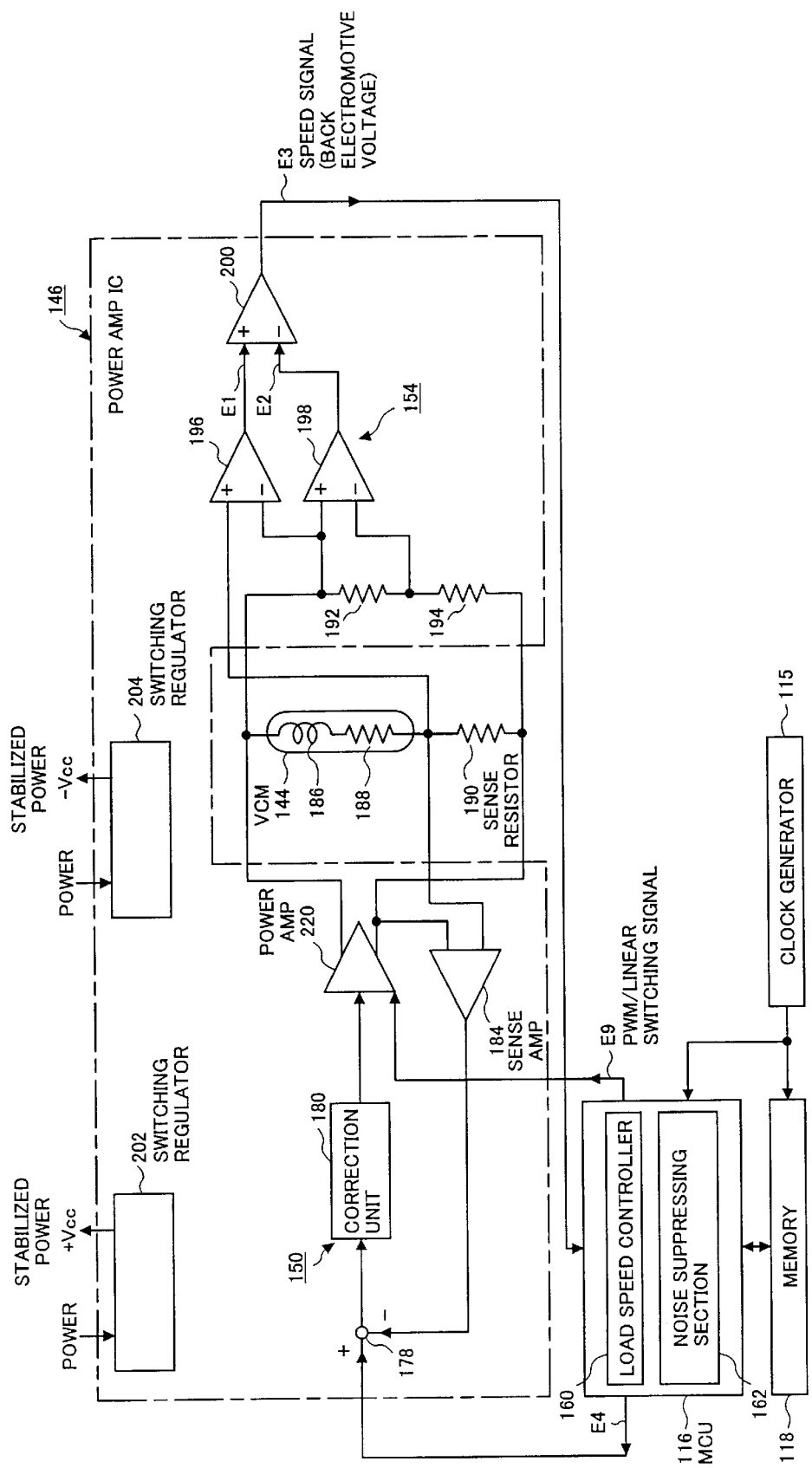
FIG. 50 is a circuit block diagram showing a sixth embodiment of the present invention which stops a PWM driving mode and operates a power amplifier in a linear driving mode.

FIG. 50 is a circuit block diagram showing a sixth embodiment of the present invention which stops the operation of the power amplifier in the PWM driving mode and operates the power amplifier in the linear driving mode while the head speed is detected from the back electromotive voltage of the VCM. In FIG. 50, those parts which are the same as those corresponding parts in FIG. 43 are designated by the same reference numerals, and a description thereof will be omitted.

In this sixth embodiment, a power amplifier 120 which is provided in the driver 50 of the power amplifier IC 146 can be operated in the PWM driving mode and the linear driving mode. The driving mode of the power amplifier 220 is switched in response to an external switching signal E9.

In the linear driving mode, the power amplifier 220 supplies a driving current to the VCM 144 proportionally to an input signal. On the other hand, in the PWM driving mode, the power amplifier 220 controls an amount of current supplied to the VCM 144 by varying a duty ratio with which a driving pulse is turned ON in response to an input signal.

With respect to the power amplifier 220 having the linear driving mode and the PWM driving mode, the noise suppressing section 162 of the MCU 116 switches the driving mode of the power amplifier 220 to the linear driving mode by outputting the switching signal E9 to the power amplifier 220 while the load speed controller 160 carries out the head speed detection by sampling the head speed signal E3 from the speed detection circuit 154. As a result, the power amplifier 220 is not operated in the PWM driving mode while the head speed detection is carried out.

Therefore, during intervals, which are other than the interval in which the head speed control is carried out, in which no head speed detection is carried out, the power amplifier 220 is basically operated in the PWM driving mode. But during the intervals in which no head speed detection is carried out, the power amplifier 220 may be operated in the linear driving mode other than the PWM driving mode. Otherwise, the construction of this sixth embodiment shown in FIG. 50 is basically the same as that of the second embodiment shown in FIG. 43. Furthermore, the noise suppressing effect of this sixth embodiment shown in FIG. 50 becomes larger if used in combination with any of the second through fifth embodiments described above.

Figure 51:
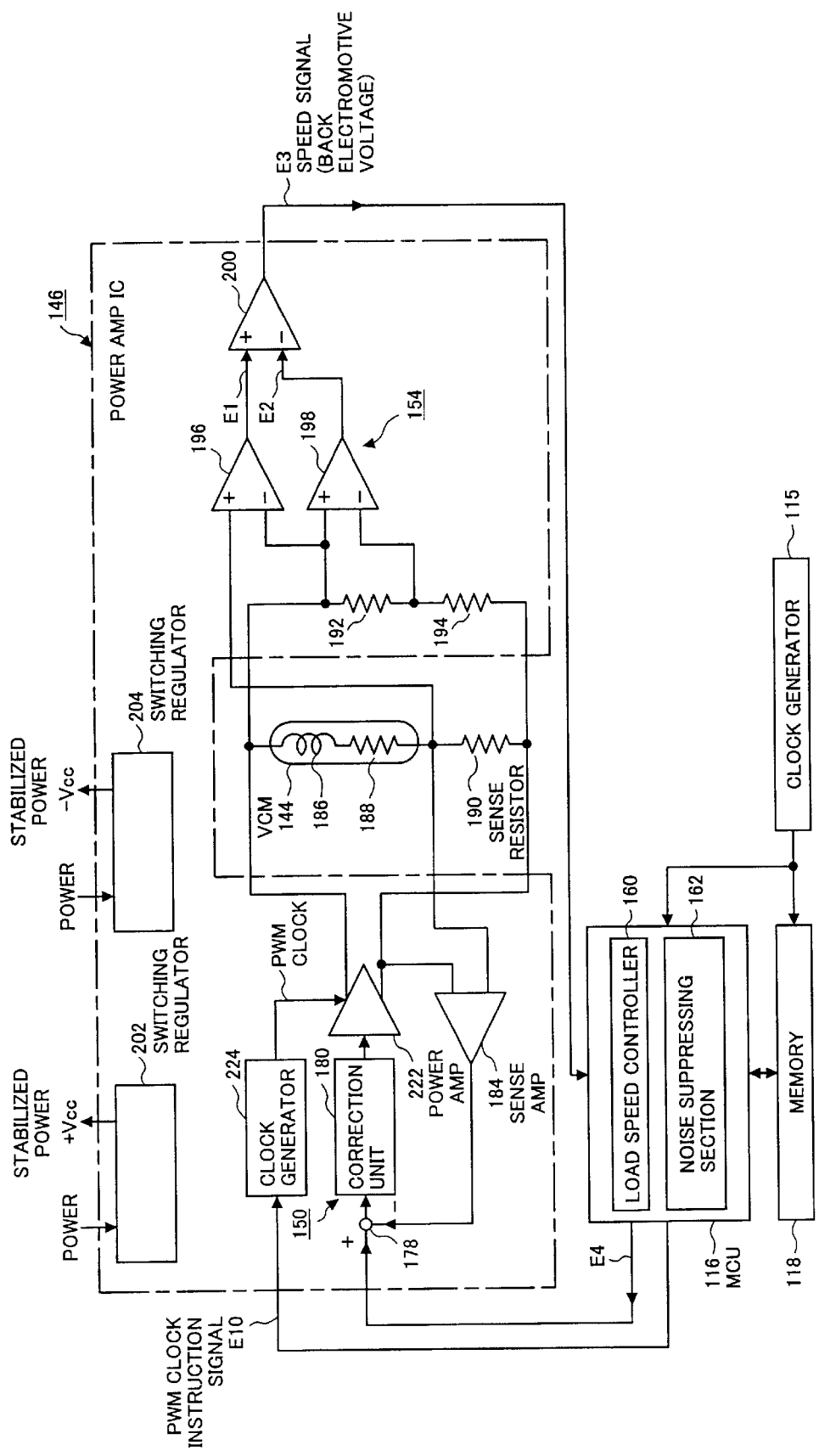
FIG. 51 is a circuit block diagram showing a seventh embodiment of the present invention which changes a PWM driving frequency so as not to easily interfere the head speed detection.

FIG. 51 is a circuit block diagram showing a seventh embodiment of the present invention which changes a frequency of the PWM driving mode of the power amplifier to a frequency which does not easily interfere with the head speed detection while the head speed is detected from the back electromotive voltage of the VCM. In FIG. 51, those parts which are the same as those corresponding parts in FIG. 43 are designated by the same reference numerals, and a description thereof will be omitted.

In this seventh embodiment, a power amplifier 222 which is provided in the driver 150 of the power amplifier IC 146 operates in the PWM driving mode in response to a PWM clock. The power amplifier 222 is connected to a PWM clock generator 224 which generates the PWM clock, and a PWM clock frequency generated from the PWM clock generator 224 is variable in response to an external PWM clock instruction signal E10.

With respect to the power amplifier 222 which operates in the PWM driving mode and has the variable PWM clock frequency, the noise suppressing section 162 of the MCU 116 outputs the PWM clock instruction signal E10 to the PWM clock generator 224 while the load speed controller 160 carries out the head speed detection by sampling the head speed signal E3 from the speed detection circuit 154. As a result, the PWM clock frequency generated from the PWM clock generator 224 is changed to a frequency which does not easily interfere with the head speed signal E3.

For example, the PWM clock frequency generated from the PWM clock generator 224 is reduced to a low frequency while the head speed detection is carried out, so as to reduce a change in the current which is supplied from the power amplifier 222 to the VCM 144. Consequently, a high-frequency noise which may mix into the head speed signal E3 is reduced. Otherwise, the construction of this seventh embodiment shown in FIG. 51 is basically the same as that of the second embodiment shown in FIG. 43. Furthermore, the noise suppressing effect of this sixth embodiment shown in FIG. 51 becomes larger if used in combination with any of the second through sixth embodiments described above.

Figure 52:
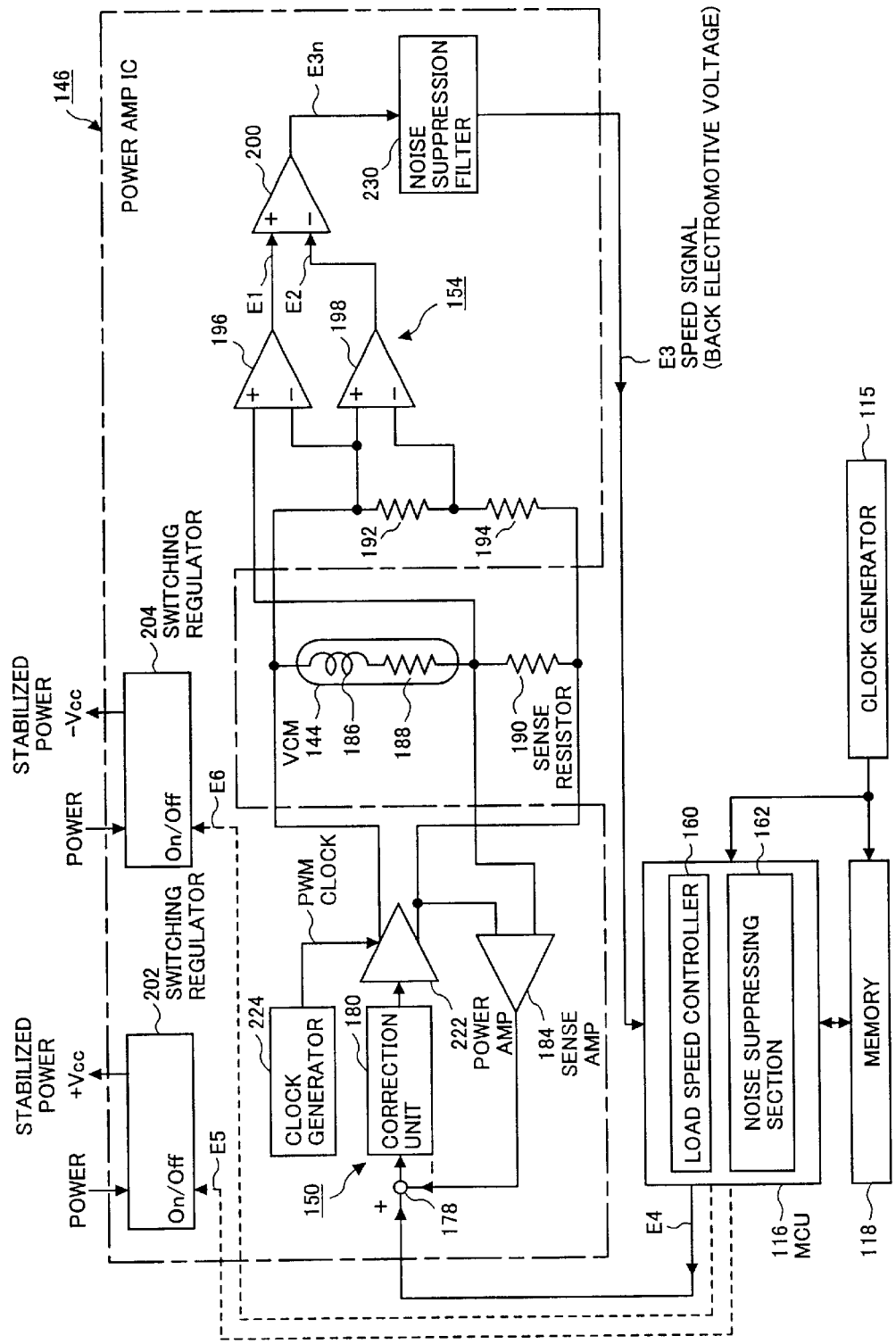
FIG. 52 is a circuit block diagram showing an eighth embodiment of the present invention which eliminates noise included in a head speed signal due to the PWM driving mode by use of a filter.

FIG. 52 is a circuit block diagram showing an eighth embodiment of the present invention which uses a filter to reduce a noise included in the head speed signal due to the PWM driving mode of the power amplifier. In FIG. 52, those parts which are the same as those corresponding parts in FIG. 43 are designated by the same reference numerals, and a description thereof will be omitted.

In this eighth embodiment, a power amplifier 22 which operates in the PWM driving mode in response to a PWM clock from a PWM clock generator 224, is provided in the driver 150 of the power amplifier IC 146.

In order to prevent the pulse noise caused by the operation of the power amplifier 222 in the PWM driving mode from mixing into the head speed signal E3 which is output from the speed detection circuit 154, a noise suppression filter 230 is provided on the output side of the speed detection circuit 154. A lowpass filter which suppresses at least a fundamental wave component caused by the PWM driving mode of the power amplifier 222 or, a notch filter which suppresses the fundamental wave component and harmonic components caused by the PWM driving mode of the power amplifier 222, may be used for the noise suppression filter 230.

Figure 53A:
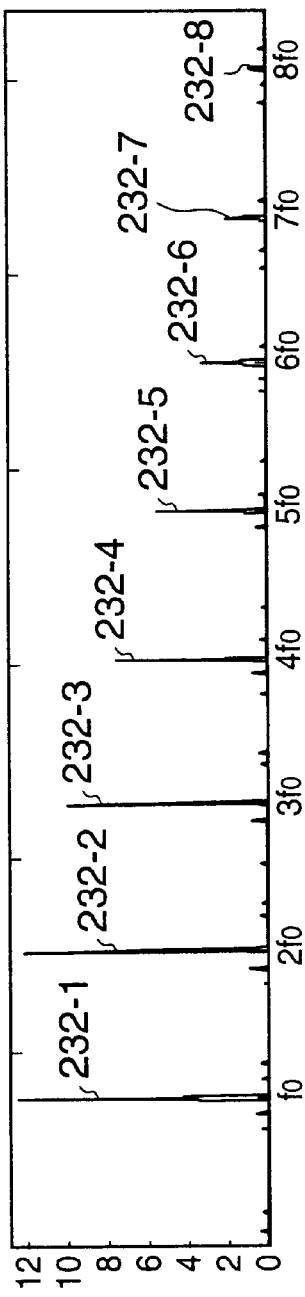
FIGS. 53A, 53B and 53C respectively are diagrams for explaining the noise caused by the PWM driving mode and a frequency characteristic of the filter in FIG. 52.
Figure 53B:
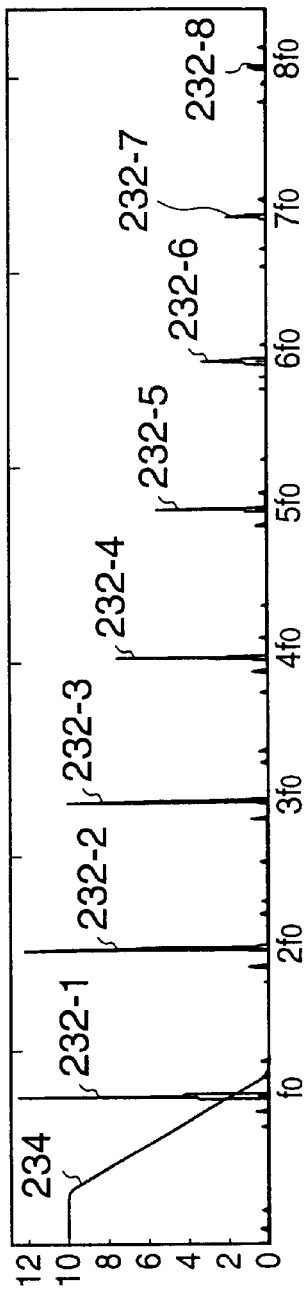
Figure 53C:
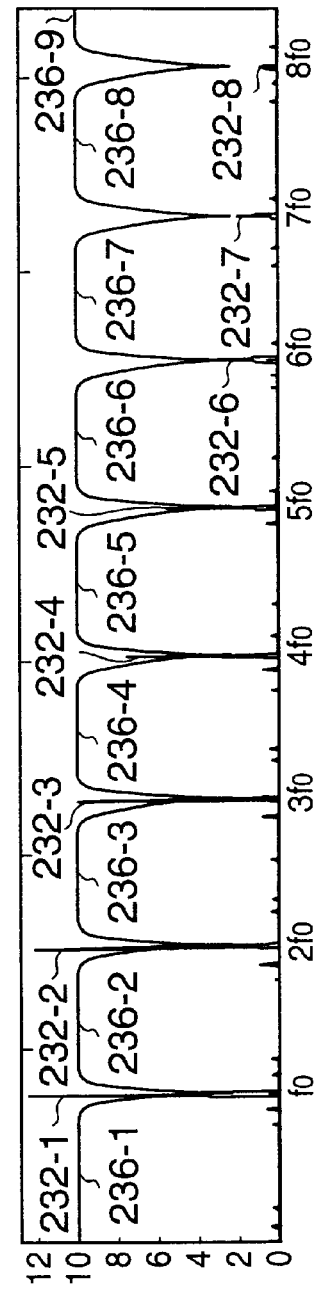

FIGS. 53A, 53B and 53C respectively are diagrams showing a noise spectrum generated by the operation of the power amplifier 222 shown in FIG. 52 in the PWM driving mode. FIG. 53A shows the noise spectrum generated by the operation of the power amplifier 222 in the PWM driving mode, and harmonic components 232-2, 232-3, . . . , 232-8 appear with respect to a fundamental wave component 232-1 of a fundamental frequency f0, as indicated by 2f0, 3f0, . . . , 8f0. As shown in FIG. 53A, the noise component attenuates towards the high-frequency region.

FIG. 53B shows a frequency characteristic of the lowpass filter which forms the noise suppression filter 230 shown in FIG. 52. This lowpass filter has a lowpass characteristic 234. By setting the lowpass characteristic 234 so that the fundamental frequency f0 of the fundamental wave component 232-1 in the PWM driving mode is in a vicinity of a cutoff frequency or higher than or equal to the cutoff frequency of the lowpass filter, it is possible to eliminate the fundamental wave component 232-1 and the harmonic components 232-2, . . . included in the head speed signal due to the PWM driving mode.

FIG. 53C shows a frequency characteristic of the notch filter which forms the noise suppression filter 230 shown in FIG. 52. This notch filter has filter characteristics 236-1 through 236-9 with cutoff characteristics at the fundamental wave component 232-1 and the harmonic components 232-2, . . . , 232-8 caused by the PWM driving mode. Hence, it is possible to eliminate the fundamental wave component 232-1 and the harmonic components 232-2, . . . included in the head speed signal due to the PWM driving mode.

The noise suppression filter 230 of this eighth embodiment shown in FIG. 52 is functionally a static noise suppressing section, and in this case, the noise suppressing section 162 of the MCU 116 may be omitted.

However, in a case where the switching regulators 202 and 204 are provided in the power amplifier IC 146, the elimination of the switching noise from the switching regulators 202 and 204 becomes insufficient by use of the noise suppression filter 230 alone. For this reason, as indicated by a dotted line in FIG. 52, it is desirable to stop the operations of the switching regulators 202 and 204 by control signals E5 and E6 output from the noise suppressing section 162 of the MCU 116 while the head speed detection is carried out.

Furthermore, the noise suppressing effect of this eighth embodiment shown in FIG. 52 becomes larger if used in combination with the second embodiment shown in FIG. 43 which stops the operations of the switching regulators 202 and 204 while the head speed detection is carried out or, used in combination with any of the third through seventh embodiments described above.

Figure 54:
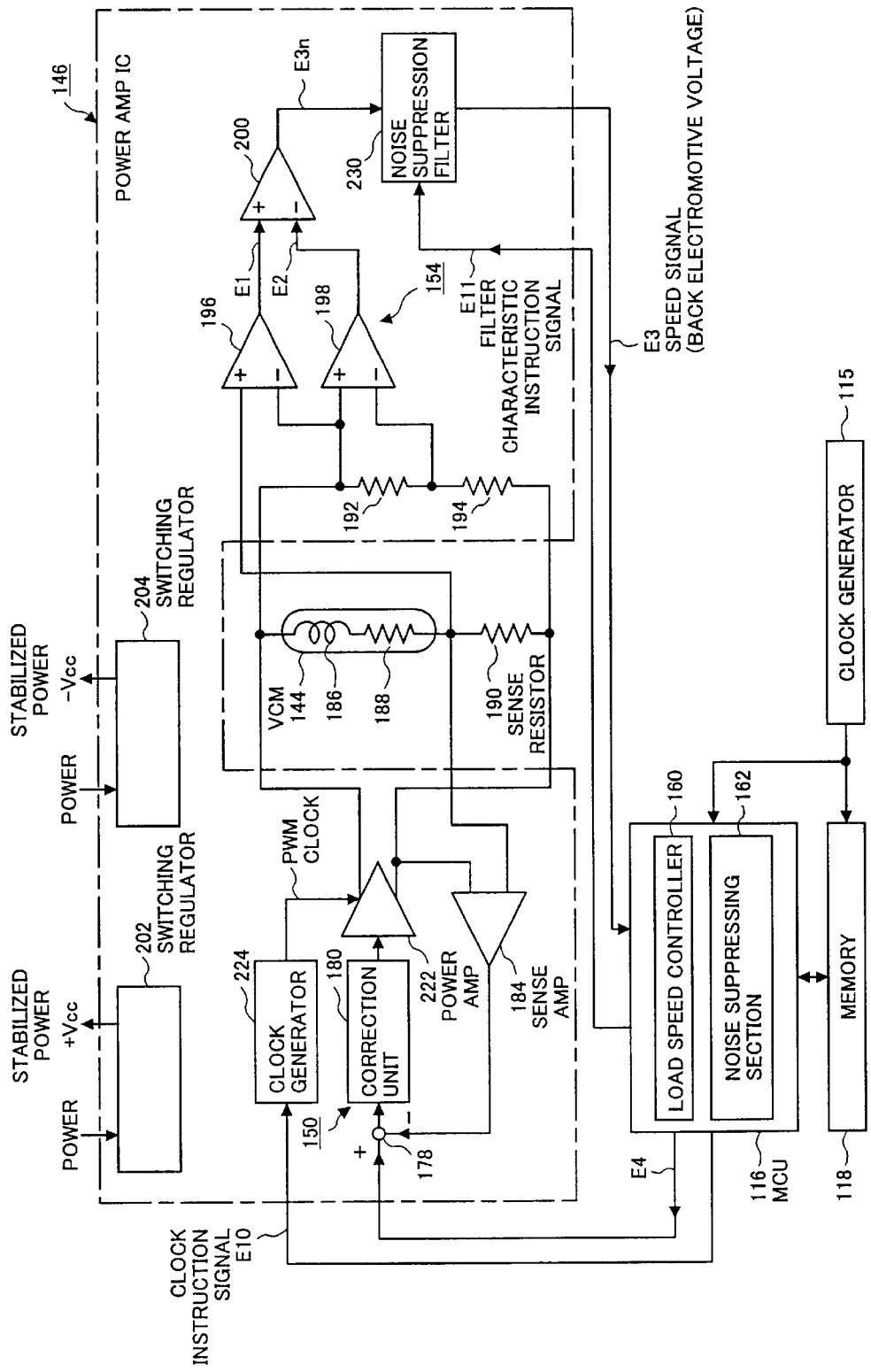
FIG. 54 is a circuit block diagram showing a ninth embodiment of the present invention which changes a filter characteristic depending on a PWM driving frequency.

FIG. 54 is a circuit block diagram showing a ninth embodiment of the present invention which changes a filter characteristic of the power amplifier depending on the frequency of the PWM driving mode. In FIG. 54, those parts which are the same as those corresponding parts in FIG. 43 are designated by the same reference numerals, and a description thereof will be omitted.

In this ninth embodiment, a power amplifier 222 which is provided in the driver 150 of the power amplifier IC 146 operates in the PWM driving mode in response to a PWM clock. The power amplifier 222 is connected to a PWM clock generator 224 which generates the PWM clock, and a PWM clock frequency generated from the PWM clock generator 224 is variable in response to an external PWM clock instruction signal E10. The noise suppressing section 162 of the MCU 116 outputs the PWM clock instruction signal E10 to the PWM clock generator 224 to reduce the PWM clock frequency while the load speed controller 160 carries out the head speed detection by sampling the head speed signal E3 from the speed detection circuit 154.

In addition, in this ninth embodiment, a noise suppression filter 402 is provided on the output side of the speed detection circuit 154. A filter characteristic of this noise suppression filter 402 is variable in response to an external filter characteristic instruction signal E11. For example, a lowpass filter having the frequency characteristic 234 shown in FIG. 53B may form the noise suppression filter 402, and for example, the cutoff frequency of the frequency characteristic 234 of this lowpass filter can be variable in response to the filter characteristic instruction signal E11.

A notch filter having the filter characteristics 236-1 through 236-9 shown in FIG. 53C may form the noise suppression filter 402, and a trap frequency of this notch filter can be shifted, on the frequency axis in response to the filter characteristic instruction signal E11.

With respect to the noise suppression filter 402, the noise suppressing section 162 provided in the MCU 116 outputs the PWM clock instruction signal E10 to reduce the PWM clock frequency output from the PWM clock generator 224 and outputs the filter characteristic instruction signal E11 corresponding to the reduced PWM clock frequency to the noise suppression filter 402, while the load speed controller 160 carries out the head speed detection by sampling the head speed signal E3 from the speed detection circuit 154. As a result, the frequency characteristic of the noise suppression filter 402 is switched to a frequency characteristic for suppressing the fundamental wave component and the harmonic components caused by the PWM driving mode at the reduced PWM clock frequency.

Furthermore, the noise suppressing effect of this ninth embodiment shown in FIG. 54 becomes larger if used in combination with any of the second through sixth embodiments described above.

In the second and subsequent embodiments described above, the process of stopping or slowing down the operation or suppressing the noise, while detecting the head speed based on the back electromotive voltage of the VCM, is carried out with respect to circuit parts such as the switching regulator, the MCU and the memory which are driven in response to the clock, and the power amplifier which operates in the PWM driving mode to drive the VCM. However, it is of course possible to carry out the process of stopping or slowing down the operation or suppressing the noise, with respect to other circuit parts which have the possibility of becoming a noise source which mixes noise into the head speed signal which is detected from the back electromotive voltage of the VCM.

Therefore, according to the second and subsequent embodiments described above, in a disk unit which is provided with a ramp load mechanism, the operation of a peripheral circuit part is stopped or the operation is slowed down by reducing a clock frequency while a head speed signal is detected from a back electromotive voltage of a VCM when loading a head from a ramp member onto a magnetic disk, so as to suppress a noise which mixes into the head speed signal from the peripheral circuit part. As a result, it is possible to accurately and stably carry out the speed control during a ramp load operation based on the head speed signal which is detected from the weak back electromotive voltage of the VCM. In addition, it is possible to improve the reliability of the disk unit by preventing an erroneous operation which would otherwise be caused by an abnormal movement of the head when the ramp load operation is carried out.

Further, the present invention is not limited to these embodiments, but various variations may be made without departing from the scope of the present invention. Moreover, the present invention is not limited to the numerical values mentioned in the above described embodiments.

What is claimed is:

1. A head speed control method for a disk unit having a head provided on a tip end of an arm, comprising:

a step of detecting a position of the head by integrating a head speed; and a step of switching and controlling the head speed to a plurality of target speeds which are set in advance, depending on the position of the head, during at least one of a ramp unload operation in which the head is receded to a parking area other than on a recording surface of a disk and a ramp load operation in which the head receded at the parking area is returned on the recording surface of the disk.

2. A head position detection method for a disk unit having a head provided on a tip end of an arm, comprising:

a step of detecting a head speed; and a step of detecting a time integration value of the head speed from a reference position from which a head position can be detected, said reference position being a position where the head cannot read information on a disk.

3. A disk unit provided with a motor which drives an arm having a head on a tip end thereof, comprising:

a first detection circuit to detect a head speed; and a second detection circuit to detect a time integration value of the head speed from a reference position from which a head position can be detected, said reference position being a position where the head cannot read information on a disk.

4. The disk unit as claimed in claim 3, further comprising:

a controller to control a ramp unload operation in which the head is receded to a parking area other than on a recording surface of a disk and a ramp load operation in which the head receded at the parking area is returned on the recording surface of the disk, and said controller variably controls the head speed to a plurality of target speeds by controlling the motor during at least one of the ramp unload operation and the ramp load operation.

5. The disk unit as claimed in claim 4, wherein said controller controls the motor to urge the head in a direction towards a terminal position of the parking area for a predetermined time when the head reaches the terminal position during the ramp unload operation.

6. A disk unit provided with a motor which drives an arm having a head on a tip end thereof, comprising:

a detector to detect a position of the head by integrating a head speed; and a controller to switch and control the head speed to a plurality of target speeds which are set in advance, depending on the position of the head, during at least one of a ramp unload operation in which the head is receded to a parking area other than on a recording surface of a disk and a ramp load operation in which the head receded at the parking area is returned on the recording surface of the disk.

7. The disk unit as claimed in claim 6, wherein said controller controls the head speed to a predetermined target speed when the head reaches a predetermined position.

8. The disk unit as claimed in claim 6, wherein said controller controls the head speed to a predetermined target speed when a predetermined time is reached.

9. A disk unit provided with a ramp load mechanism, comprising:

a load speed controller to control a speed of a head when the head moves on a ramp member; and a circuit control processor to control an operation of a peripheral circuit part so as to slow down the operation of the peripheral circuit part by reducing a frequency of a clock while the speed of the head is controlled.

10. The disk unit as claimed in claim 9, wherein said circuit control processor stops an operation of a switching regulator while the speed of the head is controlled.

11. The disk unit as claimed in claim 9, wherein the peripheral circuit part is provided with a main controller including a MPU which operates in response to a clock and a memory, and said circuit control processor reduces a frequency of the clock of the main controller while the speed of the head is controlled.

12. The disk unit as claimed in claim 9, further comprising:

the ramp member on which the head recedes when a rotation of a disk stops; and a switching regulator which assumes a switch off state while the head moves on the ramp member.

13. A disk unit provided with a ramp load mechanism, comprising:

a voice coil motor to drive a head;

a load speed controller to control a speed of the head based on a back electromotive voltage from the voice coil motor when the head moves on a ramp member; and a noise suppressing section to suppress a mixture of noise caused by an operation of a peripheral circuit part while the speed of the head is controlled.

14. The disk unit as claimed in claim 13, wherein said peripheral circuit part includes a power amplifier which drives the voice coil motor and having a through rate, a dynamic range and/or a current feedback which are reduced or stopped by a control signal from a main control unit, and said noise suppressing section stops updating an output caused by at least one of reduction of the through rate, reduction of the dynamic range and the stopping of the current feedback, while the speed of the head is detected.

15. The disk unit as claimed in claim 13, wherein said peripheral circuit part includes a power amplifier which drives the voice coil motor and has a driving mode which can be switched between a linear driving mode and a PWM driving mode, and said noise suppressing section switches the driving mode of the power amplifier to the linear driving mode while the speed of the head is detected.

16. The disk unit as claimed in claim 13, wherein said peripheral circuit part includes a power amplifier which drives the voice coil motor and operates in a PWM driving mode with a variable operating frequency, and said noise suppressing section changes a driving frequency of the power amplifier for a frequency which does not interfere with a head speed signal which indicates a head speed while the speed of the head is detected.

17. The disk unit as claimed in claim 13, wherein said noise suppressing section further includes a power amplifier which drives the voice coil motor, and a filter which eliminates frequency components including a fundamental wave component and harmonics of a PWM operating frequency of the power amplifier from a head speed signal which indicates a head speed while the speed of the head is detected.

18. The disk unit as claimed in claim 13, wherein said peripheral circuit part includes a power amplifier which drives the voice coil motor in a PWM driving mode, and said noise suppressing section includes a filter which eliminates frequency components including a fundamental wave component and harmonics of a PWM operating frequency of the power amplifier from a head speed signal which indicates a head speed while the speed of the head is detected.

19. The disk unit as claimed in claim 18, wherein said filter is made of a notch filter which suppresses the frequency components including the fundamental wave and the harmonics of the PWM operating frequency or, a lowpass filter which suppresses a frequency band which includes the frequency components including the fundamental wave and the harmonics to a predetermined order of the PWM operating frequency.

20. A method of controlling a disk unit which is provided with a ramp load mechanism, comprising the steps of:

controlling a speed of a head when the head moves on a ramp member; and controlling an operation of a peripheral circuit part so as to slow down the operation of the peripheral circuit part by reducing a frequency of a clock while the speed of the head is controlled.

21. The method of controlling the disk unit as claimed in claim 20, wherein said step of controlling the operation of the peripheral circuit part stops an operation of a switching regulator while the speed of the head is controlled.

22. The method of controlling the disk unit as claimed in claim 20, wherein said step of controlling the operation of the peripheral circuit part reduces a frequency of a clock of a main controller which includes a MPU which operates in response to the clock and a memory, while the speed of the head is controlled.

23. A method of controlling a disk unit provided with a ramp load mechanism, comprising the steps of:

controlling a speed of a head, based on a back electromotive voltage from a voice coil motor which drives the head, when the head moves on a ramp member; and suppressing a mixture of noise caused by an operation of a peripheral circuit part while the speed of the head is controlled.

* * * * *